United States Patent
Fleizach et al.

(10) Patent No.: US 10,209,879 B2
(45) Date of Patent: *Feb. 19, 2019

(54) DEVICE, METHOD, AND GRAPHICAL USER INTERFACE FOR CONFIGURING AND IMPLEMENTING RESTRICTED INTERACTIONS FOR APPLICATIONS

(71) Applicant: Apple Inc., Cupertino, CA (US)

(72) Inventors: Christopher B. Fleizach, Morgan Hill, CA (US); Joel M. Lopes Da Silva, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 530 days.

This patent is subject to a terminal disclaimer.

(21) Appl. No.: 15/057,610

(22) Filed: Mar. 1, 2016

(65) Prior Publication Data

US 2016/0179334 A1 Jun. 23, 2016

Related U.S. Application Data

(63) Continuation of application No. 14/183,395, filed on Feb. 18, 2014, now Pat. No. 9,292,195, which is a
(Continued)

(51) Int. Cl.
*G06F 3/0488* (2013.01)
*G06F 3/0484* (2013.01)
(Continued)

(52) U.S. Cl.
CPC .......... *G06F 3/0488* (2013.01); *H04M 19/04* (2013.01); *G06F 3/017* (2013.01); *G06F 3/0484* (2013.01); *G06F 3/04883* (2013.01)

(58) Field of Classification Search
CPC .. G06F 3/0488; G06F 3/04883; G06F 3/0484; G06F 3/017; H04M 19/04
See application file for complete search history.

(56) References Cited

U.S. PATENT DOCUMENTS 5,550,968 A 8/1996 Miller et al.
7,865,837 B1 1/2011 Huff et al.
(Continued)

FOREIGN PATENT DOCUMENTS

JP 6-149525 A 5/1994
JP 2001-5599 A 1/2001
(Continued)

OTHER PUBLICATIONS

Office Action received for Australian Patent Application No. 2015202073, dated May 15, 2017, 3 pages.
(Continued)

*Primary Examiner* — Ting Z Lee
(74) *Attorney, Agent, or Firm* — Dentons US LLP

(57) ABSTRACT

An electronic device, while in an interaction configuration mode for a first application, concurrently displays: a first user interface, one or more interaction control user interface objects, and an application restriction controls display user interface object for the first application. The device detects a first gesture, and in response, displays application restriction control user interface objects for the first application. A respective application restriction control user interface object indicates whether a corresponding feature of the first application is configured to be enabled in a restricted interaction mode. The device detects a second gesture, and changes display of a setting in the first application restriction control user interface object for the first application. The device detects a second input, and in response, enters the restricted interaction mode for the first application. The corresponding feature is restricted in accordance with the setting in the first application restriction control user interface object.

54 Claims, 60 Drawing Sheets

Related U.S. Application Data continuation-in-part of application No. 13/689,708, filed on Nov. 29, 2012, now Pat. No. 9,094,534, which is a continuation-in-part of application No. 13/436,433, filed on Mar. 30, 2012, now Pat. No. 8,812,994.

(60) Provisional application No. 61/784,014, filed on Mar. 14, 2013, provisional application No. 61/657,873, filed on Jun. 10, 2012, provisional application No. 61/581,615, filed on Dec. 29, 2011.

(51) Int. Cl.
*G06F 3/01* (2006.01)
*H04M 19/04* (2006.01)

(56) References Cited

U.S. PATENT DOCUMENTS

| | | |
|---|---|---|
| 8,115,609 B2 | 2/2012 | Ketari |
| 8,130,206 B2 | 3/2012 | Lindroos |
| 8,442,600 B1 | 5/2013 | Tseng |
| 8,812,994 B2 | 8/2014 | Seymour et al. |
| 9,094,534 B2 | 7/2015 | Seymour et al. |
| 9,292,195 B2 | 3/2016 | Fleizach et al. |
| 2006/0136829 A1 | 6/2006 | Abbar et al. |
| 2006/0155546 A1 | 7/2006 | Gupta et al. |
| 2007/0024646 A1 | 2/2007 | Saarinen et al. |
| 2008/0020803 A1 | 1/2008 | Rios et al. |
| 2008/0045186 A1 | 2/2008 | Black et al. |
| 2008/0101553 A1 | 5/2008 | Goldman et al. |
| 2008/0126986 A1 | 5/2008 | Tsukiji |
| 2008/0254767 A1 | 10/2008 | Jin |
| 2009/0064055 A1 | 3/2009 | Chaudhri et al. |
| 2009/0144367 A1 | 6/2009 | Tadokoro |
| 2009/0172576 A1 | 7/2009 | Cheaz |
| 2010/0001953 A1 | 1/2010 | Yamamoto et al. |
| 2010/0001967 A1 | 1/2010 | Yoo |
| 2010/0231355 A1 | 9/2010 | Okuma et al. |
| 2010/0235881 A1 | 9/2010 | Liu et al. |
| 2010/0241973 A1 | 9/2010 | Whiddett |
| 2010/0268828 A1 | 10/2010 | Pahlavan et al. |
| 2010/0293508 A1 | 11/2010 | Hwang et al. |
| 2010/0297988 A1 | 11/2010 | Kuhl et al. |
| 2010/0306718 A1 | 12/2010 | Shim et al. |
| 2010/0315371 A1 | 12/2010 | Katsu et al. |
| 2011/0041102 A1 | 2/2011 | Kim |
| 2011/0102357 A1 | 5/2011 | Kajitani |
| 2011/0252357 A1 | 10/2011 | Chaudhri |
| 2011/0265179 A1 | 10/2011 | Newman et al. |
| 2011/0294467 A1 | 12/2011 | Kim et al. |
| 2012/0046077 A1 | 2/2012 | Kim et al. |
| 2012/0142379 A1 | 6/2012 | Park |
| 2013/0040604 A1 | 2/2013 | Sprigg et al. |
| 2013/0077774 A1 | 3/2013 | Lynch, III |
| 2013/0082945 A1 | 4/2013 | Jo |
| 2013/0169573 A1 | 7/2013 | Nishio |
| 2015/0153911 A1 | 6/2015 | Seymour et al. |

FOREIGN PATENT DOCUMENTS

| | | | |
|---|---|---|---|
| JP | 2001-356878 A | 12/2001 | |
| JP | 2005-276120 A | 10/2005 | |
| JP | 2009-110378 A | 5/2009 | |
| JP | 2009-140018 A | 6/2009 | |
| JP | 2009-181244 A | 8/2009 | |
| JP | 2010-009335 A | 1/2010 | |
| JP | 2010-211631 A | 9/2010 | |
| JP | 2011-28403 A | 2/2011 | |
| JP | 2011-76621 A | 4/2011 | |
| JP | 2011-232899 A | 11/2011 | |
| JP | 2011-253273 A | 12/2011 | |
| WO | 01/75597 A2 | 10/2001 | |
| WO | 2010/044151 A1 | 4/2010 | |
| WO | 2011/130839 A1 | 10/2011 | |

OTHER PUBLICATIONS

Notice of Allowance received for Korean Patent Application No. 10-2012-0133650, dated Oct. 24, 2014, 2 pages (Official Copy only).
Office Action received for Korean Patent Application No. 10-2014-0076290, dated Aug. 20, 2015, 4 pages (1 page of English Translation & 3 pages of Official Copy).
Extended European Search Report (includes Partial European Search Report and European Search Opinion) received for European Patent Application No. 12188713.7, dated Jul. 30, 2015, 11 pages.
Non-Final Office Action received for U.S. Appl. No. 13/436,433, dated Oct. 24, 2013, 14 pages.
Notice of Allowance received for U.S. Appl. No. 13/436,433, dated Apr. 11, 2014, 16 pages.
Non-Final Office Action received for U.S. Appl. No. 13/689,708, dated Nov. 6, 2014, 12 pages.
Notice of Allowance received for U.S. Appl. No. 13/689,708, dated Mar. 16, 2015, 8 pages.
Notice of Allowance received for U.S. Appl. No. 14/183,395, dated Nov. 12, 2015, 8 pages.
Office Action received for Chinese Patent Application No. 201210436438.5, dated Jun. 24, 2015, 15 pages (3 pages of English Translation and 12 pages of Official copy).
Notice of Allowance received for Japanese Patent Application No. 2012224547, dated Sep. 29, 2015, 5 pages.
Office Action received for Japanese Patent Application No. 2012-224547, dated Jan. 24, 2014, 7 pages (4 pages of English translation and 3 pages of Official copy).
Office Action received for Japanese Patent Application No. 2012-224547, dated Oct. 31, 2014, 7 pages (3 pages of English translation and 3 pages of Official copy).
Notice of Allowance received for Australian Patent Application No. 2012238304, dated Jan. 12, 2015, 2 pages.
Office Action received for Australian Patent Application No. 2012238304, dated Mar. 14, 2014, 4 pages.
Office Action Received for Australian Patent Application No. 2012238304, dated Sep. 25, 2013, 5 pages.
Kiosk Software for iPad, available at <http://ecrisper.com/ipad.htm>, retrieved on Nov. 11, 2011, 7 pages.
Kiosk Software for Mac, available at <http://ecrisper.com/>, retrieved on Nov. 11, 2011, 3 pages.
Fortres 101 6.5, available at <http://www.fortresgrand.com/products/fl01/fl01.htm>, retrieved on Nov. 7, 2011, 4 pages.
Hulu Plus; What's New in Version 2.7.1, itunes.apple.com, updated Mar. 18, 2013, https://itunes.apple.com/us/app/hulu-plus/id376510438?mt=8, 2 pages.
Configuring Your Ownn Kiosk Machine, available at http://teamtutorials.com/windows-tutorials/configuring-your-own-kiosk-machine#.TrgZ9WAcvpA, 30 pages.
International Search Report and Written Opinion received for PCT Patent Application No. PCT/US2014/018907, dated Jul. 2, 2014, 13 pages.
Internet Explorer 7's Kiosk Mode, available at http://samanathon.com/internet-explorer-7s-kiosk-mode/, 16 pages.
International Preliminary Report on Patentability received for PCT Patent Application No. PCT/US2014/018907, dated Sep. 24, 2015, 10 pages.
Notice of Allowance received for Korean Patent Application No. 10-2014-0076290, dated Feb. 23, 2016, 3 pages (1 page English Translation and 2 pages of Official Copy).
Office Action received for Chinese Patent Application No. 201210436438.5, dated Jan. 28, 2016, 27 pages (15 pages of English Translation and 12 pages of Official Copy).
Notice of Allowance received for Chinese Patent Application No. 201210436438.5, dated Mar. 2, 2017, 2 pages (1 page of English Translation and 1 page of Official Copy).
Notice of Allowance received for U.S. Appl. No. 14/329,704, dated Mar. 7, 2017, 16 pages.
Notice of Allowance received for U.S. Appl. No. 14/329,704, dated Apr. 21, 2017, 2 pages.

(56) References Cited

OTHER PUBLICATIONS

Non Final Office Action received for U.S. Appl. No. 14/329,704, dated Jul. 28, 2016, 22 pages.
Office Action received for Australian Patent Application No. 2015202073, dated Jul. 29, 2016, 3 pages.
Office Action received for Chinese Patent Application No. 201210436438.5, dated Aug. 23, 2016, 6 pages (3 pages of English Translation and 3 pages of Official Copy).
Office Action received for Japanese Patent Application No. 2015-209145, dated Sep. 11, 2017, 10 pages (5 pages of English translation and 5 pages of Official Copy).
Notice of Allowance received for Japanese Patent Application No. 2015-209145, dated Apr. 2, 2018, 4 pages (1 page of English Translation and 3 pages of Official copy).
Office Action received for European Patent Application No. 12188713.7, dated Nov. 15, 2016, 9 pages.
Office Action received for Japanese Patent Application No. 2015-209145, dated Nov. 7, 2016, 5 pages (2 pages of English Translation and 3 pages of Official Copy).
Decision to Grant received for European Patent Application No. 12188713.7, dated Dec. 6, 2018, 2 pages.
Intention to Grant received for European Patent Application No. 12188713.7, dated Jul. 9, 2018, 11 pages.

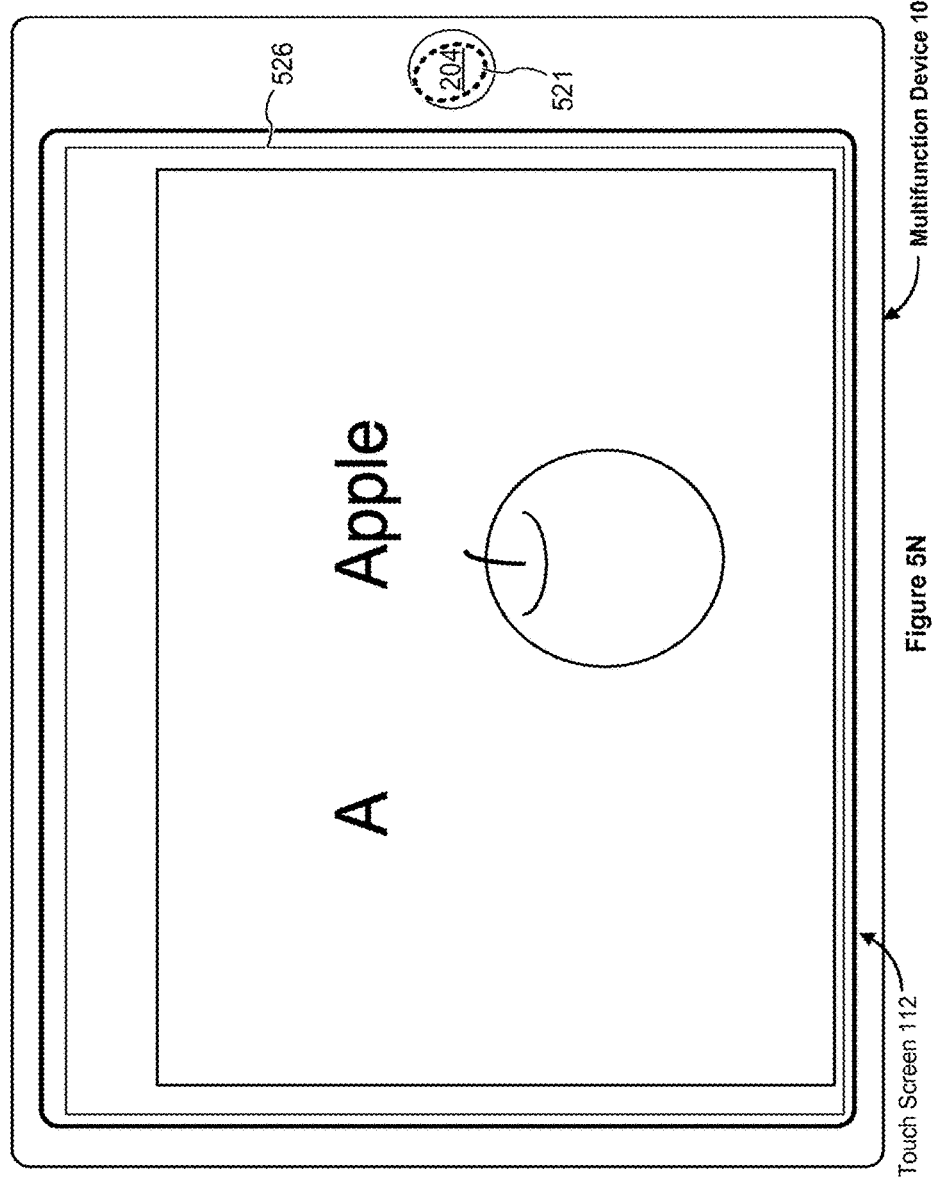

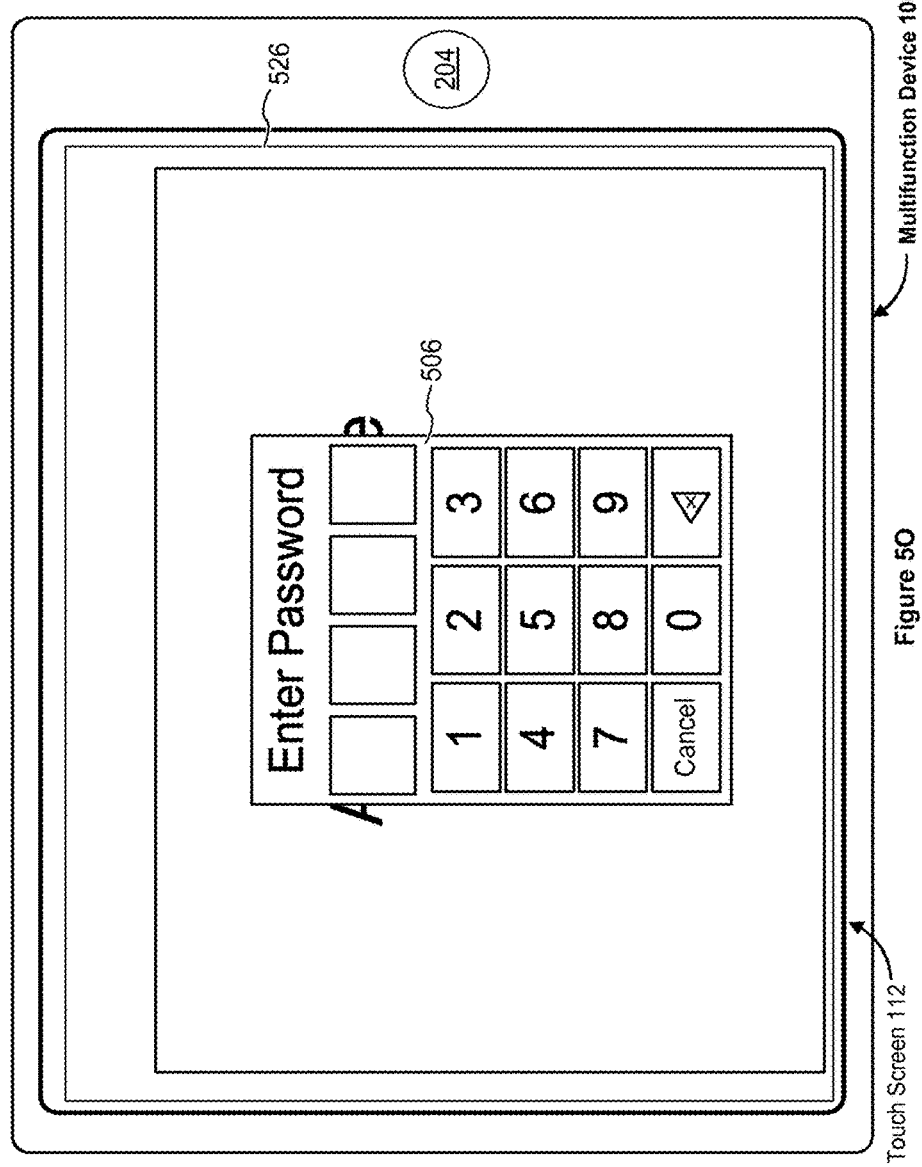

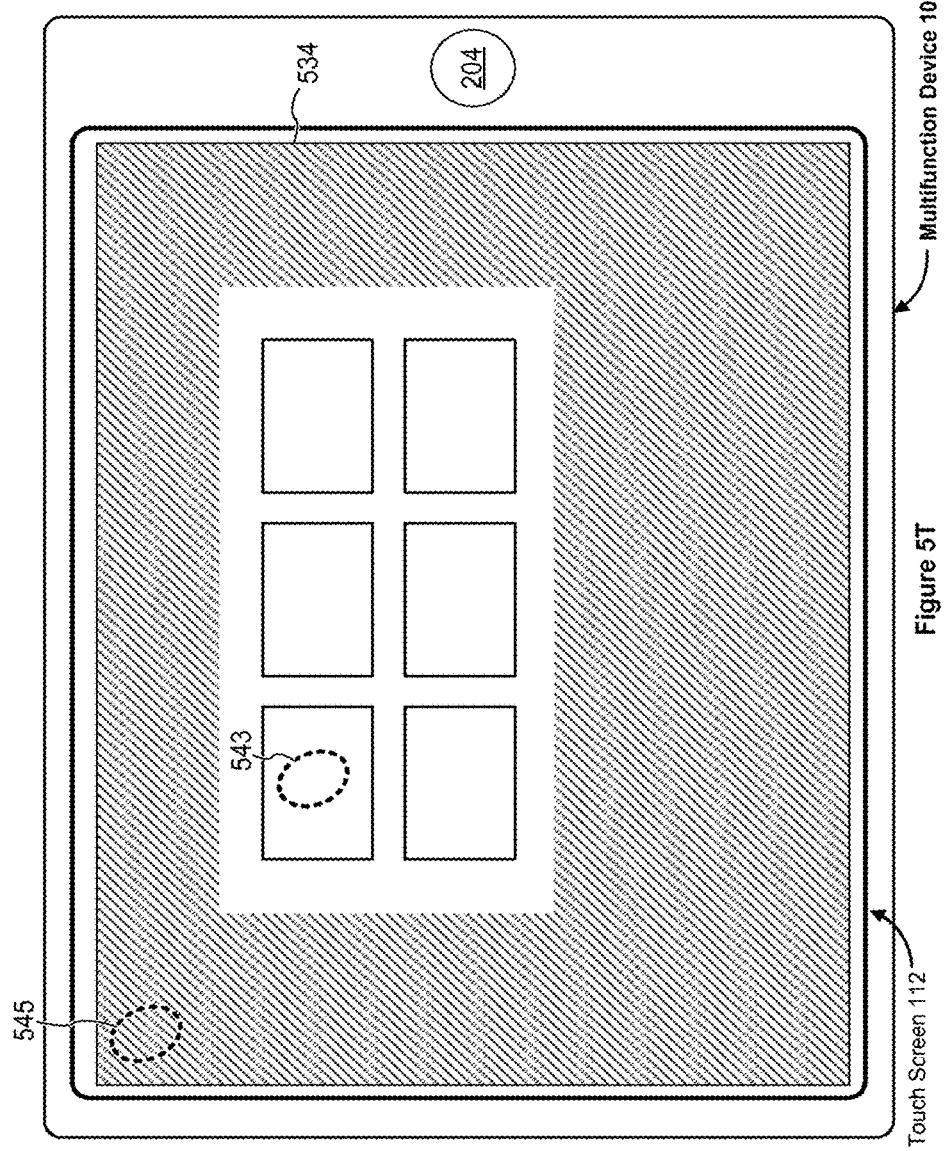

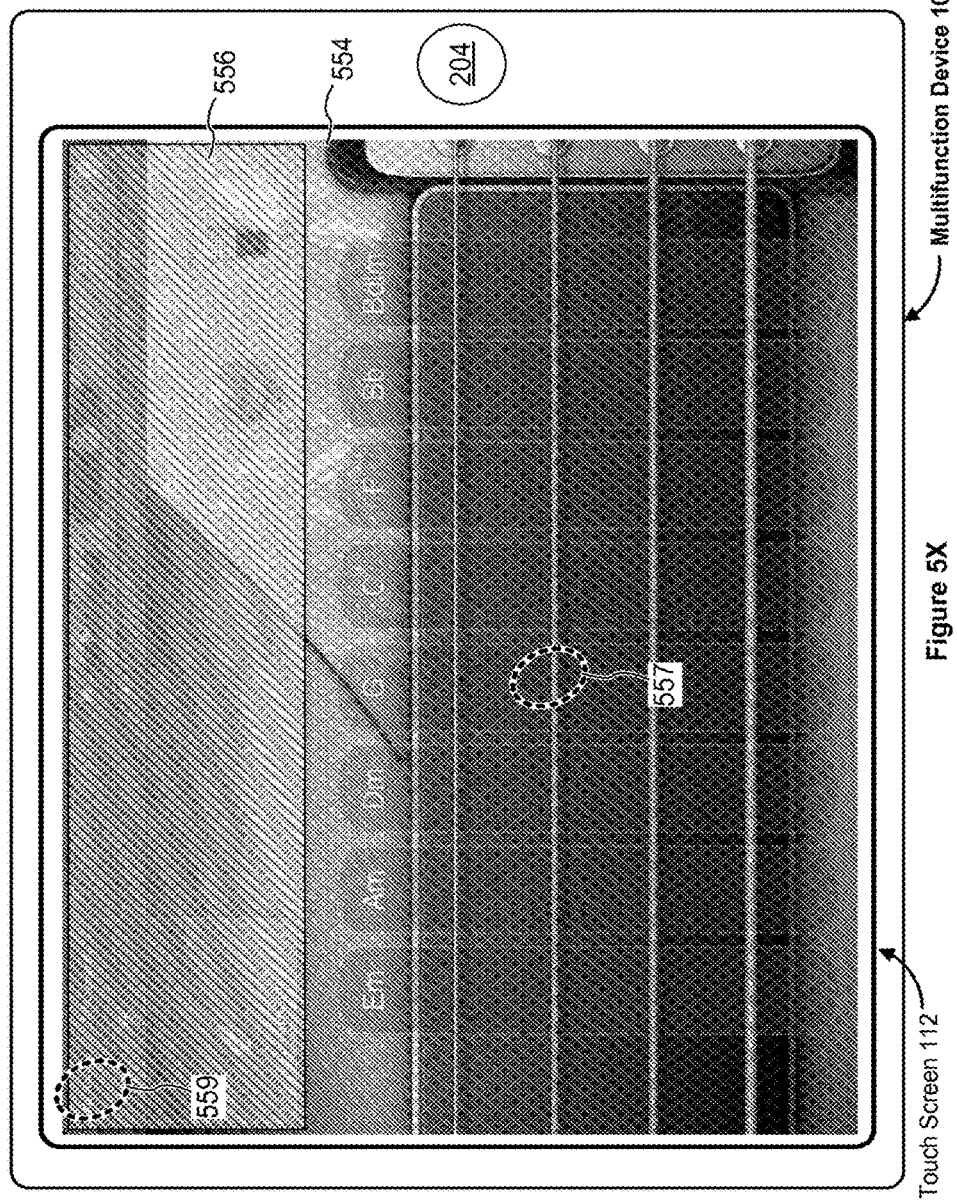

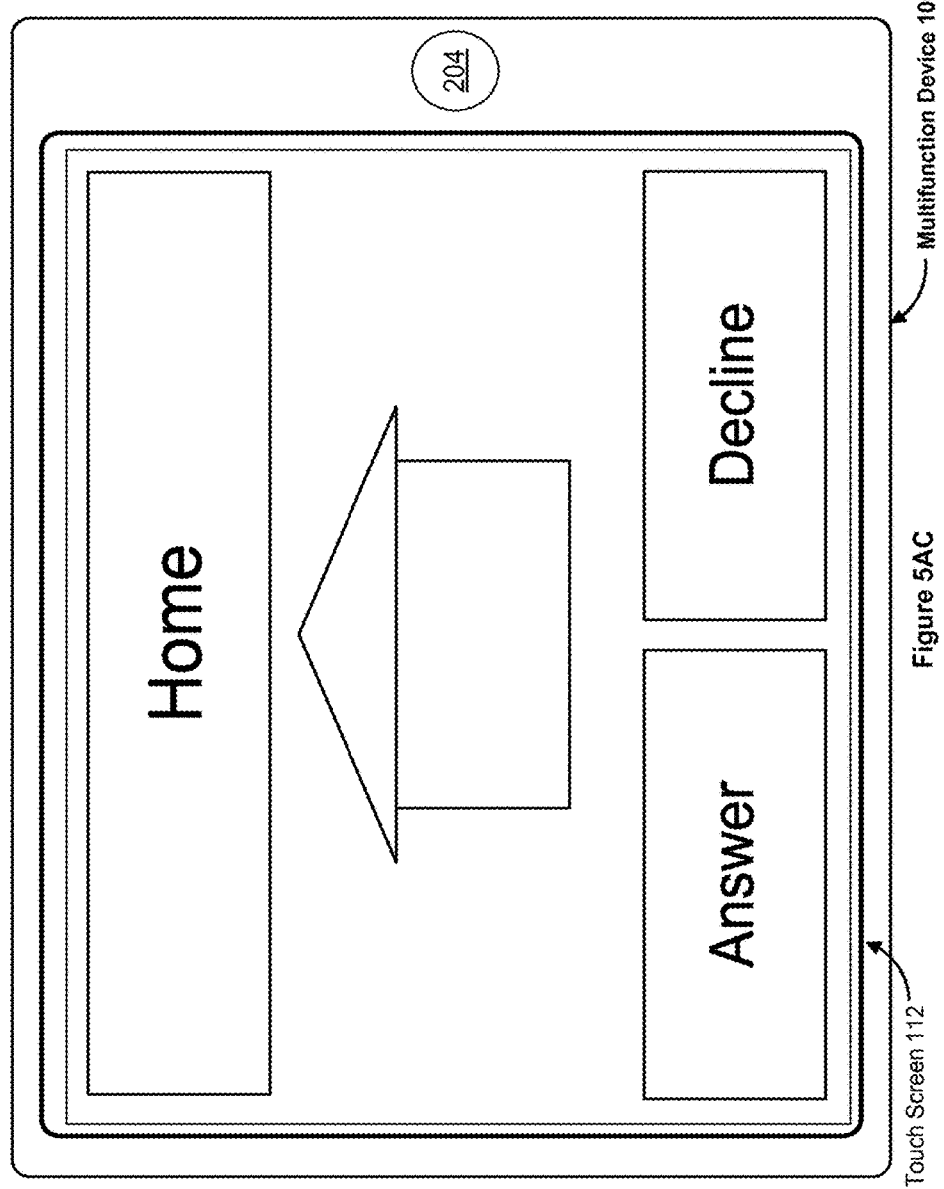

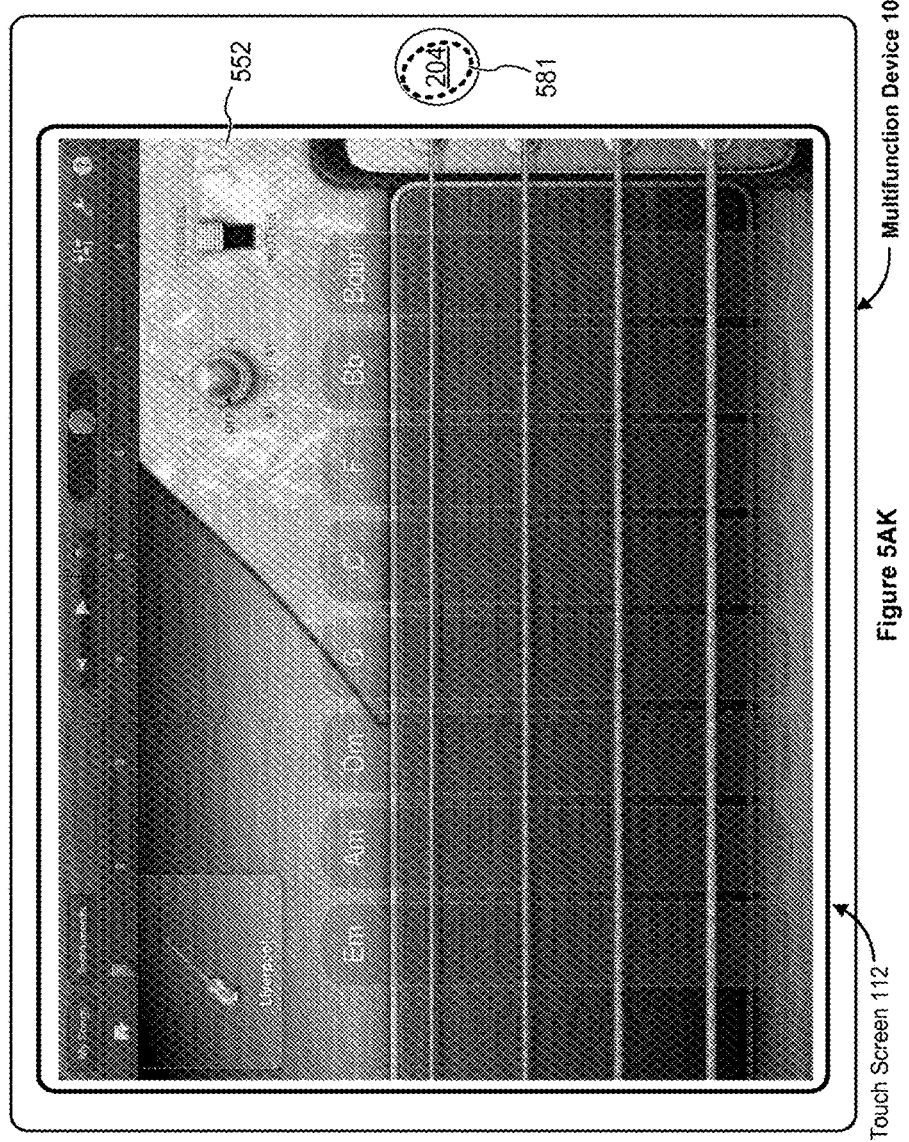

1030 In response to detecting the second input, exit the interaction configuration mode for the first application and enter the restricted interaction mode for the first application that is distinct from the unrestricted interaction mode for the first application. The corresponding feature is restricted in accordance with the setting in the first application restriction control user interface object for the first application.

1032 Subsequent to entering the restricted interaction mode for the first application, exit from the restricted interaction mode for the first application and enter an interaction configuration mode for a second application. While in the interaction configuration mode for the second application, concurrently display on the display: a second user interface that includes a plurality of user interface objects for the second application, one or more interaction control user interface objects, and an application restriction controls display user interface object for the second application. Detect a third gesture on the touch-sensitive surface at a location that corresponds to the application restriction controls display user interface object for the second application; and, in response to detecting the third gesture that corresponds to the application restriction controls display user interface object for the second application, display application restriction control user interface objects for the second application. The application restriction control user interface objects for the second application are distinct from the application restriction control user interface objects for the first application.

1034 Subsequent to entering the restricted interaction mode for the first application, exit from the restricted interaction mode for the first application and enter the interaction configuration mode for a third application. While in the interaction configuration mode for the third application, concurrently display on the display: a third user interface that includes a plurality of user interface objects for the third application, and one or more interaction control user interface objects, without displaying an application restriction controls display user interface object for the third application.

Figure 10C

1006 Concurrently display on the display: a first user interface that includes a plurality of user interface objects for the first application, one or more interaction control user interface objects, and an application restriction controls display user interface object for the first application 1036 The interaction control user interface objects include at least one of: a touch interaction control user interface object, which, when selected, causes the electronic device to ignore touch inputs on the touch-sensitive surface while in the restricted interaction mode; a rotate interaction control user interface object, which, when selected, causes the electronic device to ignore rotation of the electronic device while in the restricted interaction mode; a buttons interaction control user interface object, which, when selected, causes the electronic device to ignore one or more inputs on one or more hardware buttons of the electronic device; a shake interaction control user interface object, which, when selected, causes the electronic device to ignore shaking of the electronic device while in the restricted interaction mode; and a motion interaction control user interface object, which, when selected, causes the electronic device to ignore a movement of the electronic device while in the restricted interaction mode 1038 While displaying the first user interface in the interaction configuration mode for the first application: detect one or more gesture inputs on the touch-sensitive surface at a location that corresponds to the first user interface; for a respective gesture input of the one or more gesture inputs, determine whether one or more user interface objects of the plurality of user interface objects for the first application correspond to the respective gesture input; and visually distinguish a first set of user interface objects, in the plurality of user interface objects for the first application, that correspond to the one or more gesture inputs from a second set of user interface objects, in the plurality of user interface objects for the first application, that do not correspond to the one or more gesture inputs 1040 Determining whether one or more user interface objects of the plurality of user interface objects for the first application correspond to the respective gesture input includes: determining a predefined shape from a plurality of predefined shapes, a size of the predefined shape, and a location of the predefined shape that correspond to the respective gesture input; and determining whether the one or more user interface objects of the plurality of user interface objects for the first application correspond to the determined predefined shape with the determined size at the determined location

Figure 10D

DEVICE, METHOD, AND GRAPHICAL USER INTERFACE FOR CONFIGURING AND IMPLEMENTING RESTRICTED INTERACTIONS FOR APPLICATIONS

RELATED APPLICATIONS

This application claims priority to U.S. Provisional Patent Application No. 61/784,014, filed Mar. 14, 2013 and is a continuation-in-part of U.S. patent application Ser. No. 13/689,708, filed Nov. 29, 2012, entitled "Device, Method, and Graphical User Interface for Configuring and Implementing Restricted Interactions with a User Interface," which claims priority to U.S. Provisional Patent Application Ser. No. 61/657,873, filed Jun. 10, 2012, and is a continuation-in-part of U.S. patent application Ser. No. 13/436,433, filed Mar. 30, 2012, entitled "Device, Method, and Graphical User Interface for Configuring Restricted Interaction with a User Interface," which claims priority to U.S. Provisional Patent Application Ser. No. 61/581,615, filed Dec. 29, 2011, all of which are incorporated by reference herein in their entirety.

TECHNICAL FIELD

This relates generally to electronic devices with touch-sensitive surfaces, including but not limited to electronic devices with touch-sensitive surfaces that display user interfaces for applications.

BACKGROUND

The use of touch-sensitive surfaces as input devices for computers and other electronic computing devices has increased significantly in recent years. Exemplary touch-sensitive surfaces include touch pads and touch screen displays. Such surfaces are widely used to manipulate user interface objects on a display.

At times, it may be desirable to restrict interactions with an application on an electronic device. For example, a parent or teacher may want to disable certain icons on a touch screen, hardware buttons, sensors, and/or other parts of the user interface for a particular application so that a young child can use the particular application on the device without accidentally accessing other applications and system functions or deleting files. Similarly, a caregiver for a person with a cognitive impairment (e.g., autism) may want to restrict interaction with the device by disabling and/or hiding, for a software application, certain icons on a touch screen, hardware buttons, sensors, and/or other parts of the user interface that would distract the person with the cognitive impairment from the task at hand. As another example, a person may want to configure the device for a kiosk mode that restricts access to applications and system functions on the device.

But existing methods for configuring a software application for restricted interaction are cumbersome and inefficient. A user typically has to navigate through multiple menus and/or screens to configure the restrictions. In addition, existing methods take longer than necessary to configure the device, thereby wasting energy. This latter consideration is particularly important in battery-operated devices.

In addition, while in a restricted interaction mode, the device typically does not inform users of incoming voice or video calls, which may cause a user (e.g., a parent, caregiver, or even a child) to miss an important call. This problem also needs to be addressed.

SUMMARY

Accordingly, there is a need for electronic devices with faster, more efficient methods and interfaces for configuring restricted interaction with software applications. Such methods and interfaces may complement or replace conventional methods for configuring restricted interactions for software applications. Such methods and interfaces reduce the cognitive burden on a user while configuring the device and produce a more efficient human-machine interface. For battery-operated devices, such methods and interfaces conserve power and increase the time between battery charges.

In addition, there is a need for electronic devices with methods and interfaces for signaling to a user, while the device is in a restricted interaction mode, that there is an important incoming call.

The above deficiencies and other problems associated with user interfaces for electronic devices with touch-sensitive surfaces are reduced or eliminated by the disclosed devices. In some embodiments, the device is a desktop computer. In some embodiments, the device is portable (e.g., a notebook computer, tablet computer, or handheld device). In some embodiments, the device has a touchpad. In some embodiments, the device has a touch-sensitive display (also known as a "touch screen" or "touch screen display"). In some embodiments, the device has a graphical user interface (GUI), one or more processors, memory and one or more modules, programs or sets of instructions stored in the memory for performing multiple functions. In some embodiments, the user interacts with the GUI primarily through finger contacts and gestures on the touch-sensitive surface. In some embodiments, the functions may include image editing, drawing, presenting, word processing, website creating, disk authoring, spreadsheet making, game playing, telephoning, video conferencing, e-mailing, instant messaging, workout support, digital photographing, digital videoing, web browsing, digital music playing, and/or digital video playing. Executable instructions for performing these functions may be included in a non-transitory computer readable storage medium or other computer program product configured for execution by one or more processors.

In accordance with some embodiments, a method is performed at an electronic device with a display and a touch-sensitive surface. The method includes, while in an unrestricted interaction mode for a first application, detecting a first input; and in response to detecting the first input, entering an interaction configuration mode for the first application that is distinct from the unrestricted interaction mode for the first application. The method also includes, while in the interaction configuration mode for the first application, concurrently displaying on the display: a first user interface that includes a plurality of user interface objects for the first application, one or more interaction control user interface objects, and an application restriction controls display user interface object for the first application; detecting a first gesture on the touch-sensitive surface at a location that corresponds to the application restriction controls display user interface object for the first application; and in response to detecting the first gesture at the location that corresponds to the application restriction controls display user interface object for the first application, displaying application restriction control user interface objects for the first application. A respective application restriction control user interface object for the first application indicates whether a corresponding feature of the first application is configured to be enabled while the first application is in a restricted interaction mode. The method further includes, while displaying the application restriction control user interface objects for the first application, detecting a second gesture on the touch-sensitive surface at a location that corresponds to a first application restriction control user interface object for the first application; in response to detecting the second gesture, changing display of a setting in the first application restriction control user interface object for the first application to indicate a change to whether a corresponding feature is configured to be enabled while the first application is in the restricted interaction mode; detecting a second input; and, in response to detecting the second input, exiting the interaction configuration mode for the first application and entering the restricted interaction mode for the first application that is distinct from the unrestricted interaction mode for the first application. The corresponding feature is restricted in accordance with the setting in the first application restriction control user interface object for the first application.

In accordance with some embodiments, a method is performed at an electronic device with a display and a touch-sensitive surface. The method includes, while in an unrestricted interaction mode, detecting a first input; and, in response to detecting the first input, entering an interaction configuration mode that is distinct from the unrestricted interaction mode. The method also includes, while in the interaction configuration mode: displaying on the display a first user interface that includes a plurality of user interface objects; while displaying the first user interface, detecting one or more gesture inputs on the touch-sensitive surface; for a respective gesture input detected on the touch-sensitive surface, determining whether one or more user interface objects of the plurality of user interface objects correspond to the respective gesture input; and visually distinguishing a first set of user interface objects in the plurality of user interface objects that correspond to the detected one or more gesture inputs from a second set of user interface objects in the plurality of user interface objects that do not correspond to the detected one or more gesture inputs. The method further includes detecting a second input; and, in response to detecting the second input, exiting the interaction configuration mode and entering a restricted interaction mode that is distinct from the unrestricted interaction mode.

In accordance with some embodiments, an electronic device includes a display, a touch-sensitive surface, one or more processors, memory, and one or more programs; the one or more programs are stored in the memory and configured to be executed by the one or more processors and the one or more programs include instructions for performing the operations of any of the methods described above. In accordance with some embodiments, a graphical user interface on an electronic device with a display, a touch-sensitive surface, a memory, and one or more processors to execute one or more programs stored in the memory includes one or more of the elements displayed in any of the methods described above, which are updated in response to inputs, as described in any of the methods above. In accordance with some embodiments, a computer readable storage medium has stored therein instructions, which, when executed by an electronic device with a display, a touch-sensitive surface, cause the device to perform the operations of any of the methods described above. In accordance with some embodiments, an electronic device includes: a display, a touch-sensitive surface; and means for performing the operations of any of the methods described above. In accordance with some embodiments, an information processing apparatus, for use in an electronic device with a display and a touch-sensitive surface, includes means for performing the operations of any of the methods described above.

In accordance with some embodiments, an electronic device includes a display unit configured to display one or more user interfaces; a touch-sensitive surface unit configured to, while in an unrestricted interaction mode for a first application, detect a first input; and a processing unit coupled to the display unit and the touch-sensitive surface unit. The processing unit is configured to, in response to detecting the first input, enter an interaction configuration mode for the first application that is distinct from the unrestricted interaction mode for the first application; and, while in the interaction configuration mode for the first application, enable concurrent display of: a first user interface that includes a plurality of user interface objects for the first application, one or more interaction control user interface objects, and an application restriction controls display user interface object for the first application. The processing unit is configured to detect a first gesture on the touch-sensitive surface unit at a location that corresponds to the application restriction controls display user interface object for the first application; and, in response to detecting the first gesture at the location that corresponds to the application restriction controls display user interface object for the first application, enable display of application restriction control user interface objects for the first application, wherein a respective application restriction control user interface object for the first application indicates whether a corresponding feature of the first application is configured to be enabled while the first application is in a restricted interaction mode. The processing unit is configured to, while enabling display of the application restriction control user interface objects for the first application, detect a second gesture on the touch-sensitive surface unit at a location that corresponds to a first application restriction control user interface object for the first application; in response to detecting the second gesture, enable a change to display of a setting in the first application restriction control user interface object for the first application to indicate a change to whether a corresponding feature is configured to be enabled while the first application is in the restricted interaction mode; detect a second input; and, in response to detecting the second input, exit the interaction configuration mode for the first application and enter the restricted interaction mode for the first application that is distinct from the unrestricted interaction mode for the first application, wherein the corresponding feature is restricted in accordance with the setting in the first application restriction control user interface object for the first application.

Thus, electronic devices with displays and touch-sensitive surfaces are provided with faster, more efficient methods and interfaces for configuring restricted interaction with software applications, thereby increasing the effectiveness, efficiency, and user satisfaction with such devices. Such methods and interfaces may complement or replace conventional methods for configuring restricted interaction with software applications. In addition, electronic devices are provided with methods and interfaces to signal important incoming calls while operating in a restricted interaction mode.

BRIEF DESCRIPTION OF THE DRAWINGS

For a better understanding of the aforementioned embodiments of the invention as well as additional embodiments thereof, reference should be made to the Description of Embodiments below, in conjunction with the following drawings in which like reference numerals refer to corresponding parts throughout the figures.

FIGS. 10A-10F are flow diagrams illustrating a method of configuring restricted interaction with a software application in accordance with some embodiments.

DESCRIPTION OF EMBODIMENTS

At times, it may be desirable to restrict interactions with an application on an electronic device. Certain icons on a touch screen, hardware buttons, sensors, and/or other parts of the user interface may need to be disabled. But existing methods for configuring an application for restricted interaction are cumbersome and inefficient. In the embodiments described below, an improved method for configuring an application for restricted interaction is achieved by displaying the application in an interaction configuration mode, where one or more features of the application can be selected for deactivation based on one or more simple touch inputs. In addition, other parts of the user interface, such as responses to device rotation, shaking, and motion, can also be disabled. While in a restricted interaction mode, the one or more features of the application selected in the interaction configuration mode are deactivated (e.g., disabled or otherwise prevented from being activated) so that the user cannot interact with the deactivated features. This method provides an efficient, intuitive process for configuring restricted interaction with an application, thereby eliminating the need for extra, separate steps to configure the user interface.

In addition, while in the restricted interaction mode, the device typically does not inform users of incoming voice or video calls, which may cause a user (e.g., a parent, caregiver, or even a child) to miss an important call. This problem can be solved by having the electronic device alert a user to incoming calls that meet predefined signaling criteria. For example, the device provides an audible and/or visual signal if the call is coming from a number on a predefined "whitelist." Alternatively, if multiple calls are received from the same number in a predefined time period (which indicates an urgent call), the device provides an audible and/or visual signal that there is an incoming call.

Figure 2:
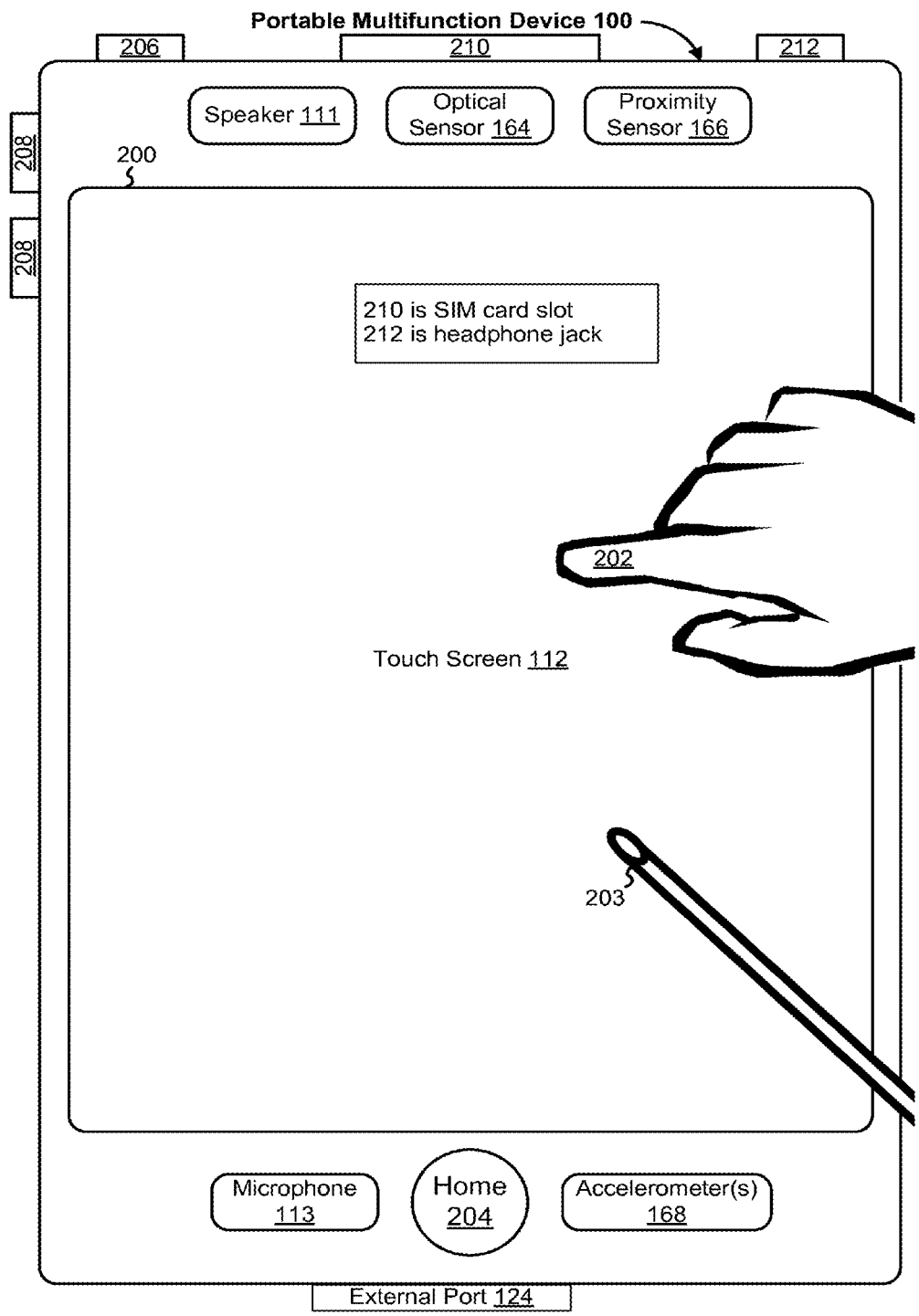
FIG. 2 illustrates a portable multifunction device having a touch screen in accordance with some embodiments.
Figure 3:
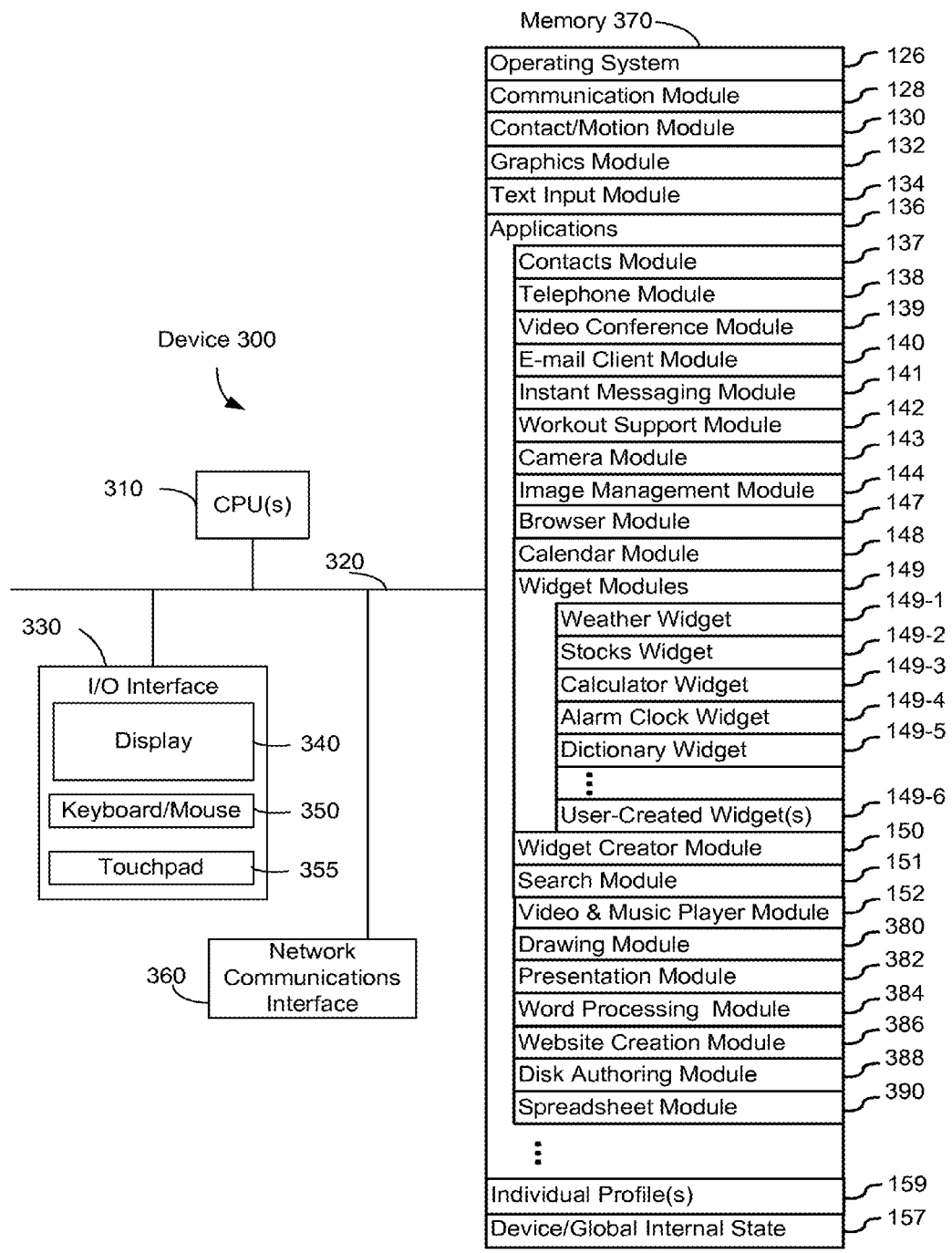
FIG. 3 is a block diagram of an exemplary multifunction device with a display and a touch-sensitive surface in accordance with some embodiments.
Figure 4A:
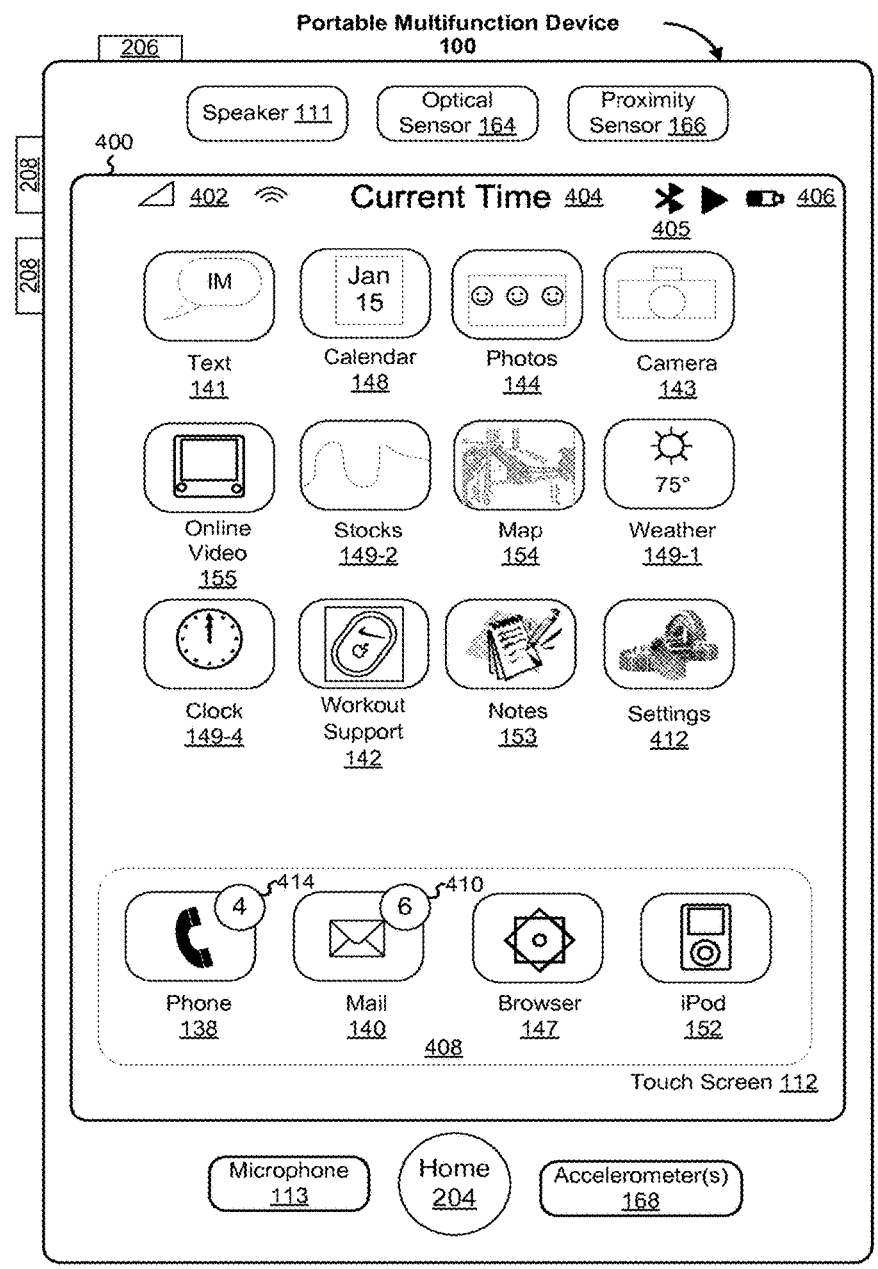
FIG. 4A illustrates an exemplary user interface for a menu of applications on a portable multifunction device in accordance with some embodiments.
Figure 4B:
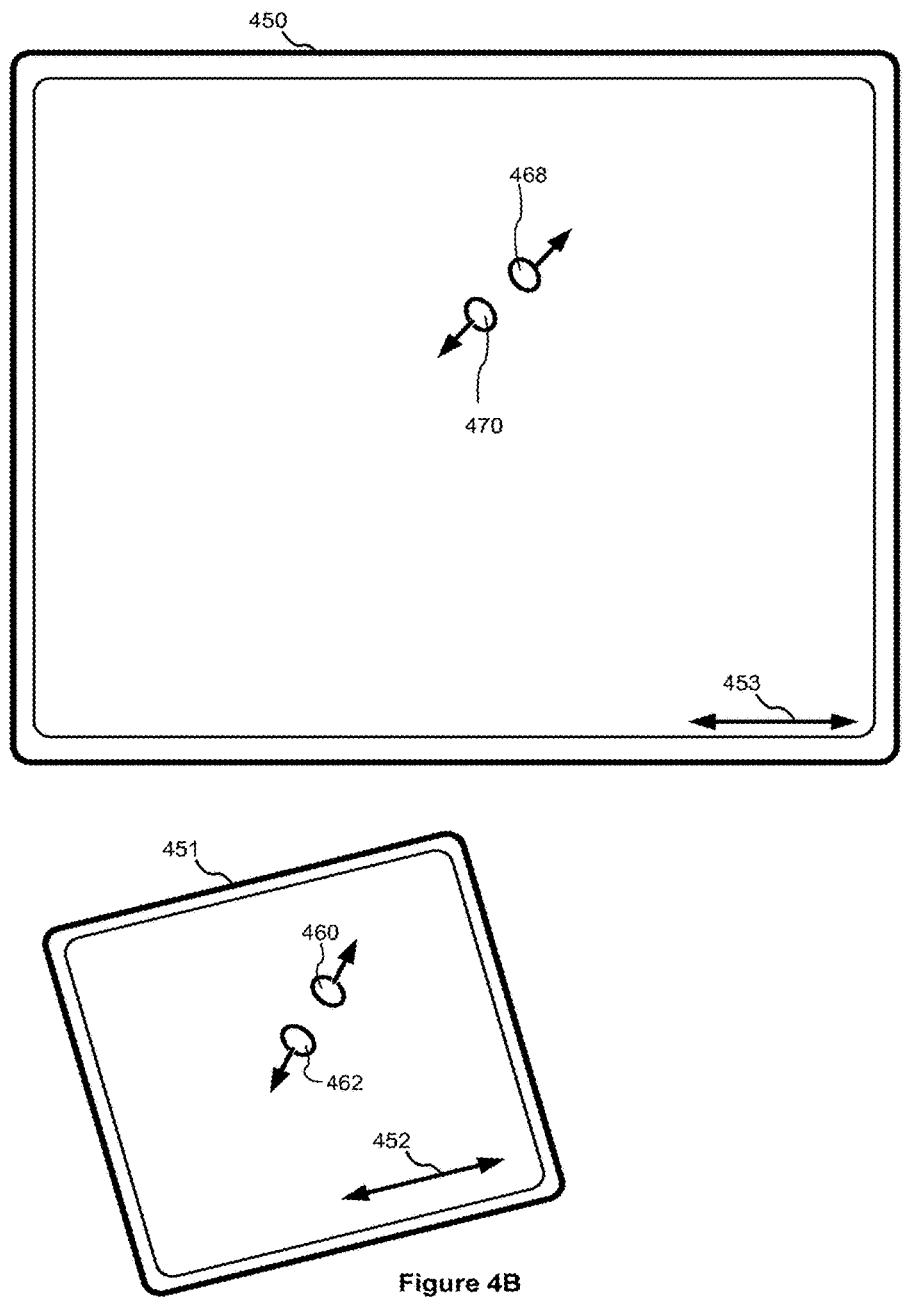
FIG. 4B illustrates an exemplary user interface for a multifunction device with a touch-sensitive surface that is separate from the display in accordance with some embodiments.
Figure 5A:
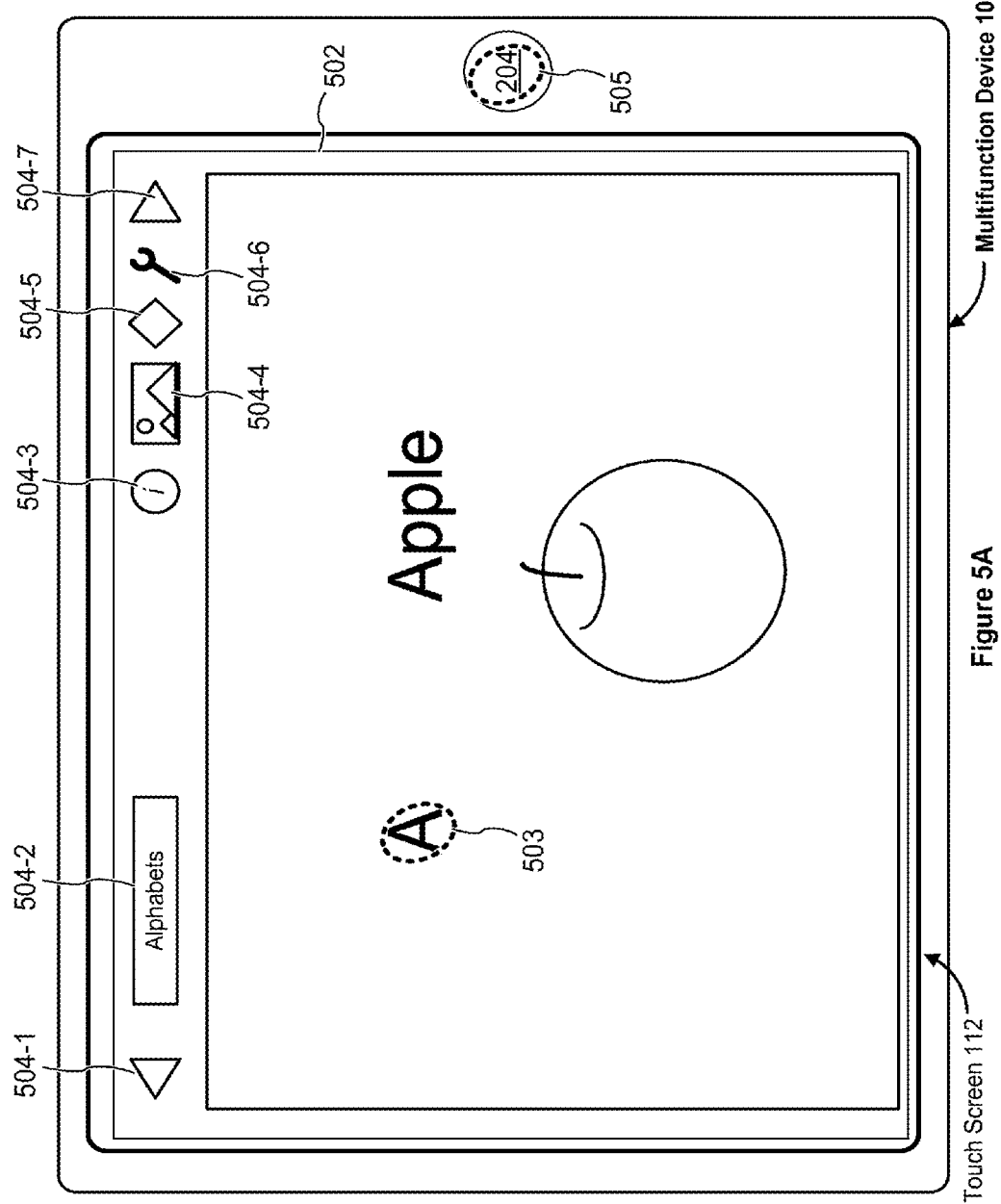
FIGS. 5A-5AM illustrate exemplary user interfaces for configuring restricted interaction with software applications and operating in a restricted interaction mode in accordance with some embodiments.
Figure 8:
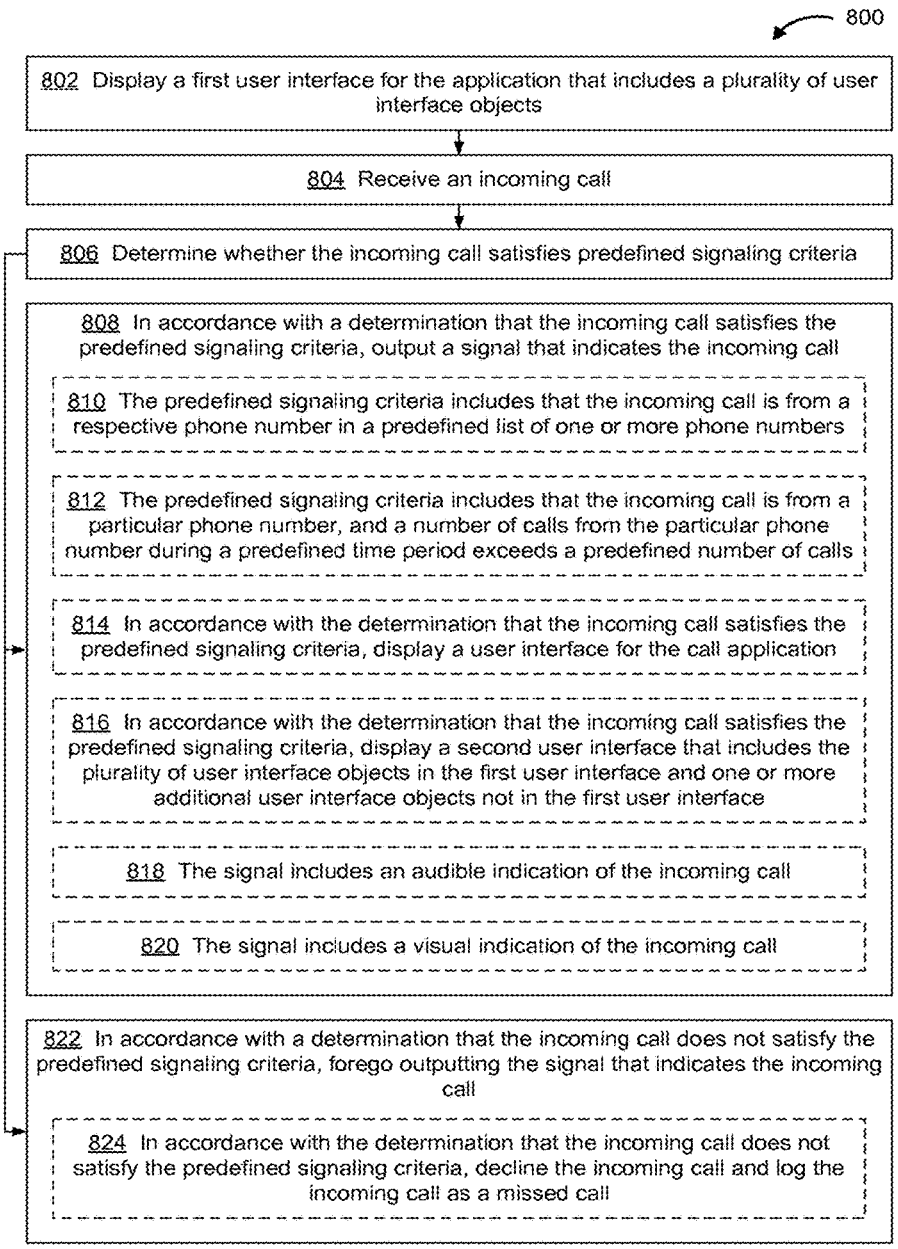
FIG. 8 is a flow diagram illustrating a method of signaling an incoming call in a restricted interaction mode in accordance with some embodiments.

Below, FIGS. 1A-1B, 2, and 3 provide a description of exemplary devices. FIGS. 4A-4B and 5A-5AM illustrate exemplary user interfaces for configuring restricted interaction with user interfaces. FIGS. 6A-6E are flow diagrams illustrating a method of configuring restricted interaction with a user interface. FIG. 8 is a flow diagram illustrating a method of signaling an incoming call in a restricted interaction mode. FIGS. 10A-10F are flow diagrams illustrating a method of configuring restricted interaction for an application. The user interfaces in FIGS. 5A-5AM are used to illustrate the processes in FIGS. 6A-6E, FIG. 8, and FIGS. 10A-10F.

Exemplary Devices

Reference will now be made in detail to embodiments, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details. In other instances, well-known methods, procedures, components, circuits, and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first user interface could be termed a second user interface, and, similarly, a second user interface could be termed a first user interface, without departing from the scope of the present invention. The first user interface and the second user interface are both user interfaces, but they are not the same user interface. In another example, a first application restriction control user interface object could be termed a second application restriction control user interface object, and, similarly, a second application restriction control user interface object could be termed a first application restriction control user interface object. The first application restriction control user interface object and the second application restriction control user interface object are both application restriction control user interface objects, but they are not the same application restriction control user interface object.

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, Calif. Other portable electronic devices, such as laptops or tablet computers with touch-sensitive surfaces (e.g., touch screen displays and/or touch pads), may also be used. It should also be understood that, in some embodiments, the device is not a portable communications device, but is a desktop computer with a touch-sensitive surface (e.g., a touch screen display and/or a touch pad).

In the discussion that follows, an electronic device that includes a display and a touch-sensitive surface is described. It should be understood, however, that the electronic device may include one or more other physical user-interface devices, such as a physical keyboard, a mouse and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that may be executed on the device may use at least one common physical user-interface device, such as the touch-sensitive surface. One or more functions of the touch-sensitive surface as well as corresponding information displayed on the device may be adjusted and/or varied from one application to the next and/or within a respective application. In this way, a common physical architecture (such as the touch-sensitive surface) of the device may support the variety of applications with user interfaces that are intuitive and transparent to the user.

Figure 1A:
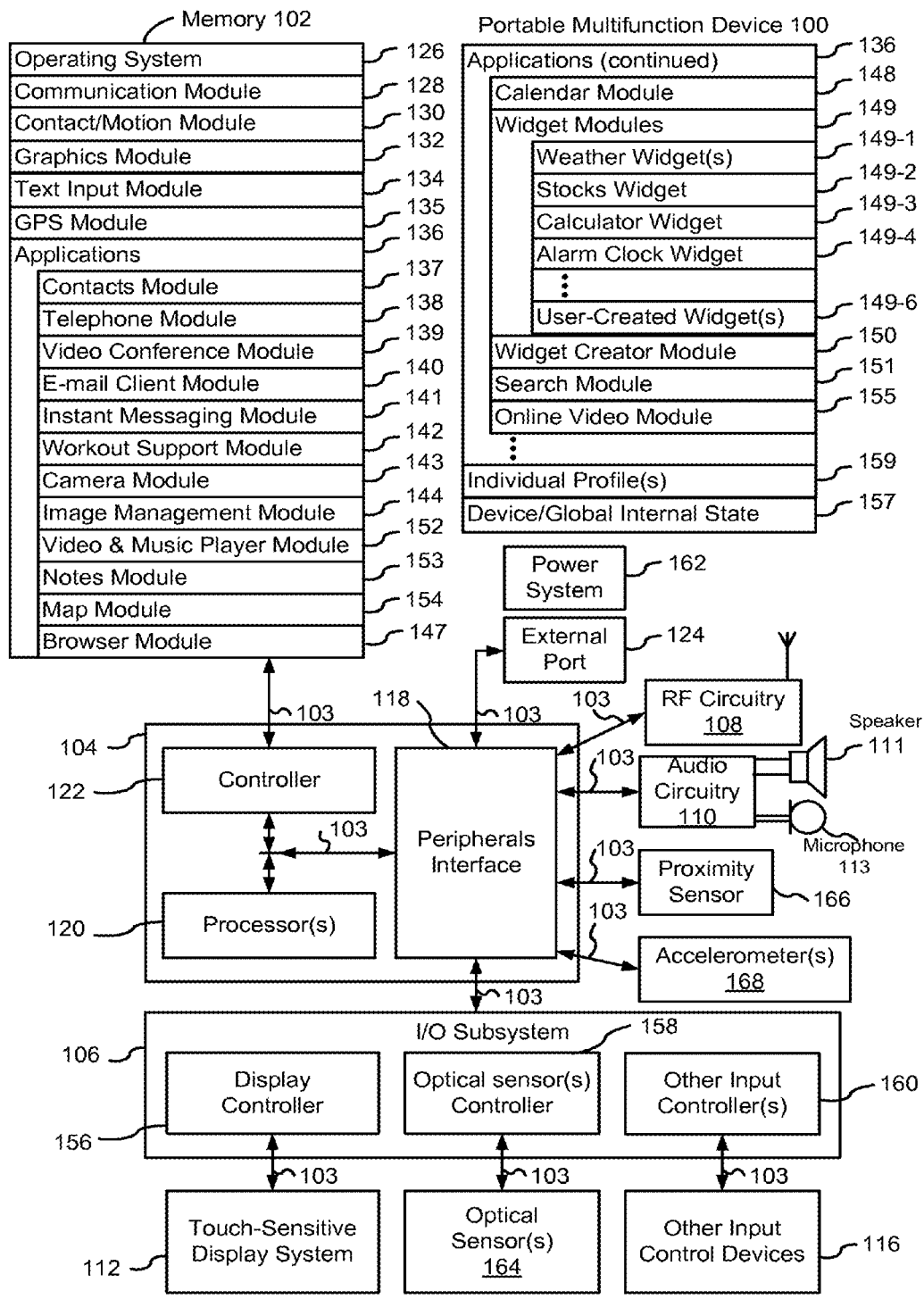
FIG. 1A is a block diagram illustrating a portable multifunction device with a touch-sensitive display in accordance with some embodiments.

Attention is now directed toward embodiments of portable devices with touch-sensitive displays. FIG. 1A is a block diagram illustrating portable multifunction device 100 with touch-sensitive displays 112 in accordance with some embodiments. Touch-sensitive display 112 is sometimes called a "touch screen" for convenience, and may also be known as or called a touch-sensitive display system. Device 100 may include memory 102 (which may include one or more computer readable storage mediums), memory controller 122, one or more processing units (CPU's) 120, peripherals interface 118, RF circuitry 108, audio circuitry 110, speaker 111, microphone 113, input/output (I/O) subsystem 106, other input or control devices 116, and external port 124. Device 100 may include one or more optical sensors 164. These components may communicate over one or more communication buses or signal lines 103.

It should be appreciated that device 100 is only one example of a portable multifunction device, and that device 100 may have more or fewer components than shown, may combine two or more components, or may have a different configuration or arrangement of the components. The various components shown in FIG. 1A may be implemented in hardware, software, or a combination of both hardware and software, including one or more signal processing and/or application specific integrated circuits.

Memory 102 may include high-speed random access memory and may also include non-volatile memory, such as one or more magnetic disk storage devices, flash memory devices, or other non-volatile solid-state memory devices. Access to memory 102 by other components of device 100, such as CPU 120 and the peripherals interface 118, may be controlled by memory controller 122.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data.

In some embodiments, peripherals interface 118, CPU 120, and memory controller 122 may be implemented on a single chip, such as chip 104. In some other embodiments, they may be implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 may include well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 may communicate with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication may use any of a plurality of communications standards, protocols and technologies, including but not limited to Global System for Mobile Communications (GSM), Enhanced Data GSM Environment (EDGE), high-speed downlink packet access (HSDPA), high-speed uplink packet access (HSUPA), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data may be retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 may include display controller 156 and one or more input controllers 160 for other input or control devices. The one or more input controllers 160 receive/send electrical signals from/to other input or control devices 116. The other input control devices 116 may include physical buttons (e.g., push buttons, rocker buttons, etc.), dials, slider switches, joysticks, click wheels, and so forth. In some alternate embodiments, input controller(s) 160 may be coupled to any (or none) of the following: a keyboard, infrared port, USB port, and a pointer device such as a mouse. The one or more buttons (e.g., 208, FIG. 2) may include an up/down button for volume control of speaker 111 and/or microphone 113. The one or more buttons may include a push button (e.g., 206, FIG. 2).

Touch-sensitive display 112 provides an input interface and an output interface between the device and a user. Display controller 156 receives and/or sends electrical signals from/to touch screen 112. Touch screen 112 displays visual output to the user. The visual output may include graphics, text, icons, video, and any combination thereof (collectively termed "graphics"). In some embodiments, some or all of the visual output may correspond to user-interface objects.

Touch screen 112 has a touch-sensitive surface, sensor or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and converts the detected contact into interaction with user-interface objects (e.g., one or more soft keys, icons, web pages or images) that are displayed on touch screen 112. In an exemplary embodiment, a point of contact between touch screen 112 and the user corresponds to a finger of the user.

Touch screen 112 may use LCD (liquid crystal display) technology, LPD (light emitting polymer display) technology, or LED (light emitting diode) technology, although other display technologies may be used in other embodiments. Touch screen 112 and display controller 156 may detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone®, iPod Touch®, and iPad® from Apple Inc. of Cupertino, Calif.

Touch screen 112 may have a video resolution in excess of 100 dpi. In some embodiments, the touch screen has a video resolution of approximately 160 dpi. The user may make contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 may include a touchpad (not shown) for activating or deactivating particular functions. In some embodiments, the touchpad is a touch-sensitive area of the device that, unlike the touch screen, does not display visual output. The touchpad may be a touch-sensitive surface that is separate from touch screen 112 or an extension of the touch-sensitive surface formed by the touch screen.

Device 100 also includes power system 162 for powering the various components. Power system 162 may include a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 may also include one or more optical sensors 164. FIG. 1A shows an optical sensor coupled to optical sensor controller 158 in I/O subsystem 106. Optical sensor 164 may include charge-coupled device (CCD) or complementary metal-oxide semiconductor (CMOS) phototransistors. Optical sensor 164 receives light from the environment, projected through one or more lens, and converts the light to data representing an image. In conjunction with imaging module 143 (also called a camera module), optical sensor 164 may capture still images or video. In some embodiments, an optical sensor is located on the back of device 100, opposite touch screen display 112 on the front of the device, so that the touch screen display may be used as a viewfinder for still and/or video image acquisition. In some embodiments, another optical sensor is located on the front of the device so that the user's image may be obtained for videoconferencing while the user views the other video conference participants on the touch screen display.

Device 100 may also include one or more proximity sensors 166. FIG. 1A shows proximity sensor 166 coupled to peripherals interface 118. Alternately, proximity sensor 166 may be coupled to input controller 160 in I/O subsystem 106. In some embodiments, the proximity sensor turns off and disables touch screen 112 when the multifunction device is placed near the user's ear (e.g., when the user is making a phone call).

Device 100 may also include one or more accelerometers 168. FIG. 1A shows accelerometer 168 coupled to peripherals interface 118. Alternately, accelerometer 168 may be coupled to an input controller 160 in I/O subsystem 106. In some embodiments, information is displayed on the touch screen display in a portrait view or a landscape view based on an analysis of data received from the one or more accelerometers. Device 100 optionally includes, in addition to accelerometer(s) 168, a magnetometer (not shown) and a GPS (or GLONASS or other global navigation system) receiver (not shown) for obtaining information concerning the location and orientation (e.g., portrait or landscape) of device 100.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments, memory 102 stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude. In some embodiments, memory 102 also stores one or more individual profiles 159, where each individual profile includes information identifying user interface objects, of a particular user interface or one or more user interfaces of a particular application or widget, that are accessible to a respective user.

Operating system 126 (e.g., Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used on iPod (trademark of Apple Inc.) devices.

Contact/motion module 130 may detect contact with touch screen 112 (in conjunction with display controller 156) and other touch sensitive devices (e.g., a touchpad or physical click wheel). Contact/motion module 130 includes various software components for performing various operations related to detection of contact, such as determining if contact has occurred (e.g., detecting a finger-down event), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, may include determining speed (magnitude), velocity (magnitude and direction), and/or an acceleration (a change in magnitude and/or direction) of the point of contact. These operations may be applied to single contacts (e.g., one finger contacts) or to multiple simultaneous contacts (e.g., "multitouch"/multiple finger contacts). In some embodiments, contact/motion module 130 and display controller 156 detect contact on a touchpad.

Contact/motion module 130 may detect a gesture input by a user. Different gestures on the touch-sensitive surface have different contact patterns. Thus, a gesture may be detected by detecting a particular contact pattern. For example, detecting a finger tap gesture includes detecting a finger-down event followed by detecting a finger-up (lift off) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (lift off) event.

Graphics module 132 includes various known software components for rendering and displaying graphics on touch screen 112 or other display, including components for changing the intensity of graphics that are displayed. As used herein, the term "graphics" includes any object that can be displayed to a user, including without limitation text, web pages, icons (such as user-interface objects including soft keys), digital images, videos, animations and the like.

In some embodiments, graphics module 132 stores data representing graphics to be used. Each graphic may be assigned a corresponding code. Graphics module 132 receives, from applications etc., one or more codes specifying graphics to be displayed along with, if necessary, coordinate data and other graphic property data, and then generates screen image data to output to display controller 156.

Text input module 134, which may be a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing, to camera 143 as picture/video metadata, and to applications that provide location-based services such as weather widgets, local yellow page widgets, and map/navigation widgets).

Applications 136 may include the following modules (or sets of instructions), or a subset or superset thereof:
  contacts module 137 (sometimes called an address book or contact list);
  telephone module 138;
  video conferencing module 139;
  e-mail client module 140;
  instant messaging (IM) module 141;
  workout support module 142;
  camera module 143 for still and/or video images;
  image management module 144;
  browser module 147;
  calendar module 148;
  widget modules 149, which may include one or more of: weather widget 149-1, stocks widget 149-2, calculator widget 149-3, alarm clock widget 149-4, and other widgets obtained by the user, as well as user-created widgets 149-6;
  widget creator module 150 for making user-created widgets 149-6;
  search module 151;

video and music player module 152, which may be made up of a video player module and a music player module;

notes module 153;

map module 154; and/or online video module 155.

Examples of other applications 136 that may be stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact module 130, graphics module 132, and text input module 134, contacts module 137 may be used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference 139, e-mail 140, or IM 141; and so forth.

In conjunction with RF circuitry 108, audio circuitry 110, speaker 111, microphone 113, touch screen 112, display controller 156, contact module 130, graphics module 132, and text input module 134, telephone module 138 may be used to enter a sequence of characters corresponding to a telephone number, access one or more telephone numbers in address book 137, modify a telephone number that has been entered, dial a respective telephone number, conduct a conversation and disconnect or hang up when the conversation is completed. As noted above, the wireless communication may use any of a plurality of communications standards, protocols and technologies.

In conjunction with RF circuitry 108, audio circuitry 110, speaker 111, microphone 113, touch screen 112, display controller 156, optical sensor 164, optical sensor controller 158, contact module 130, graphics module 132, text input module 134, contact list 137, and telephone module 138, videoconferencing module 139 includes executable instructions to initiate, conduct, and terminate a video conference between a user and one or more other participants in accordance with user instructions.

In conjunction with RF circuitry 108, touch screen 112, display controller 156, contact module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages and to view received instant messages. In some embodiments, transmitted and/or received instant messages may include graphics, photos, audio files, video files and/or other attachments as are supported in a MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact module 130, graphics module 132, text input module 134, GPS module 135, map module 154, and music player module 146, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store and transmit workout data.

In conjunction with touch screen 112, display controller 156, optical sensor(s) 164, optical sensor controller 158, contact module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display system controller 156, contact module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display system controller 156, contact module 130, graphics module 132, text input module 134, e-mail client module 140, and browser module 147, calendar module 148 includes executable instructions to create, display, modify, and store calendars and data associated with calendars (e.g., calendar entries, to do lists, etc.) in accordance with user instructions.

In conjunction with RF circuitry 108, touch screen 112, display system controller 156, contact module 130, graphics module 132, text input module 134, and browser module 147, widget modules 149 are mini-applications that may be downloaded and used by a user (e.g., weather widget 149-1, stocks widget 149-2, calculator widget 149-3, and alarm clock widget 149-4) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display system controller 156, contact module 130, graphics module 132, text input module 134, and browser module 147, the widget creator module 150 may be used by a user to create widgets (e.g., turning a user-specified portion of a web page into a widget).

In conjunction with touch screen 112, display system controller 156, contact module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display system controller 156, contact module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present or otherwise play back videos (e.g., on touch screen 112 or on an external, connected display via external port 124). In some embodiments, device 100 may include the functionality of an MP3 player, such as an iPod (trademark of Apple Inc.).

In conjunction with touch screen 112, display controller 156, contact module 130, graphics module 132, and text input module 134, notes module 153 includes executable instructions to create and manage notes, to do lists, and the like in accordance with user instructions.

In conjunction with RF circuitry 108, touch screen 112, display system controller 156, contact module 130, graphics module 132, text input module 134, GPS module 135, and browser module 147, map module 154 may be used to receive, display, modify, and store maps and data associated with maps (e.g., driving directions; data on stores and other points of interest at or near a particular location; and other location-based data) in accordance with user instructions.

In conjunction with touch screen 112, display system controller 156, contact module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video.

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules may be combined or otherwise re-arranged in various embodiments. In some embodiments, memory 102 may store a subset of the modules and data structures identified above. Furthermore, memory 102 may store additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 may be reduced.

The predefined set of functions that may be performed exclusively through a touch screen and/or a touchpad include navigation between user interfaces. In some embodiments, the touchpad, when touched by the user, navigates device 100 to a main, home, or root menu from any user interface that may be displayed on device 100. In such embodiments, the touchpad may be referred to as a "menu button." In some other embodiments, the menu button may be a physical push button or other physical input control device instead of a touchpad.

Figure 1B:
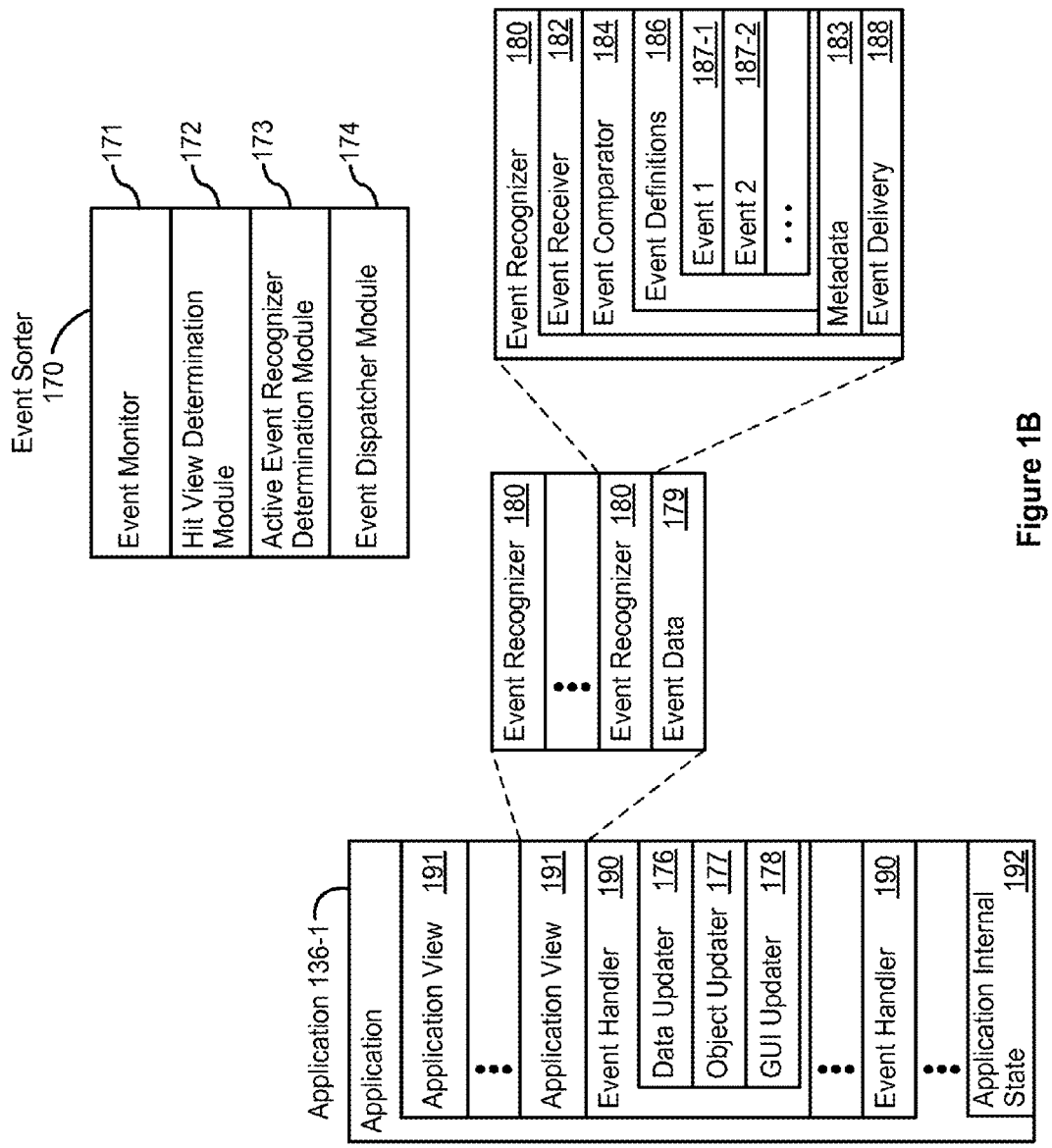
FIG. 1B is a block diagram illustrating exemplary components for event handling in accordance with some embodiments.

FIG. 1B is a block diagram illustrating exemplary components for event handling in accordance with some embodiments. In some embodiments, memory 102 (in FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripheral interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views, when touch sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected may correspond to programmatic levels within a programmatic or view hierarchy of the application.

For example, the lowest level view in which a touch is detected may be called the hit view, and the set of events that are recognized as proper inputs may be determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (i.e., the first sub-event in the sequence of sub-events that form an event or potential event). Once the hit view is identified by the hit view determination module, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver module 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 may utilize or call data updater 176, object updater 177 or GUI updater 178 to update the application internal state 192. Alternatively, one or more of the application views 191 includes one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170, and identifies an event from the event information. Event recognizer 180 includes event receiver 182 and event comparator 184. In some embodiments, event recognizer 180 also includes at least a subset of: metadata 183, and event delivery instructions 188 (which may include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch the event information may also include speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event 187 include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first lift-off (touch end) for a predetermined phase, a second touch (touch begin) on the displayed object for a predetermined phase, and a second lift-off (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and lift-off of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event 187 also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers may interact with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module 145. In some embodiments, object updater 177 creates and updates objects used in application 136-1. For example, object updater 176 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input-devices, not all of which are initiated on touch screens, e.g., coordinating mouse movement and mouse button presses with or without single or multiple keyboard presses or holds, user movements taps, drags, scrolls, etc., on touch-pads, pen stylus inputs, movement of the device, oral instructions, detected eye movements, biometric inputs, and/or any combination thereof, which may be utilized as inputs corresponding to sub-events which define an event to be recognized.

FIG. 2 illustrates a portable multifunction device 100 having a touch screen 112 in accordance with some embodiments. The touch screen may display one or more graphics within user interface (UI) 200. In this embodiment, as well as others described below, a user may select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture may include one or more taps, one or more swipes (from left to right, right to left, upward and/or downward) and/or a rolling of a finger (from right to left, left to right, upward and/or downward) that has made contact with device 100. In some embodiments, inadvertent contact with a graphic may not select the graphic. For example, a swipe gesture that sweeps over an application icon may not select the corresponding application when the gesture corresponding to selection is a tap.

Device 100 may also include one or more physical buttons, such as "home" or menu button 204. As described previously, menu button 204 may be used to navigate to any application 136 in a set of applications that may be executed on device 100. Alternatively, in some embodiments, the menu button is implemented as a soft key in a GUI displayed on touch screen 112.

In one embodiment, device 100 includes touch screen 112, menu button 204, push button 206 for powering the device on/off and locking the device, volume adjustment button(s) 208, Subscriber Identity Module (SIM) card slot 210, head set jack 212, and docking/charging external port 124. Push button 206 may be used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also may accept verbal input for activation or deactivation of some functions through microphone 113.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPU's) 310, one or more network or other communications interfaces 360, memory 370, and one or more communication buses 320 for interconnecting these components. Communication buses 320 may include circuitry (sometimes called a chipset) that interconnects and controls communications between system components. Device 300 includes input/output (I/O) interface 330 comprising display 340, which is typically a touch screen display. I/O interface 330 also may include a keyboard and/or mouse (or other pointing device) 350 and touchpad 355. Memory 370 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 370 may optionally include one or more storage devices remotely located from CPU(s) 310. In some embodiments, memory 370 stores programs, modules, and data structures analogous to the programs, modules, and data structures stored in memory 102 of portable multifunction device 100 (FIG. 1), or a subset thereof. Furthermore, memory 370 may store additional programs, modules, and data structures not present in memory 102 of portable multifunction device 100. For example, memory 370 of device 300 may store drawing module 380, presentation module 382, word processing module 384, website creation module 386, disk authoring module 388, and/or spreadsheet module 390, while memory 102 of portable multifunction device 100 (FIG. 1) may not store these modules.

Each of the above identified elements in FIG. 3 may be stored in one or more of the previously mentioned memory devices. Each of the above identified modules corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, memory 370 may store a subset of the modules and data structures identified above. Furthermore, memory 370 may store additional modules and data structures not described above.

Attention is now directed towards embodiments of user interfaces ("UI") that may be implemented on portable multifunction device 100.

FIG. 4A illustrates an exemplary user interface for a menu of applications on portable multifunction device 100 in accordance with some embodiments. Similar user interfaces may be implemented on device 300. In some embodiments, user interface 400 includes the following elements, or a subset or superset thereof:

Signal strength indicator(s) 402 for wireless communication(s), such as cellular and Wi-Fi signals;
Time 404;
Bluetooth indicator 405;
Battery status indicator 406;
Tray 408 with icons for frequently used applications, such as:
  Phone 138, which may include an indicator 414 of the number of missed calls or voicemail messages;
  E-mail client 140, which may include an indicator 410 of the number of unread e-mails;
  Browser 147; and
  Video and music player 152, also referred to as iPod (trademark of Apple Inc.) module 152; and
Icons for other applications, such as:
  IM 141;
  Image management 144;
  Camera 143;
  Weather 149-1;
  Stocks 149-2;
  Workout support 142;
  Calendar 148;
  Alarm clock 149-4;
  Map 154;
  Notes 153;
  Settings 412, which provides access to settings for device 100 and its various applications 136; and
  Online video module 155, also referred to as YouTube (trademark of Google Inc.) module 155.

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Although many of the examples which follow will be given with reference to inputs on touch screen display 112 (where the touch sensitive surface and the display are combined), in some embodiments, the device detects inputs on a touch-sensitive surface that is separate from the display, as shown in FIG. 4B. In some embodiments the touch sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods may be used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse based input or stylus input). For example, a swipe gesture may be replaced with a mouse click (e.g., instead of a contact) followed by movement of the cursor along the path of the swipe (e.g., instead of movement of the contact). As another example, a tap gesture may be replaced with a mouse click while the cursor is located over the location of the tap gesture (e.g., instead of detection of the contact followed by ceasing to detect the contact). Similarly, when multiple user inputs are simultaneously detected, it should be understood that multiple computer mice may be used simultaneously, or a mouse and finger contacts may be used simultaneously.

User Interfaces and Associated Processes

Attention is now directed towards embodiments of user interfaces ("UI") and associated processes that may be implemented on an electronic device with a display and a touch-sensitive surface, such as device 300 or portable multifunction device 100.

FIGS. 5A-5AM illustrate exemplary user interfaces for configuring restricted interaction with software applications and operating in a restricted interaction mode in accordance with some embodiments. The user interfaces in these figures are used to illustrate the processes described below, including the processes in FIGS. 6A-6E, FIG. 8, and FIGS. 10A-10F.

Figure 5B:
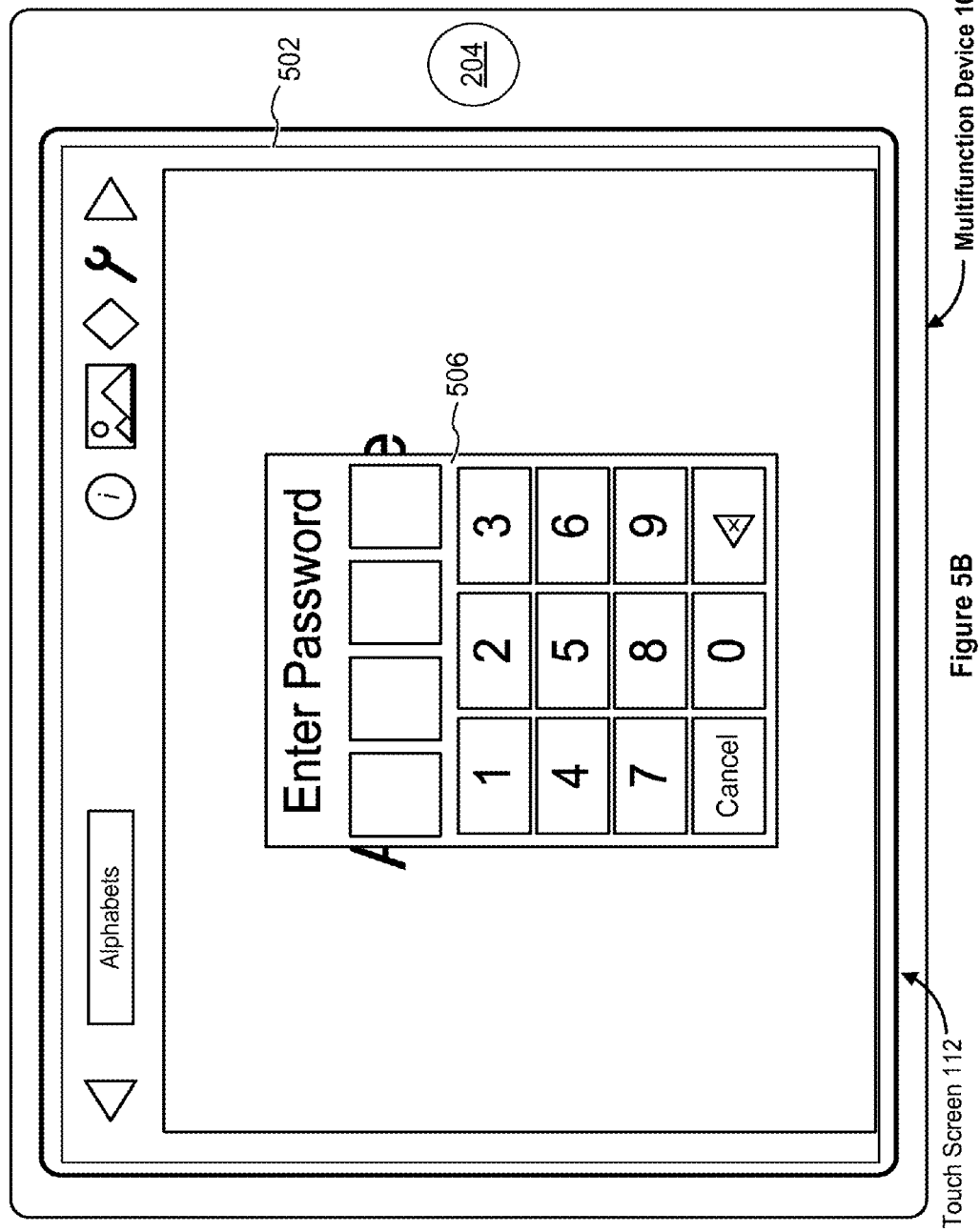
Figure 5C:
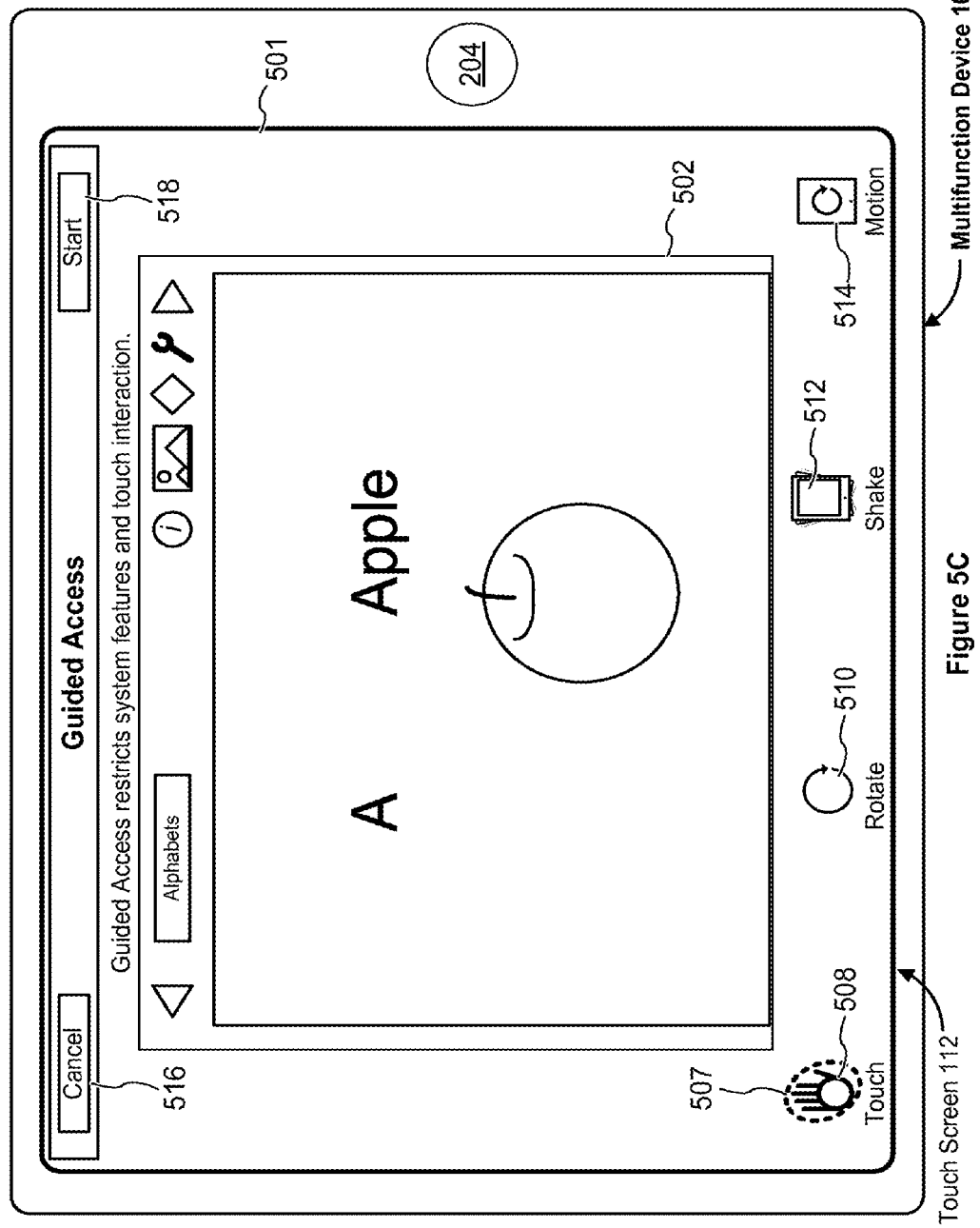
Figure 5D:
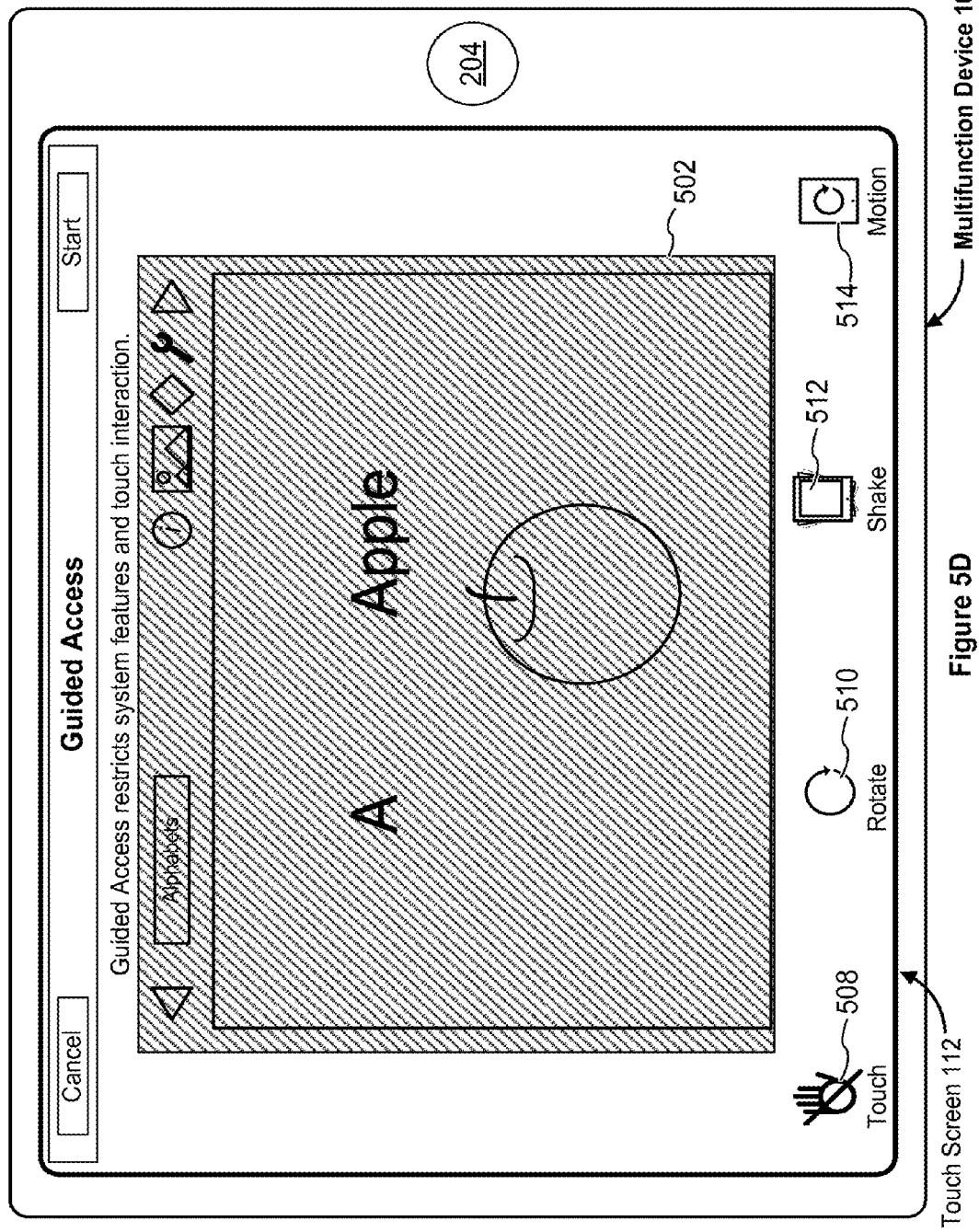
Figure 5E:
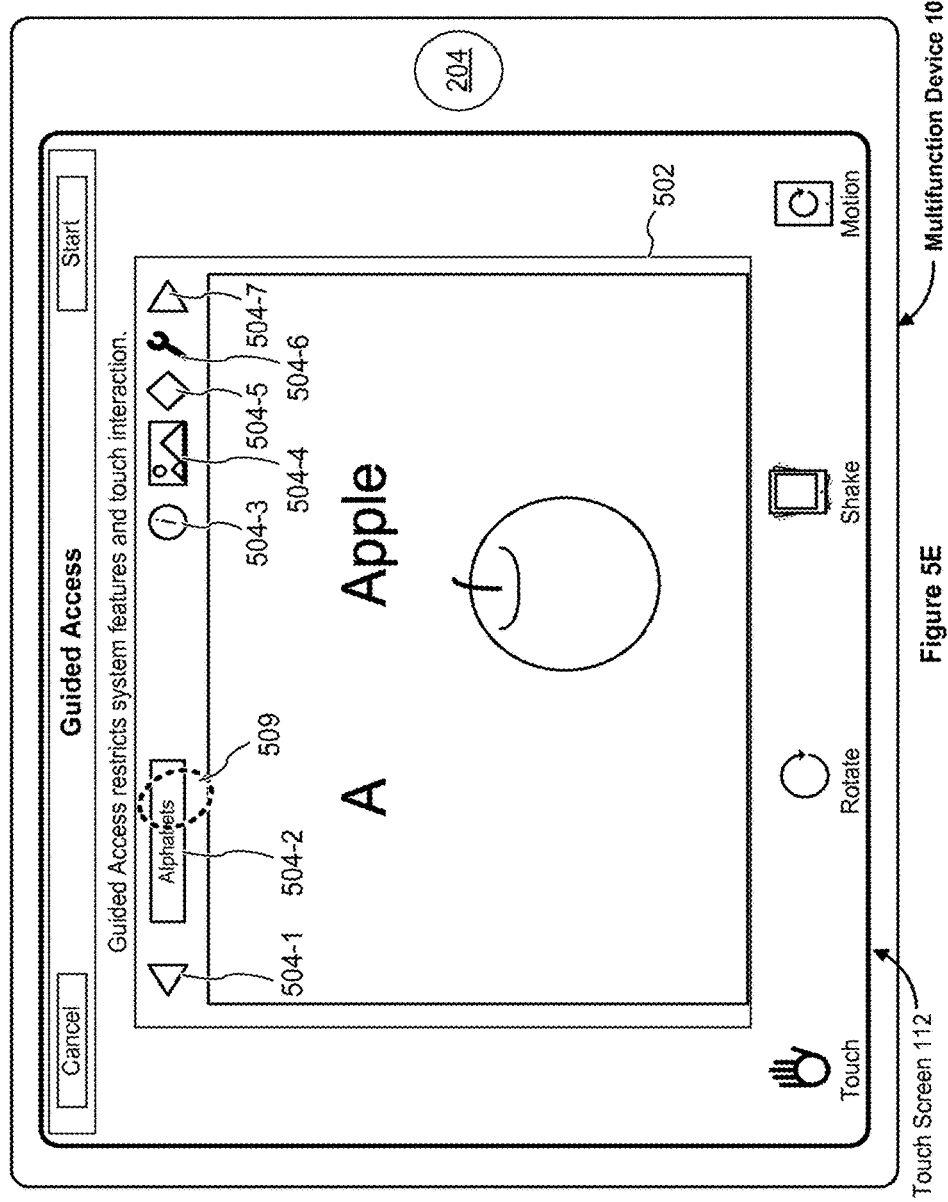
Figure 5F:
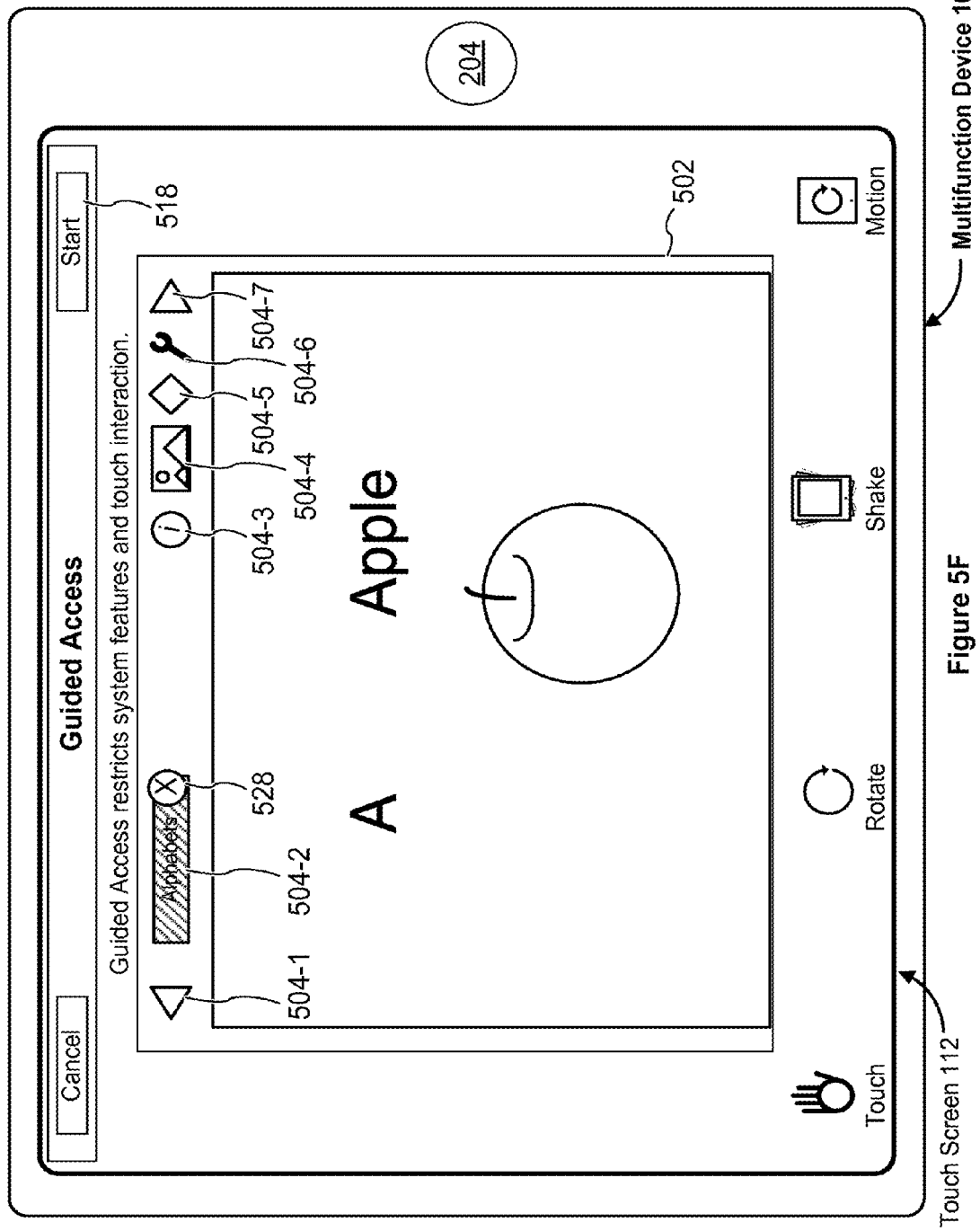
Figure 5G:
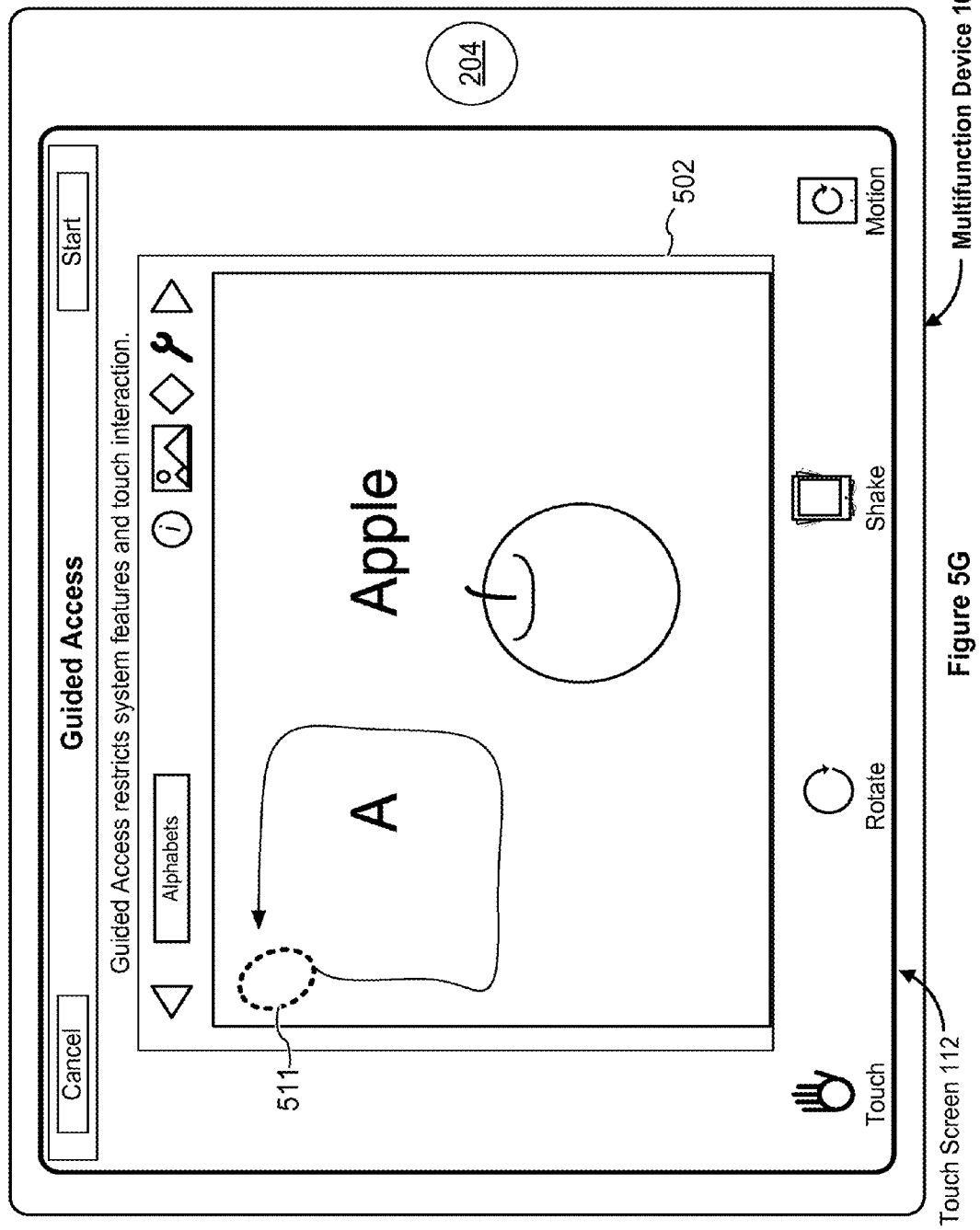
Figure 5H:
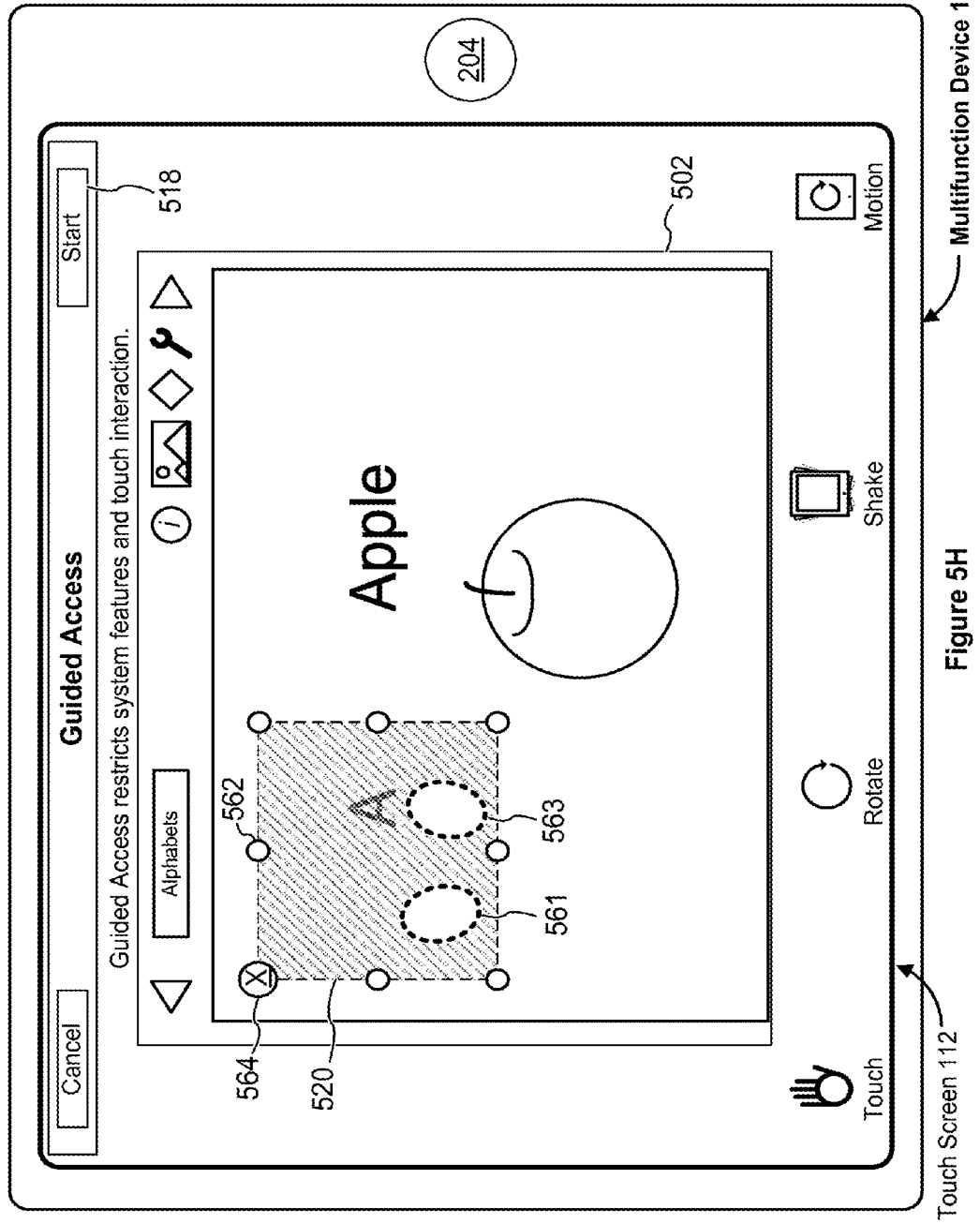
Figure 5I:
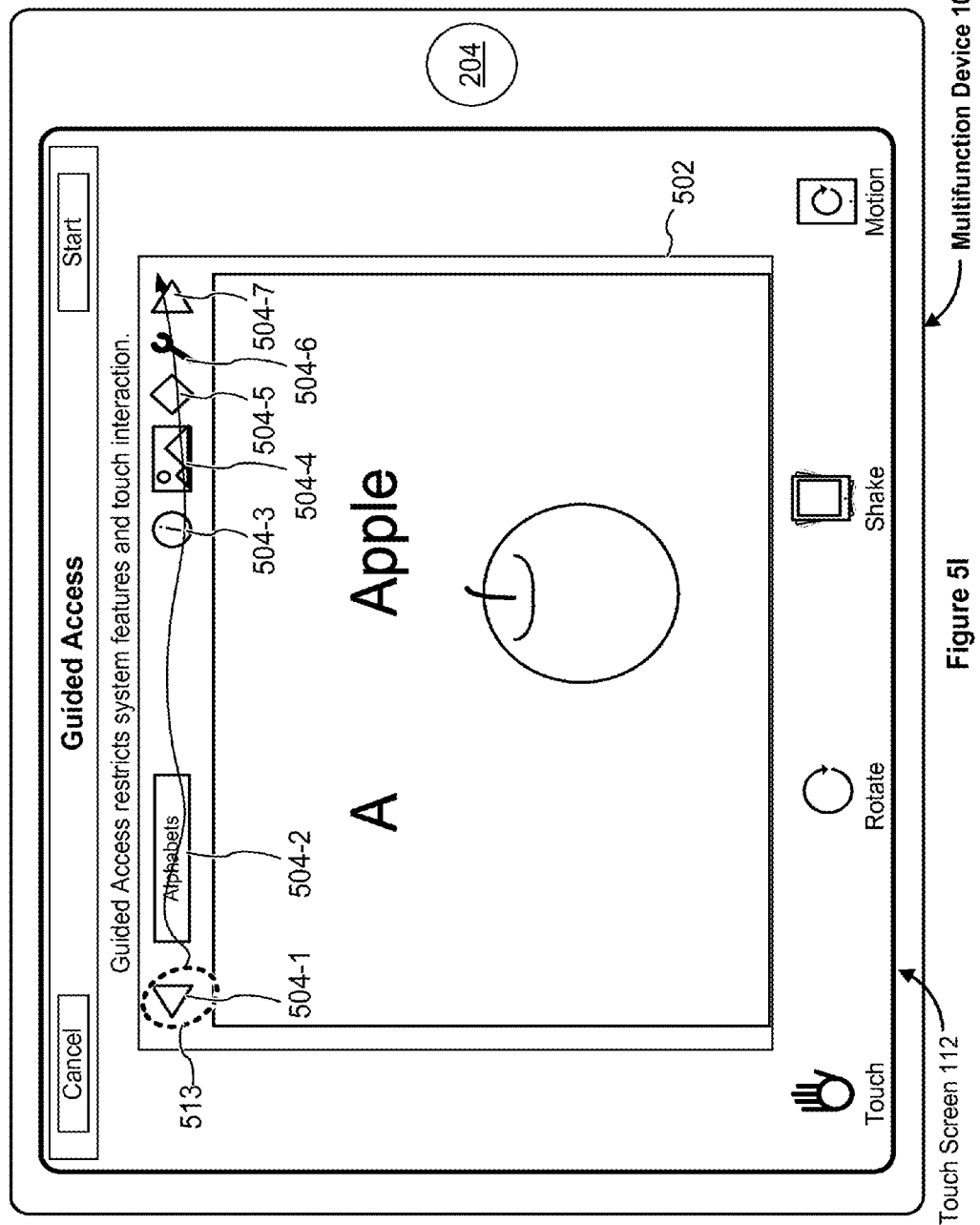
Figure 5J:
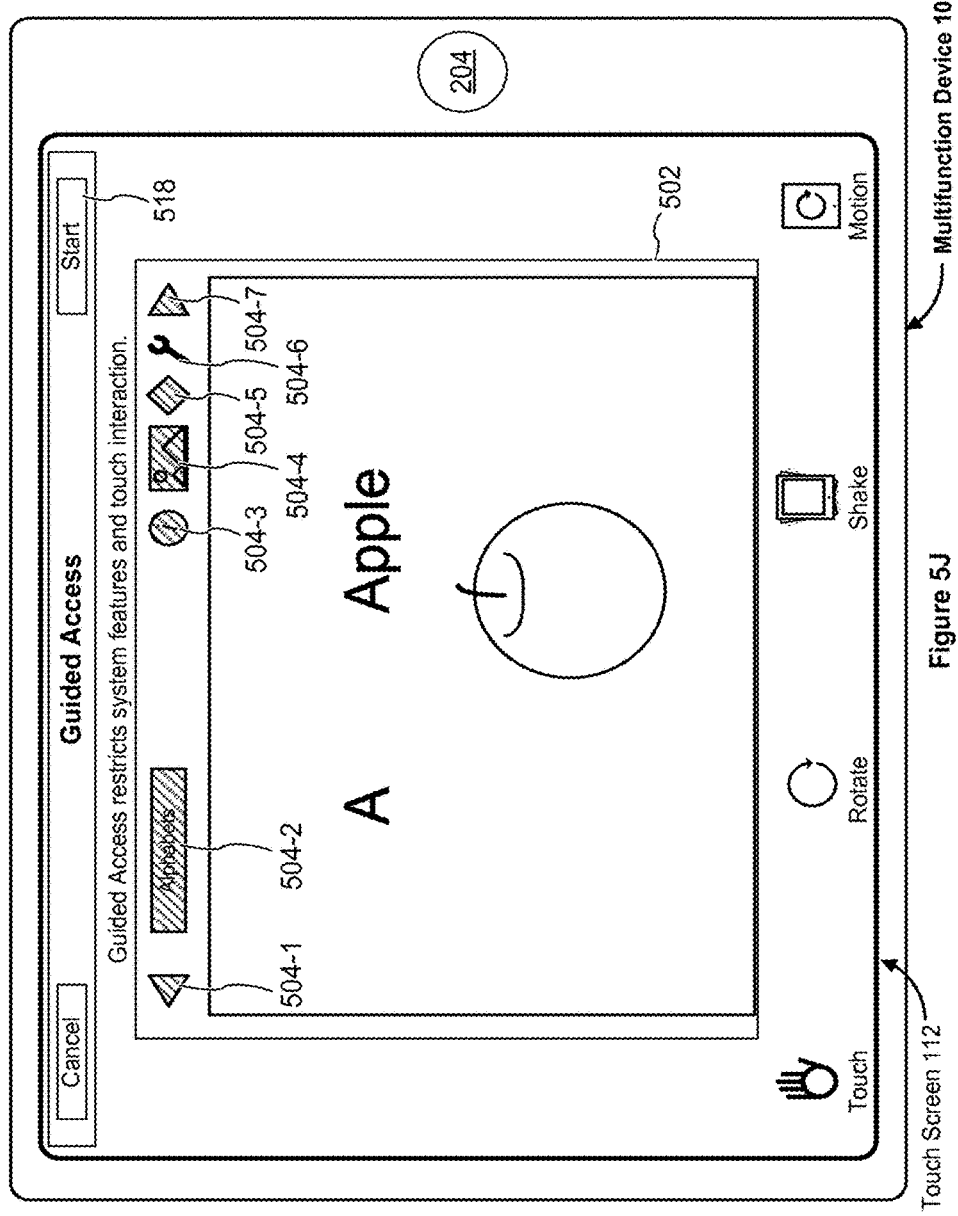
Figure 5K:
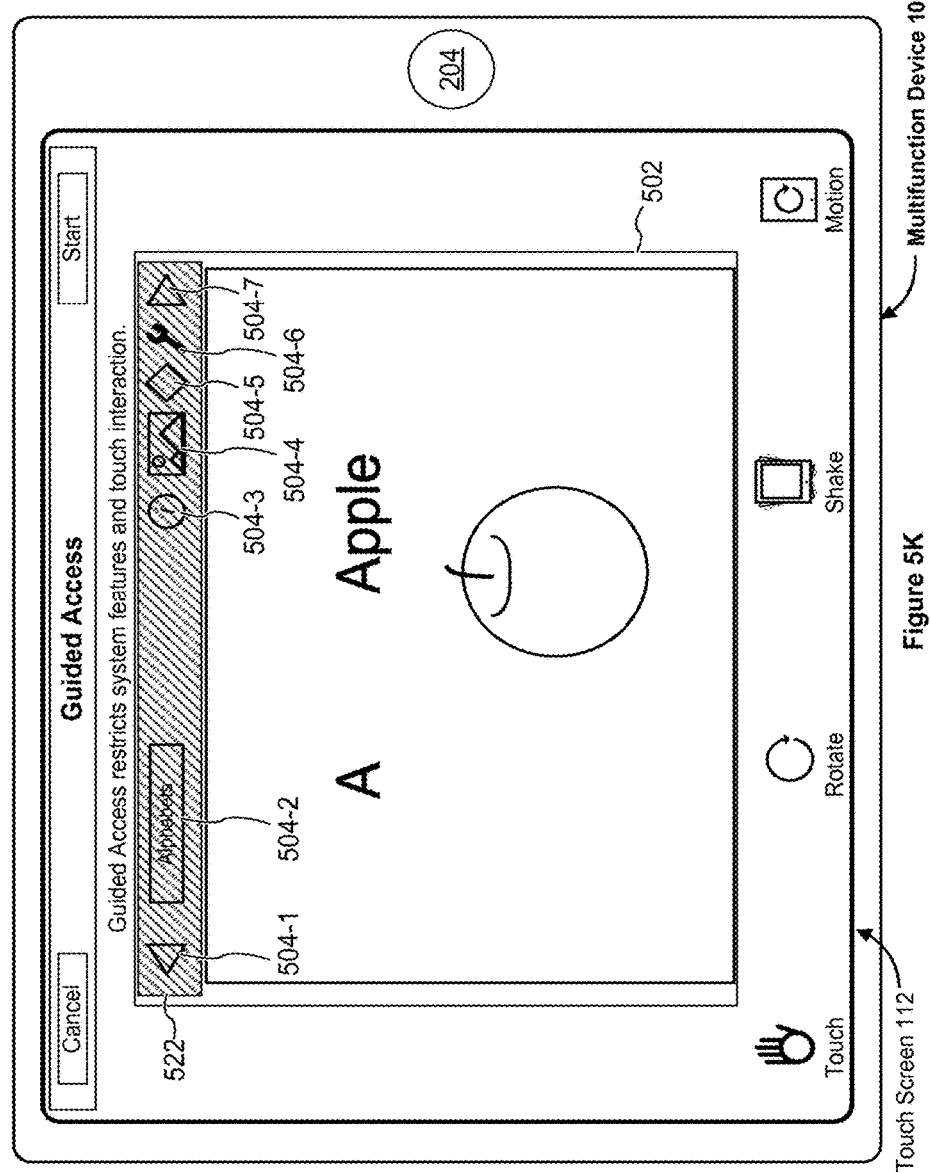
Figure 5L:
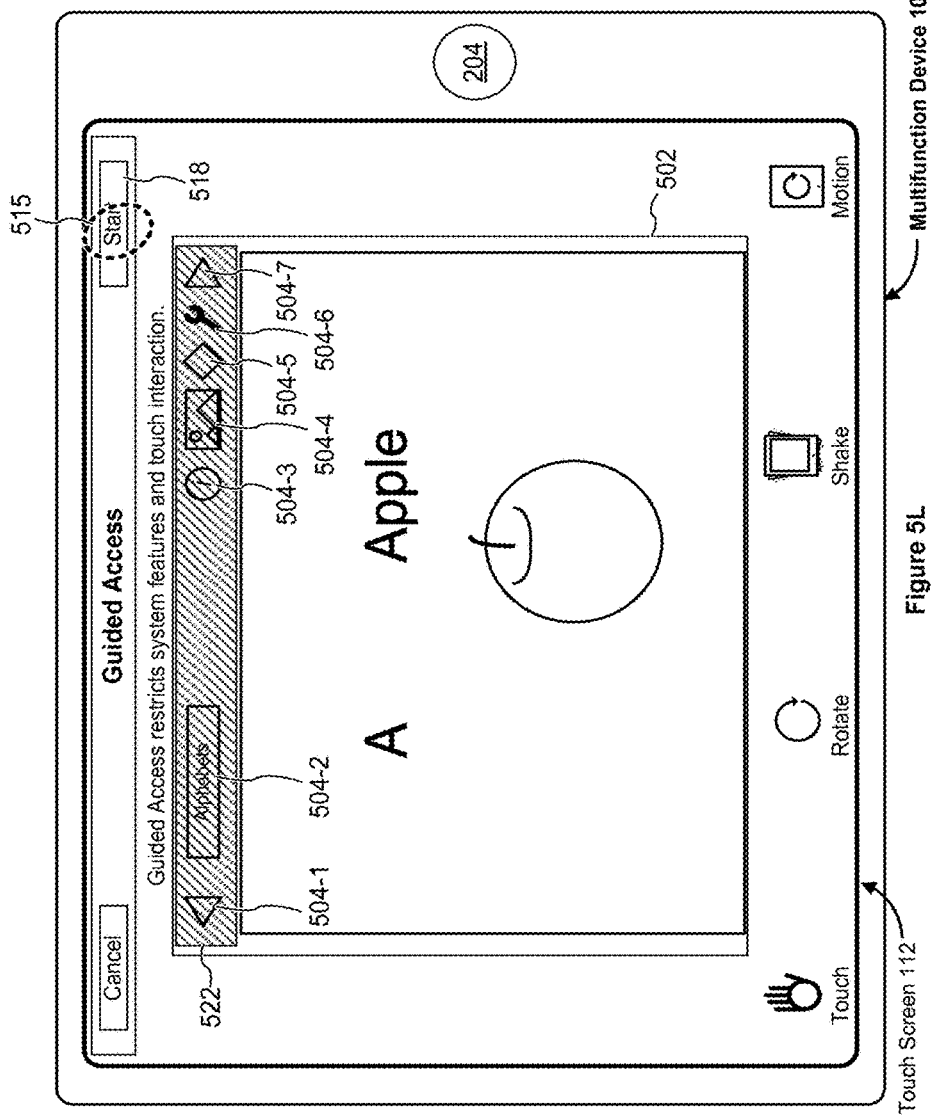
Figure 5M:
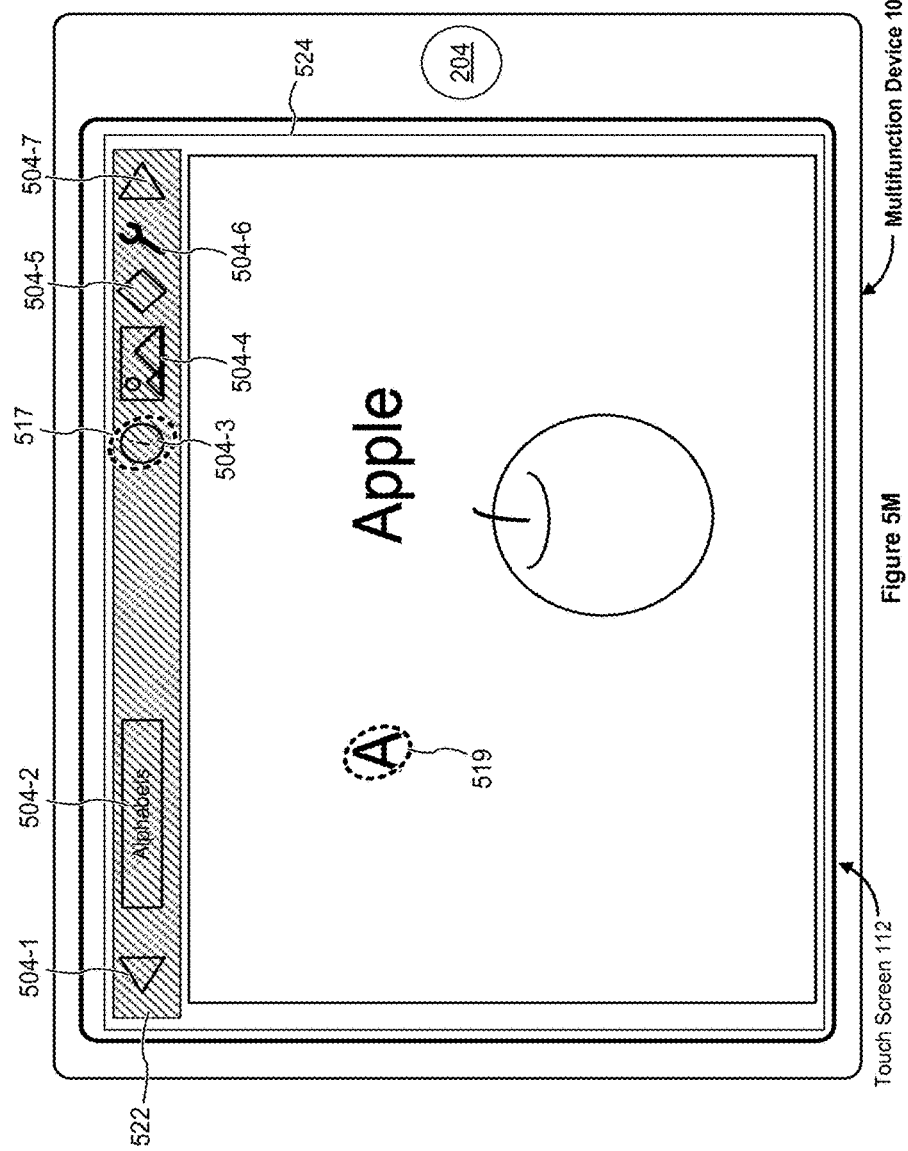
Figure 5P:
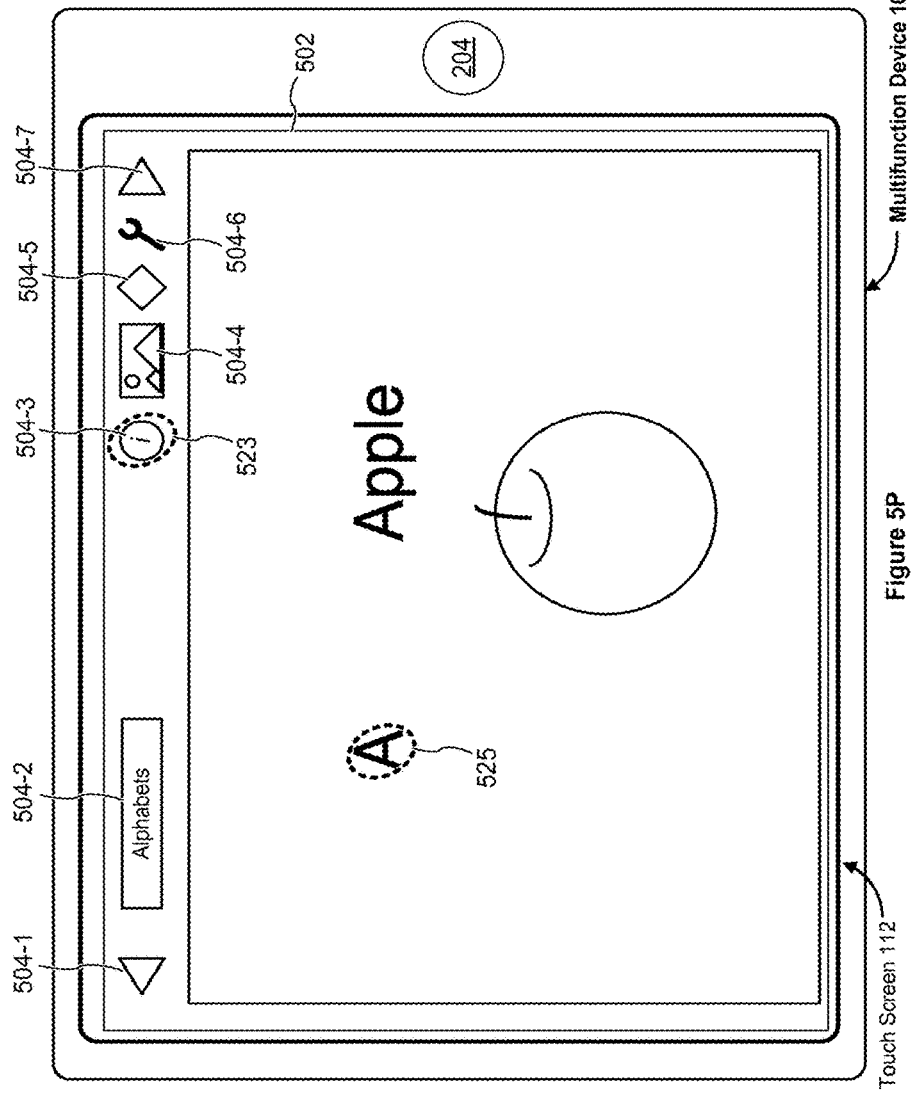

FIGS. 5A-5P illustrate an exemplary user interface of an educational application in accordance with some embodiments.

FIG. 5A illustrates exemplary user interface 502 of the educational application. In FIG. 5A, user interface 502 is displayed on touch screen 112 of device 100. User interface 502 includes a plurality of user interface objects (e.g., the character "A," the word "Apple," a picture of an apple, and a plurality of menu bar user interface objects 504-1, 504-2, 504-3, 504-4, 504-5, 504-6, and 504-7, which, when activated, initiate respective operations. For example, user interface object 504-1, when activated (e.g., by a tap gesture), initiates replacing the displayed content (e.g., the character "A," the word "Apple," and the picture of an apple) with content from a previous page; user interface object 504-7, when activated (e.g., by a tap gesture), initiates replacing the displayed content with content from a next page; user interface object 504-2, when activated (e.g., by a tap gesture), initiates display of a list of documents or files configured for display in the respective application (e.g., the educational application); user interface object 504-3, when activated (e.g., by a tap gesture), initiates display of a help menu or help dialogue; user interface object 504-4, when activated (e.g., by a tap gesture), initiates display of a display properties menu; user interface object 504-5, when activated (e.g., by a tap gesture), initiates display of a bookmark menu; and user interface object 504-6, when activated (e.g., by a tap gesture), initiates display of a settings menu.

FIG. 5A also illustrates that touch gesture 503 is detected on touch screen 112. In response to detecting touch gesture 503, device 100 produces sounds corresponding to the pronunciation of the character "A" (e.g., device 100 plays an audio clip storing the pronunciation of the character "A"). FIG. 5A further illustrates that user input 505 is provided on home button 204 (e.g., home button 204 is pressed repeatedly three times in a row). An exemplary response displayed in response to user input 505 is illustrated in FIG. 5B.

FIG. 5B shows that, in some embodiments, exemplary password menu 506 is displayed over user interface 502 on touch screen 112 in response to user input 505 (FIG. 5A). A user may sequentially activate numerical buttons in password menu 506 (e.g., by tap gestures). When the user-provided sequence of numbers matches a preselected password, device 100 enters an interaction configuration mode, the user interface for which is illustrated in FIG. 5C. Alternatively, in some embodiments, in response to user input 505 (FIG. 5A), device 100 directly enters the interaction configuration mode without displaying password menu 506 (FIG. 5B).

FIG. 5C illustrates an exemplary user interface 501 of the interaction configuration mode, which includes user interface 502 displayed at a reduced scale. In other words, user interface 502 is displayed smaller in the interaction configuration mode (FIG. 5C) than in the unrestricted interaction mode illustrated in FIG. 5A. In some embodiments, the user interface 501 of the interaction configuration mode includes cancel user interface object 516, which, when activated (e.g., by a tap gesture), initiates exiting the interaction configuration mode and entering the unrestricted interaction mode. Once device 100 exits the interaction configuration mode, in some embodiments, the user interface shown in FIG. 5A is displayed. In some embodiments, the user interface 501 of the interaction configuration mode includes start user interface object 518, which, when activated (e.g., by a tap gesture), initiates exiting the interaction configuration mode and entering a restricted interaction mode, which is described below with respect to FIGS. 5M-5O, 5T, 5X, and 5Z.

In some embodiments, user interface 501 in FIG. 5C includes one or more of: touch interaction control user interface object 508, which, when selected, causes device 100 to ignore touch inputs on touch screen 112 while in the restricted interaction mode; rotate interaction control user interface object 510, which, when selected, causes device 100 to ignore rotation of device 100 while in the restricted interaction mode; shake interaction control user interface object 512, which, when selected, causes device 100 to ignore shaking of device 100 while in the restricted interaction mode; and motion interaction control user interface object 514, which, when selected, causes device 100 to ignore movement of device 100 while in the restricted interaction mode. As used herein, ignoring a particular input (e.g., a touch input, shaking of the device, movement of the device, etc.) means that the device does not respond to that particular input when the device is in the restricted interaction mode. In contrast, when in unrestricted interaction mode, device 100 responds to touch inputs on touch screen 112 (e.g., touch gesture 503, FIG. 5A), rotates the user interface from a portrait orientation to a landscape orientation or from the landscape orientation to the portrait orientation in response to detecting the rotation of device 100, performs a first predefined operation (e.g., an undo operation) in response to detecting shaking of device 100, and/or performs a second predefined operation (e.g., updating the user interface) in response to detecting movement of device 100. FIG. 5C illustrates that touch gesture 507 (e.g., a tap gesture) is detected at a location corresponding to touch interaction control user interface object 508, thereby selecting all touch interactions with the entire touch screen display for deactivation in the restricted interaction mode. An exemplary user interface displayed in response to touch gesture 507 is illustrated in FIG. 5D.

FIG. 5D illustrates that, in response to touch gesture 507 (FIG. 5C) at the location corresponding to touch interaction user interface object 508, touch interaction control user interface object 508 indicates that touch interaction on user interface 502 will be ignored while in the restricted interaction mode (e.g., note a line striking through touch interaction control user interface object 508). In addition, in response to touch gesture 507 at the location corresponding to touch interaction control user interface object 508 (FIG. 5C), the entire user interface 502 is visually distinguished (e.g., dimmed, shaded, displayed in a different color, marked with one or more indicators, etc.). A subsequent touch gesture (e.g., a tap gesture) at the location corresponding to touch interaction user interface object 508 removes the visual distinction of user interface 502, indicating that touch interaction on touch screen 112 will not be completely disabled while in the restricted interaction mode.

Similarly, in some embodiments, one or more of user interface objects 510, 512, and 514 indicate whether device 100 is configured to ignore (i.e., not respond to) the rotation, shaking, and/or movement of device 100 (e.g., by display of one or more lines striking through respective icons).

FIGS. 5E-5F illustrate that, instead of ignoring touch inputs on the entire user interface 502 by activating the touch interaction control user interface object 508, one or more separate user interface objects may be selected for deactivation.

In FIG. 5E, touch gesture 509 is detected at a location that corresponds to user interface object 504-2, thereby selecting user interface object 504-2 for deactivation while in the restricted interaction mode.

In some embodiments, as shown in FIG. 5AA, user interface objects that are configured to be selected by one or more gesture inputs are visually distinguished from other user interface objects that are not configured to be selected by gesture inputs in the interaction configuration mode. For example, the color(s) and/or outlines of the user interface objects that are configured to be selected by gesture inputs are changed in the interaction configuration mode to indicate that these user interface objects are configured to be selected by gesture inputs while the color(s) and/or outlines of the user interface objects that are not configured to be selected by gesture inputs remain the same (FIG. 5AA), or vice versa (not shown).

FIG. 5F illustrates that, in response to touch gesture 509 (FIG. 5E), user interface object 504-2 is visually distinguished (e.g., user interface object 504-2 is dimmed and/or indicator 528 is displayed over, or adjacent to, user interface object 504-2). In some embodiments, while device 100 is in the interaction configuration mode, one or more additional touch gestures are detected on touch screen 112 at respective locations corresponding to one or more other user interface objects, thereby selecting the one or more other user interface objects for deactivation while in the restricted interaction mode. In some embodiments, a subsequent touch gesture (e.g., a tap gesture) on user interface object 504-2 selects user interface object 504-2 for activation (i.e., deselects user interface object 504-2 for deactivation) and removes the visual distinction of user interface object 504-2. After device 100 enters the restricted interaction mode (e.g., in response to a tap gesture on the "Start" icon, user interface object 518), if user interface object 504-2 was selected for deactivation in the interaction configuration mode, device 100 ignores touch inputs at a location corresponding to user interface object 504-2 while in the restricted interaction mode.

In some embodiments, while device 100 is in the interaction configuration mode, multiple touch gestures (e.g., separate tap gestures or a collection of one or more tap gestures and/or one or more swipe gestures) are detected on touch screen 112 at respective locations corresponding to a plurality of user interface objects, thereby selecting the plurality of user interface objects for deactivation. After device 100 enters the restricted interaction mode (e.g., in response to a tap gesture on the "Start" icon, user interface object 518), if the plurality of user interface objects was selected for deactivation in the interaction configuration mode, device 100 ignores touch inputs at locations corresponding to the selected plurality of user interface objects while in the restricted interaction mode.

FIGS. 5G-5H illustrate an alternative method for selecting one or more user interface objects for deactivation while device 100 is in the interaction configuration mode. In FIG. 5G, touch gesture 511 is detected on touch screen 112. Touch gesture 511 moves across touch screen 112, while maintaining contact with touch screen 112, along a closed path (or nearly closed path) that resembles a rectangle.

FIG. 5H illustrates that device 100 recognizes the shape drawn by the movement of touch gesture 511 as a rectangle, and determines the size and location of the rectangle that corresponds to the path of touch gesture 511.

As shown in FIG. 5H, in some embodiments, rectangle 520, determined to correspond to the path of touch gesture 511, is displayed on touch screen 112. When rectangle 520 is displayed on touch screen 112, rectangle 520 is visually distinguished from the rest of user interface 502.

In some embodiments, deletion user interface object 564 is displayed over or adjacent to the shape corresponding to the path of touch gesture 511 (e.g., rectangle 520). In response to detecting a touch gesture at a location on touch screen 112 that corresponds to deletion user interface object 564, the shape corresponding to the path of touch gesture 511 ceases to be displayed (not shown).

In some embodiments, the shape corresponding to the path of touch gesture 511, such as rectangle 520, is moved in accordance with a touch gesture. For example, while rectangle 520 is displayed on touch screen 112, finger contact 561 may be detected at a location on touch screen 112 that corresponds to rectangle 520. While finger contact 561 is detected on touch screen 112, rectangle 520 moves in accordance with the movement of finger contact 561 (e.g., rectangle 520 moves with finger contact 561 on touch screen 112 until finger contact 561 ceases to be detected on touch screen 112). Alternatively, the movement of finger contacts 561 and 563 may be used to move rectangle 520 (e.g., the mid-point between finger contacts 561 and 563 determines the position of rectangle 520).

In some embodiments, the shape corresponding to the path of touch gesture 511, such as rectangle 520, is resized in accordance with a touch gesture. For example, the size of rectangle 520 is increased in response to a depinch gesture made by finger contacts 561 and 563 (e.g., finger contacts 561 and 563 moving further away from each other). Similarly, in some embodiments, the size of rectangle 520 is decreased in response to a pinch gesture made by finger contacts 561 and 563 (e.g., finger contacts 561 and 563 moving closer toward each other). In some embodiments, the pinch or depinch gesture resizes the shape without changing the aspect ratio of the shape. In some embodiments, a horizontal pinch or depinch gesture (e.g., finger contacts 561 and 563 moving horizontally relative to each other) changes the width of the shape without changing the height of the shape, thereby changing the aspect ratio of the shape. In some embodiments, a vertical pinch or depinch gesture (e.g., finger contacts 561 and 563 moving vertically relative to each other) changes the height of the shape without changing the width of the shape, thereby changing the aspect ratio of the shape. In some embodiments, a diagonal pinch or depinch (e.g., finger contacts 561 and 563 moving relative to each other with both horizontal and vertical components of movement) changes the width of the shape in accordance with the horizontal component of the diagonal pinch or depinch and the height of the shape in accordance with the vertical component of the diagonal pinch or depinch.

In some embodiments, the shape corresponding to the path of touch gesture 511, such as rectangle 520, is moved, rotated, and/or resized in accordance with a touch gesture (e.g., based on finger contacts 561 and 563).

Alternatively, the shape corresponding to the path of touch gesture 511 may be resized with a single finger gesture. In some embodiments, one or more resize handles 562 are displayed on touch screen 112 along one or more edges of the shape corresponding to the path of touch gesture 511 (e.g., rectangle 520). In response to detecting a finger contact on a respective resize handle and detecting the movement of the finger contact across on touch screen 112, the shape is resized.

In some embodiments, after device 100 enters the restricted interaction mode (e.g., in response to a tap gesture on user interface object 518), rectangle 520 is displayed and device 100 ignores touch inputs at a location corresponding to any user interface object located within rectangle 520 (e.g., the character "A") while in the restricted interaction mode.

Alternatively, as shown in FIG. 5AB, in some embodiments, device 100 determines whether one or more user interface objects lie within the area outlined by a closed path (or nearly closed path) gesture, and visually distinguishes the one or more user interface objects that lie within the area outlined by the closed path (or nearly closed path) gesture. For example, in response to detecting gesture 511 (FIG. 5G), the device selects the letter "A" object within gesture 511 for deactivation and visually distinguishes the letter "A" object within gesture 511, as shown in FIG. 5AB. In some embodiments, when multiple user interface objects lie within the area outlined by the closed path (or nearly closed path) gesture, the multiple user interface objects are selected for deactivation and visually distinguished (not shown).

FIGS. 5I-5K illustrate another method for selecting one or more user interface objects for deactivation while device 100 is in the interaction configuration mode. In FIG. 5I, touch gesture 513 is detected on touch screen 112. Touch gesture 513 moves across touch screen 112, while maintaining contact with touch screen 112, along an open path, and the open path intersects (or comes into contact with) user interface objects 504-1 through 504-7, thereby selecting user interface objects 504-1 through 504-7. In some embodiments, one or more user interface objects located adjacent to the open path (e.g., within a predefined distance from the open path) are also selected for deactivation, even though they are not intersected by the open path.

FIG. 5J illustrates that user interface objects 504-1 through 504-7 are visually distinguished as a result of the selection by touch gesture 513 (FIG. 5I). After device 100 enters the restricted interaction mode (e.g., in response to a tap gesture on user interface object 518), if user interface objects 504-1 through 504-7 were selected for deactivation in the interaction configuration mode, device 100 ignores touch inputs at locations corresponding to any of user interface objects 504-1 through 504-7 while in the restricted interaction mode.

FIG. 5K illustrates an alternative user interface to that shown in FIG. 5I, where predefined shape 522 (e.g., a rectangle) enclosing the open path drawn by touch gesture 513 is visually distinguished. In some embodiments, predefined shape 522 and its size and location are selected so that predefined shape 522 includes all the user interface objects that are intersected by the open path of touch gesture 513 (FIG. 5I). After device 100 enters the restricted interaction mode (e.g., in response to a tap gesture on user interface object 518), predefined shape 522 is displayed and device 100 ignores touch inputs at locations corresponding to any user interface objects (e.g., user interface objects 504-1 through 504-7) located within predefined shape 522 while in the restricted interaction mode.

In FIG. 5L, touch gesture 515 (e.g., a tap gesture) is detected at a location that corresponds to user interface object 518, which causes the device to exit the interaction configuration mode and enter the restricted interaction mode. Two exemplary user interfaces 524 and 526, which may be displayed in response to detecting touch gesture 515 at the location that corresponds to user interface object 518 (FIG. 5L), are illustrated in FIGS. 5M and 5N, respectively.

In FIG. 5M, touch gesture 517 (e.g., a tap gesture) is detected in the restricted interaction mode at a location that corresponds to user interface object 504-3 located in predefined shape 522. In response to detecting touch gesture 517 at the location that corresponds to user interface object 504-3, device 100 ignores (i.e., does not respond to) touch gesture 517. FIG. 5M also illustrates that touch gesture 519 (e.g., a tap gesture) is detected in the restricted interaction mode at a location that corresponds to the character "A" displayed on touch screen 112. In response to detecting touch gesture 519 on touch screen 112 at the location that corresponds to the character "A," device 100 produces sounds corresponding to the pronunciation of the character "A" because this part of the user interface was not selected for deactivation while in the interaction configuration mode.

Alternatively, in FIG. 5N, a plurality of user interface objects (e.g., the character "A," the word "Apple," and a picture of an apple) is displayed on touch screen 112, without displaying shape 522 and without displaying user interface objects 504-1 through 504-7 (FIG. 5L) located within predefined shape 522 (FIG. 5L). In FIG. 5N, the device does not respond to touch inputs in the area that corresponds to predefined shape 522 in FIG. 5L. In response to detecting a touch gesture (e.g., a tap gesture, not shown) on touch screen 112 at a location that corresponds to the character "A," device 100 produces sounds corresponding to the pronunciation of the character "A" because this part of the user interface was not selected for deactivation while in the interaction configuration mode FIG. 5N also illustrates detection of user input 521 (e.g., a triple click of home button 204).

FIG. 5O illustrates that, in some embodiments, in response to detecting user input 521 (FIG. 5N), password menu 506 is displayed over user interface 526. A user may sequentially activate numerical buttons in password menu 506 (e.g., by tap gestures). When the user-provided sequence of numbers matches a preselected password, device 100 exits the restricted interaction mode and enters the unrestricted interaction mode, the user interface for which is illustrated in FIG. 5P. Alternatively, in some embodiments, in response to user input 521 (FIG. 5N), device 100 directly exits the restricted interaction mode and enters the unrestricted interaction mode without displaying password menu 506. In some embodiments, the password for exiting the restricted interaction mode is identical to the password for entering the interaction configuration mode (FIG. 5B). Alternatively, the password for exiting the restricted interaction mode may be distinct from the password for entering the interaction configuration mode.

FIG. 5P illustrates user interface 502 after device 100 exits from the restricted interaction mode and enters the unrestricted interaction mode (e.g., in response to user input 521, FIG. 5N, and, if needed, entry of a matching password, FIG. 5O). As the name implies, in the unrestricted interaction mode, the user interface objects are configured to operate and respond without having some user interface objects disabled or otherwise prevented from being activated (which happens in the restricted interaction mode). For example, in FIG. 5P, touch gesture 523 (e.g., a tap gesture) is detected in the unrestricted interaction mode at a location that corresponds to user interface object 504-3. In response to detecting touch gesture 523 at the location that corresponds to user interface object 504-3, device 100 displays a help menu or help dialogue over user interface 502. FIG. 5P also illustrates that touch gesture 525 (e.g., a tap gesture) is detected in the unrestricted interaction mode at a location that corresponds to the character "A". In response to detecting touch gesture 525 at the location that corresponds to the character "A," device 100 produces sounds corresponding to the pronunciation of the character "A." Object 504-3 and the character "A" respond normally to touch inputs in the unrestricted interaction mode.

FIGS. 5AC-5AD illustrate exemplary user interfaces for signaling an incoming call while in a restricted interaction mode in accordance with some embodiments.

In some embodiments, while device 100 is in the restricted interaction mode, an incoming call is declined unless predefined criteria are met. In some embodiments, while device 100 is in the restricted interaction mode, when device 100 receives an incoming call that satisfies predefined signaling criteria, device 100 outputs a signal indicating the incoming call. For example, in some embodiments, when an incoming call comes from a phone number in a predefined list of phone numbers (e.g., a phone number of a family member) or when multiple calls are received from a same phone number within a predefined time period (e.g., two or more calls received within one minute, two minutes, five minutes, etc.), device 100 outputs the signal indicating the incoming call. In some embodiments, the signal includes an audible signal (e.g., a ring tone). In some embodiments, the signal includes a visual signal. For example, device 100 may display a call application user interface, as shown in FIG. 5AC. Alternatively, as shown in FIG. 5AD, device 100 may display user interface objects 576, 578, and 580 over the currently displayed user interface to visually indicate the incoming call.

In some embodiments, when the device signals the incoming call, a user of the device still needs to perform additional inputs to answer the incoming call. In some embodiments, the user merely has to activate an "Answer" button 578 (FIG. 5AC or 5AD), e.g., with a tap gesture. In some embodiments, the user has to enter a password to exit the restricted interaction mode, as described above with respect to FIG. 5O. This would allow a parent or care giver to answer the phone, but prevent a child from answering the phone. In some embodiments, when the call ends, the device automatically returns to the restricted interaction mode.

In some other embodiments, device 100 exits from the restricted interaction mode (and/or enters the unrestricted interaction mode) in response to receiving an incoming call that satisfies the predefined signaling criteria while device 100 is in the restricted interaction mode.

FIGS. 5Q-5T illustrate exemplary user interfaces of a card matching game in accordance with some embodiments.

Figure 5Q:
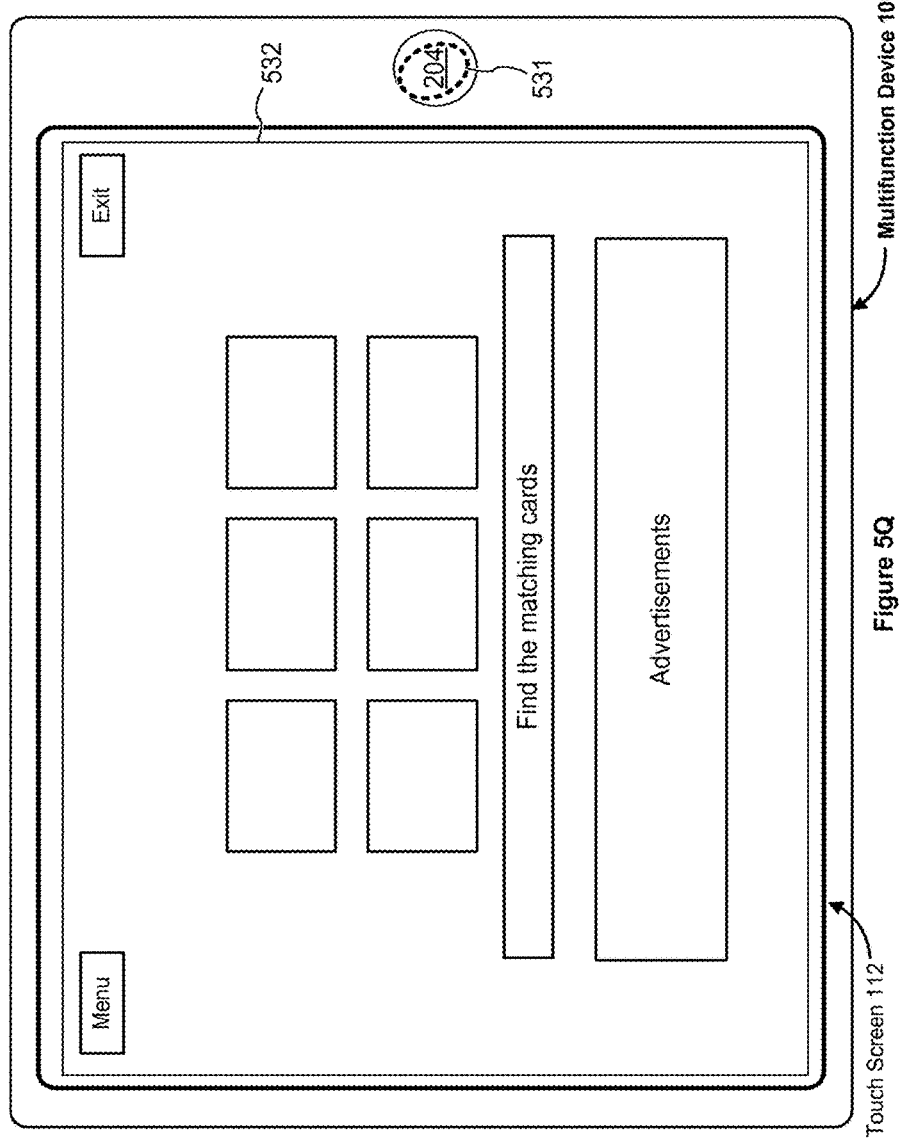

FIG. 5Q illustrates exemplary user interface 532 of the card matching game, which includes a plurality of user interface objects, such as "menu" and "exit" buttons, multiple cards, a user instruction message (e.g., "find the matching cards"), and a region for display of advertisement.

In FIG. 5Q, user input 531 (e.g., a triple click of home button 204) is detected.

Figure 5R:
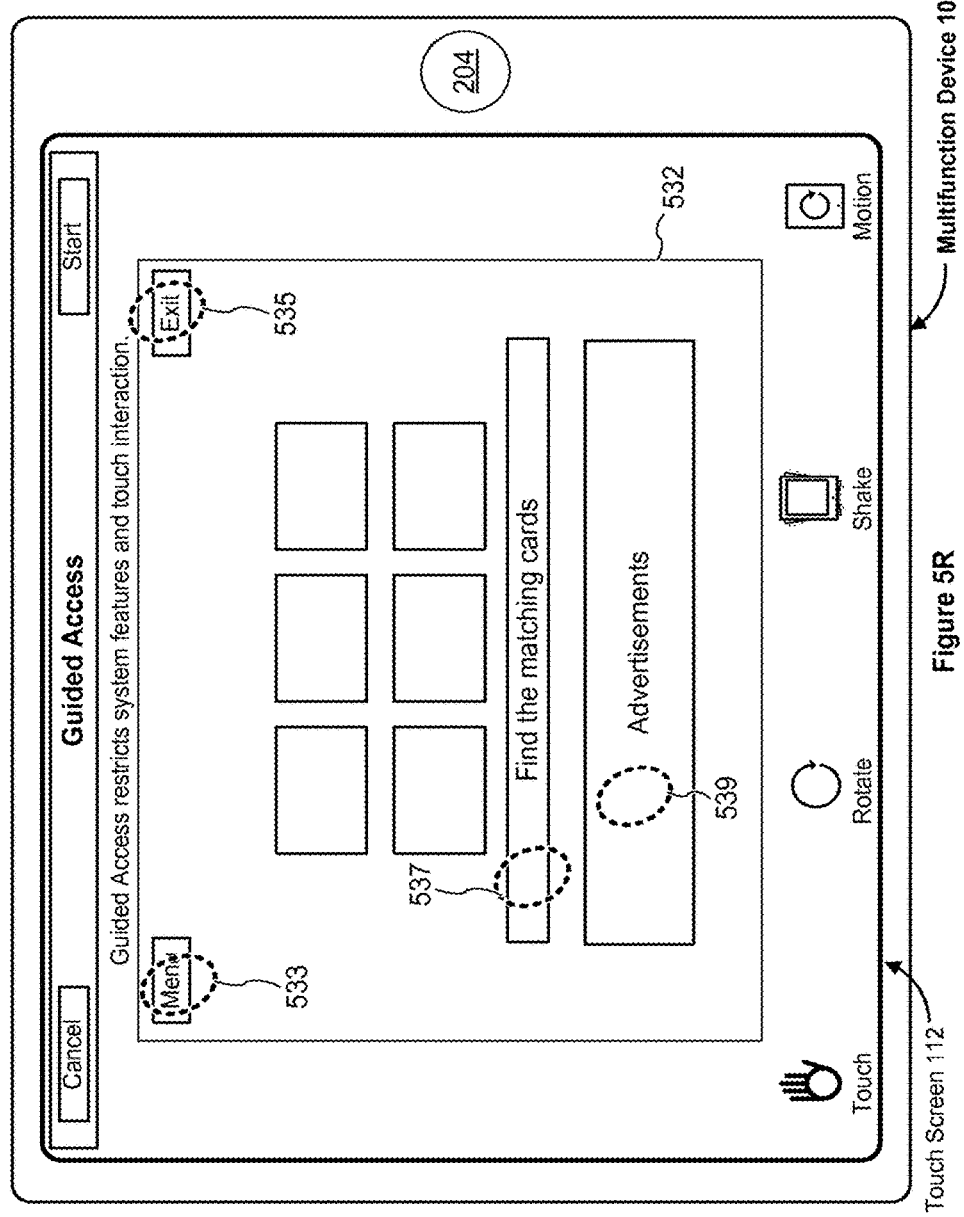

FIG. 5R illustrates an exemplary user interface of the interaction configuration mode for the card matching game. In FIG. 5R, user interface 532 is displayed at a reduced scale. In other words, user interface 532 is displayed smaller in the interaction configuration mode (FIG. 5R) than in the unrestricted interaction mode (FIG. 5Q).

In FIG. 5R, gesture inputs 533, 535, 537, and 539 (e.g., tap gestures) are detected at locations that correspond to a plurality of user interface objects in user interface 532, thereby selecting the plurality of user interface objects.

Figure 5S:
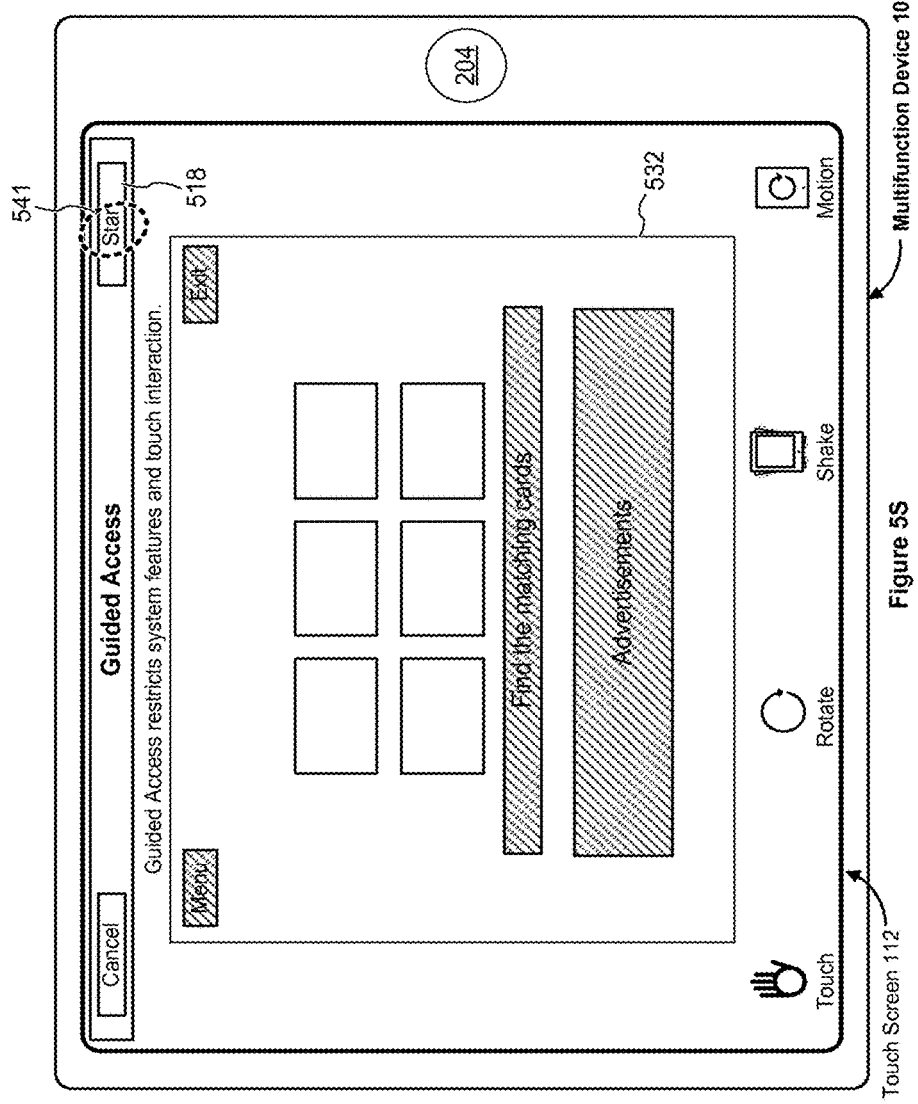

FIG. 5S illustrates that the selected plurality of user interface objects is visually distinguished. FIG. 5S also illustrates that touch gesture 541 is detected at a location that corresponds to user interface object 518, a "Start" icon for exiting the interaction configuration mode and starting/entering the restricted interaction mode.

FIG. 5T illustrates exemplary user interface 534 displayed in response to detecting touch gesture 541 at the location that corresponds to user interface object 518. In FIG. 5T, user interface objects that are not selected by gesture inputs 533, 535, 537, and 539 (FIG. 5R) continue to be displayed on touch screen 112, and the rest of touch screen 112 is visually distinguished (e.g., dimmed, masked, covered, etc.). In some embodiments, device 100 displays, in response to touch gesture 541, only user interface objects that are not selected by gesture inputs 533, 535, 537, and 539 (FIG. 5R). In some embodiments, the user interface objects that are not selected by gesture inputs 533, 535, 537, and 539 (FIG. 5R) are rotated, centered, and/or resized to fill the display (not shown).

FIG. 5T also illustrates that touch gesture 543 (e.g., a tap gesture) is detected at a location corresponding to a user interface object that is not selected by gesture inputs 533, 535, 537, and 539 (e.g., a card in the card matching game). In response to detecting touch gesture 543 at the location corresponding to the user interface object that is not selected by gesture inputs 533, 535, 537, and 539, device 100 performs a predefined operation (e.g., displaying an animation of turning a card disposed at the location corresponding to touch gesture 543). FIG. 5T further illustrates that touch gesture 545 (e.g., a tap gesture) is detected at a location of a user interface object (e.g., the "menu" user interface object shown in FIG. 5Q, not shown in FIG. 5T) that is visually distinguished (e.g., masked). In response to detecting touch gesture 545 at the user interface object that is visually distinguished (e.g., masked), device 100 ignores (does not respond to) touch gesture 545.

FIGS. 5U-5X illustrate exemplary user interfaces of a musical instrument application (e.g., GarageBand by Apple, Inc.) in accordance with some embodiments.

Figure 5U:
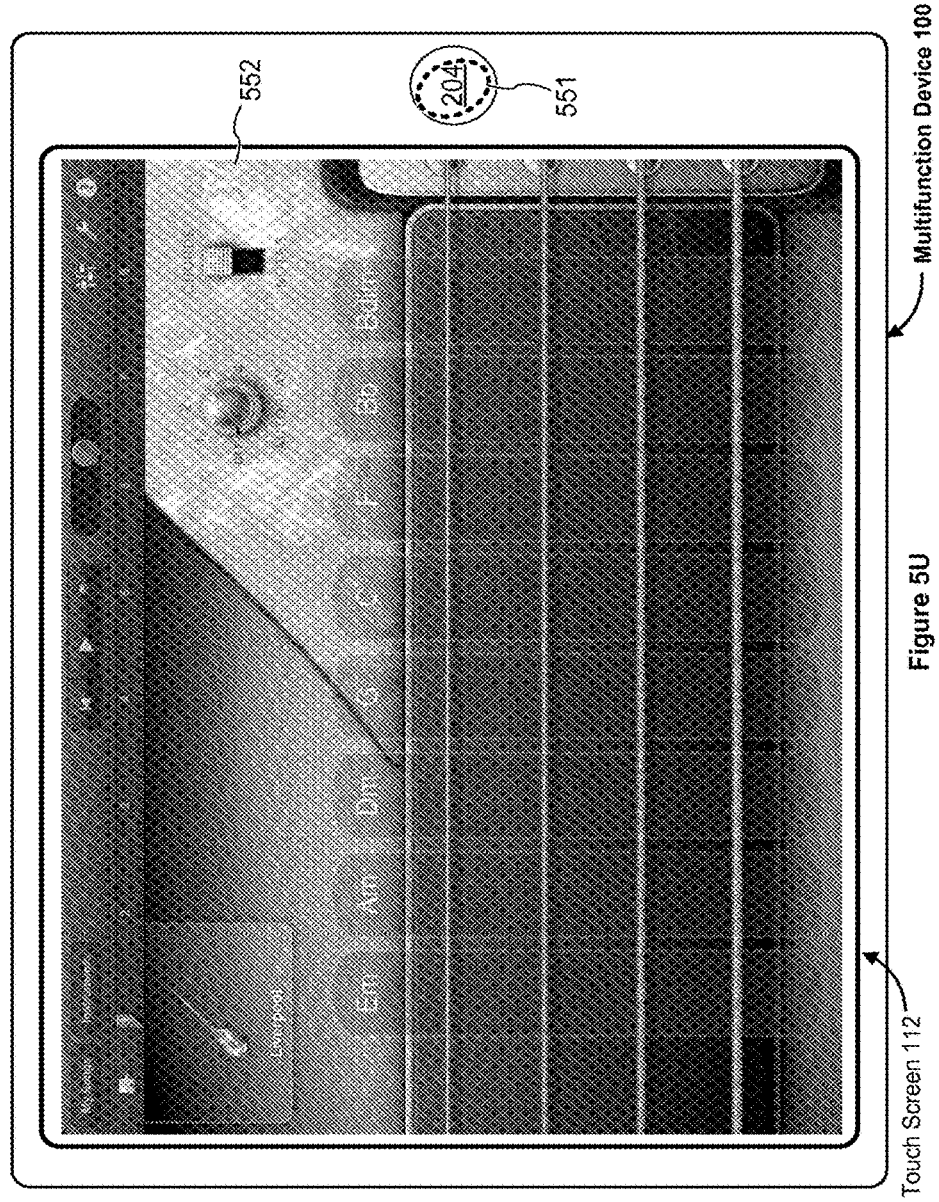

FIG. 5U illustrates exemplary user interface 552 of the musical instrument application, which includes a plurality of user interface objects, such as guitar strings, an autoplay dial, a chords/notes switch, a guitar selection button, and multiple menu bar user interface objects.

In FIG. 5U, user input 551 (e.g., a triple click of home button 204) is detected.

Figure 5V:
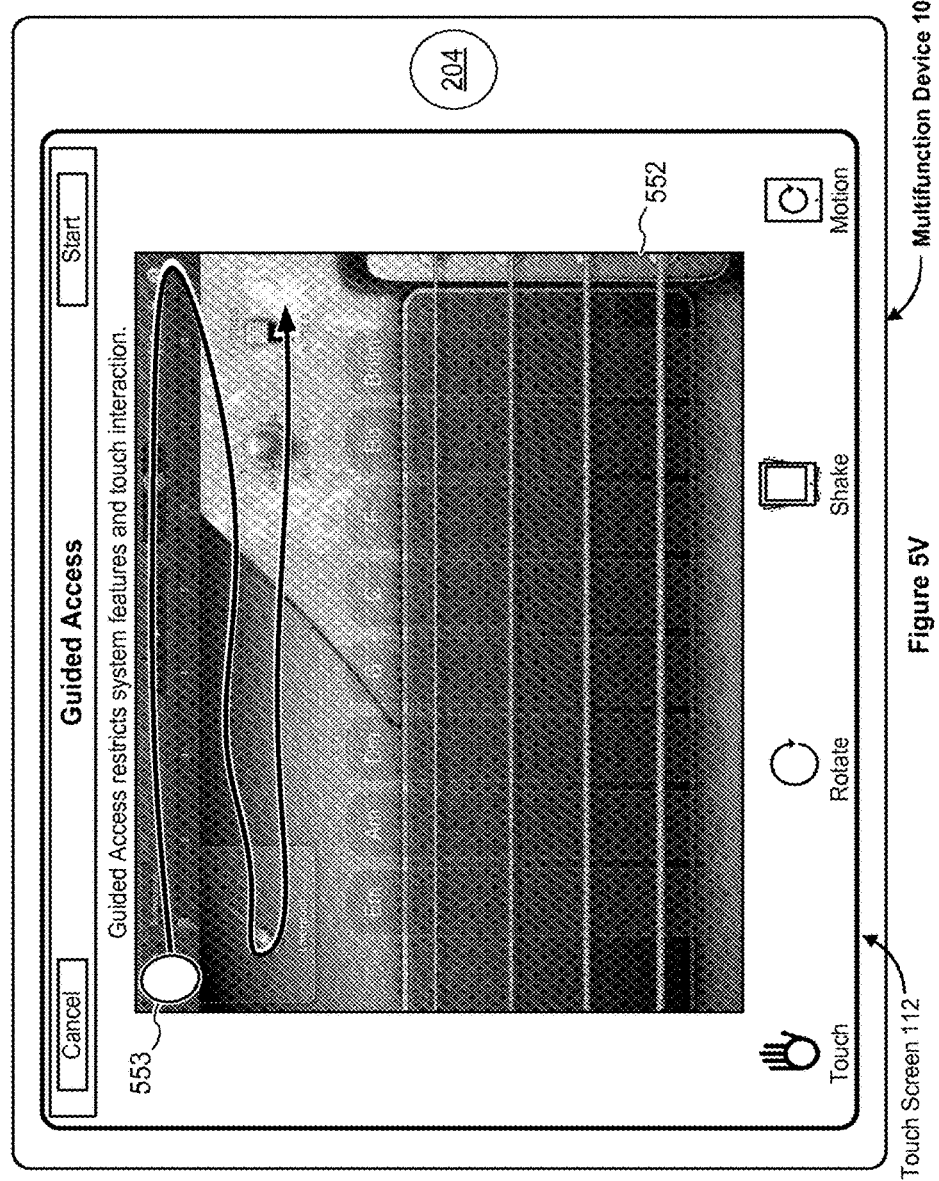

FIG. 5V illustrates an exemplary user interface of the interaction configuration mode for the musical instrument application. In FIG. 5V, user interface 552 is displayed at a reduced scale. In other words, user interface 552 is displayed smaller in the interaction configuration mode (FIG. 5V) than in the unrestricted interaction mode shown in FIG. 5U.

FIG. 5V also illustrates that gesture input 553 is detected on touch screen 112. As illustrated in FIG. 5R, gesture input 553 includes dragging of a finger contact across touch screen 112, where the path of the finger contact intersects with a plurality of user interface objects.

Figure 5W:
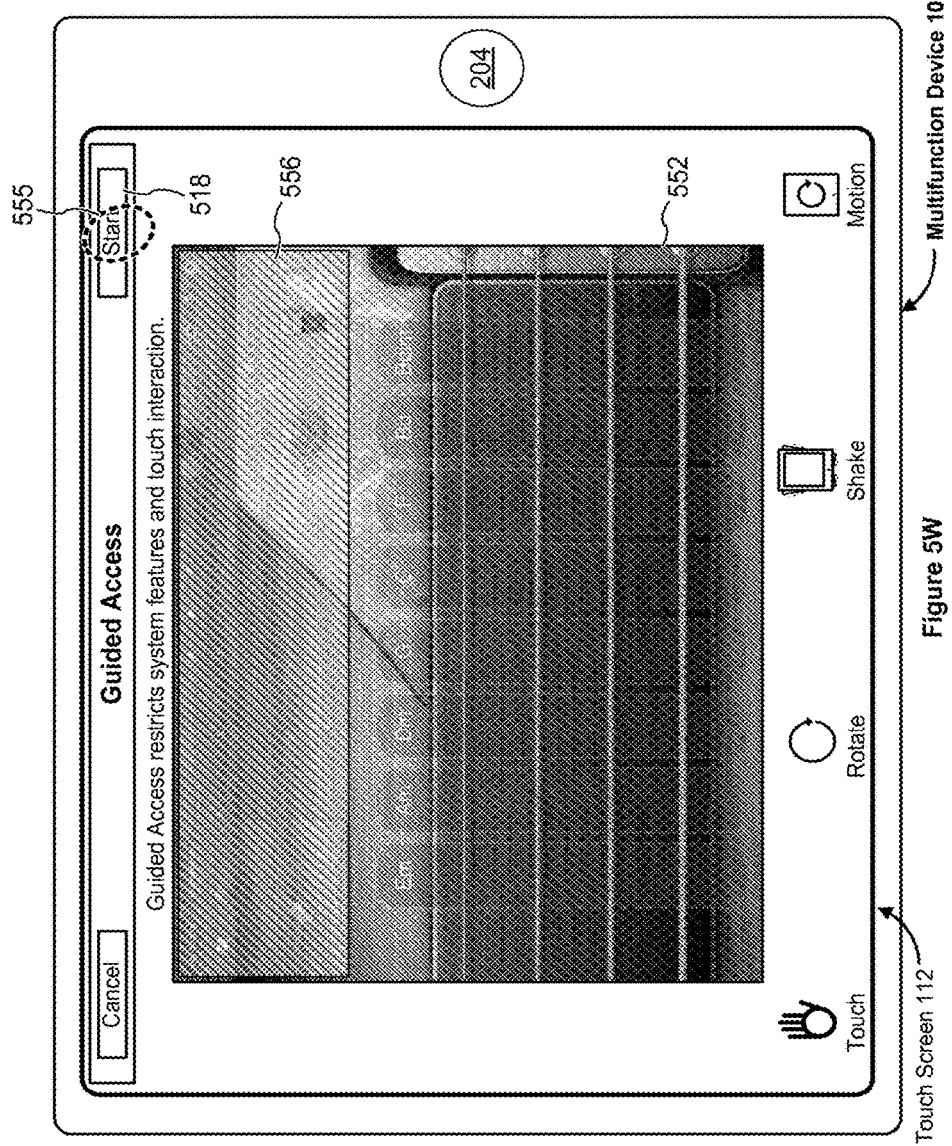

FIG. 5W illustrates that predefined shape 556 that corresponds to gesture input 553 (FIG. 5V) is displayed in response to detecting gesture 553. In some embodiments, predefined shape 556, which is transparent (e.g., only border lines of predefined shape 556 are visible), semi-transparent, or opaque, is displayed on touch screen 112. FIG. 5W also illustrates that touch gesture 555 is detected at a location that corresponds to user interface object 518, a "Start" icon for exiting the interaction configuration mode and starting/entering the restricted interaction mode.

FIG. 5X illustrates exemplary user interface 554 displayed in response to detecting touch gesture 555 at the location that corresponds to user interface object 518 (FIG. 5W). In FIG. 5X, predefined shape 556 visually distinguishes user interface objects located within predefined shape 556 (e.g., by masking the user interface objects located within predefined shape 556 with semi-transparent predefined shape 556). FIG. 5X also illustrates that touch gesture 557 is detected at a location that corresponds to a guitar string user interface object. In response to detecting touch gesture 557 at the location that corresponds to the guitar string user interface object, device 100 plays a note that corresponds to the location of touch gesture 557 (e.g., device 100 plays a note that corresponds to the G chord). FIG. 5X further illustrates that touch gesture 559 (e.g., a tap gesture) is detected at a user interface object (e.g., the "my songs" user interface object) that is visually distinguished (e.g., masked). In response to detecting touch gesture 559 at the user interface object that is visually distinguished (e.g., masked), device 100 ignores (does not respond to) touch gesture 559.

Figure 5Y:
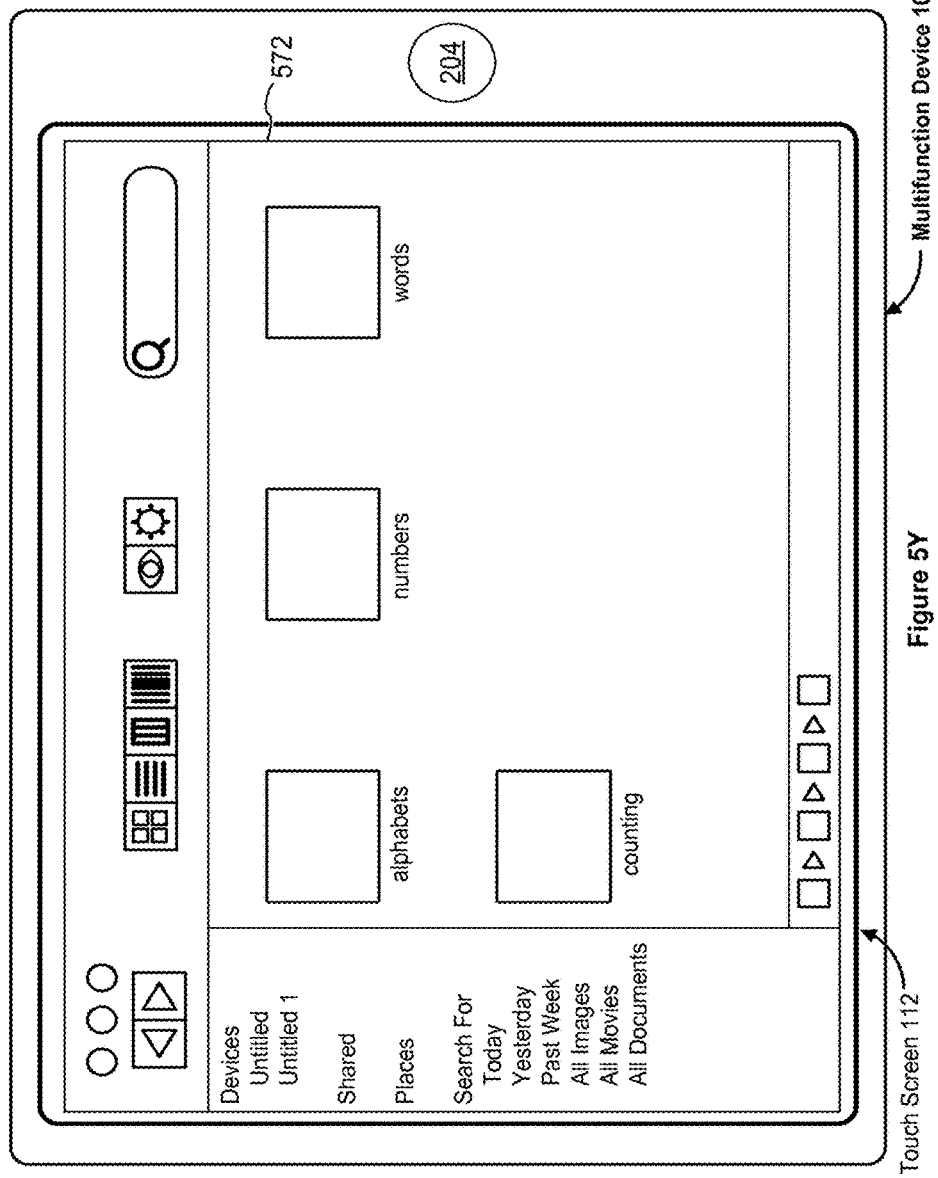
Figure 5Z:
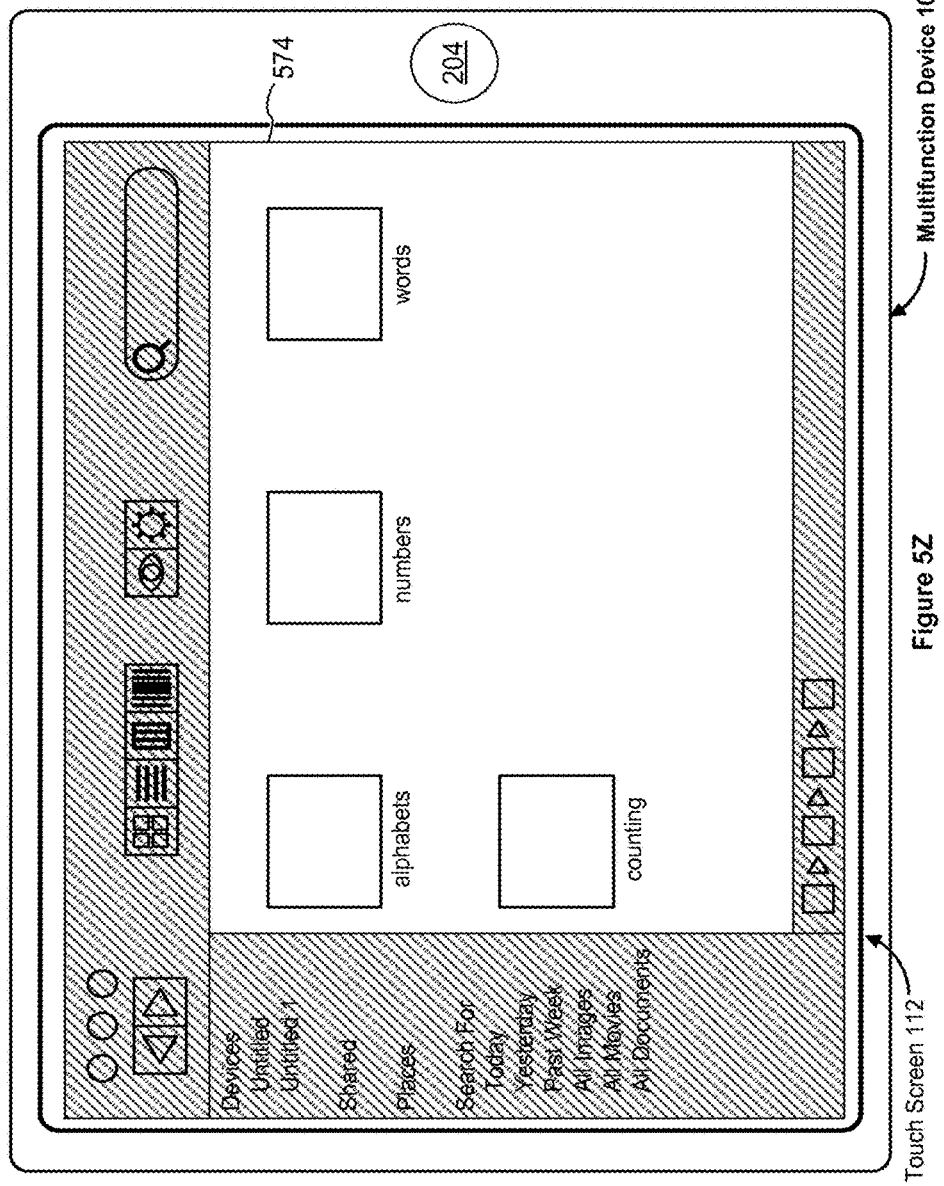
Figure 5A:
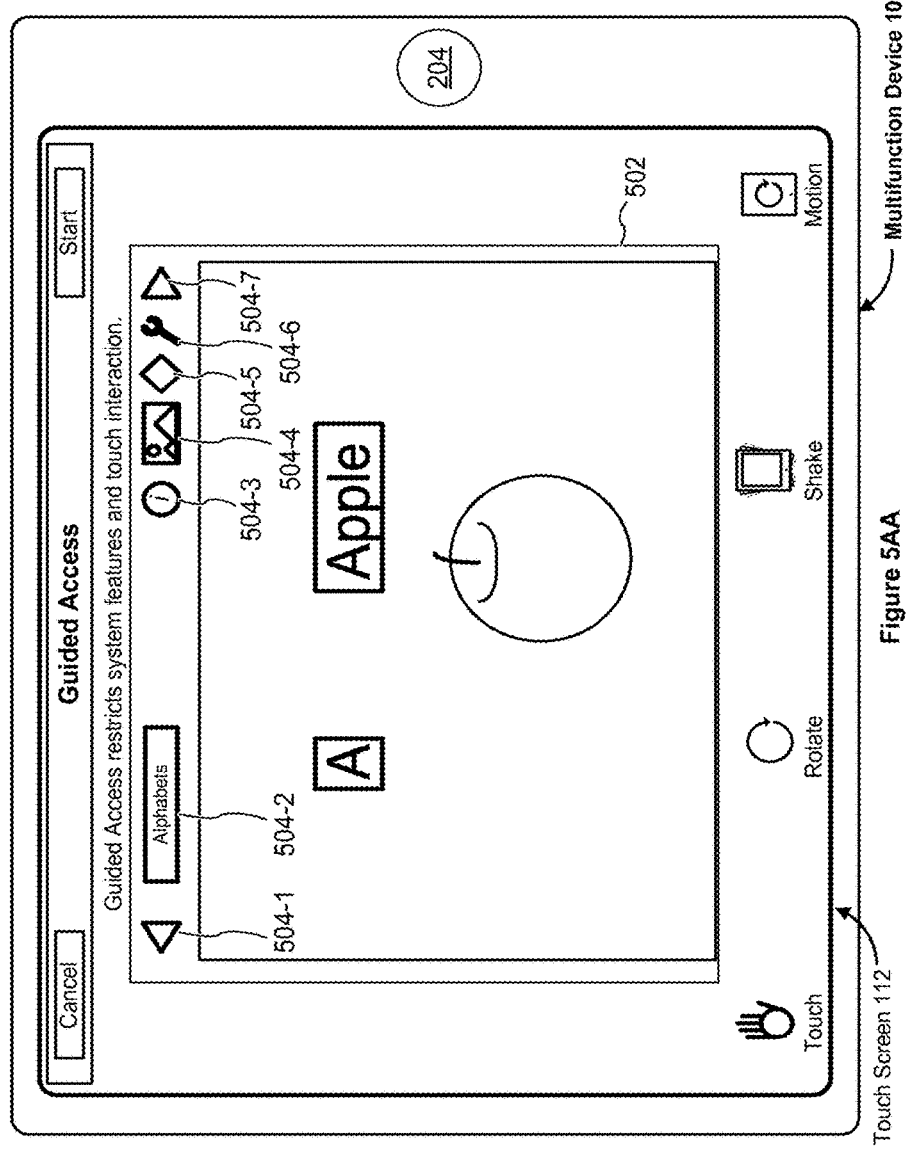
Figure 5A:
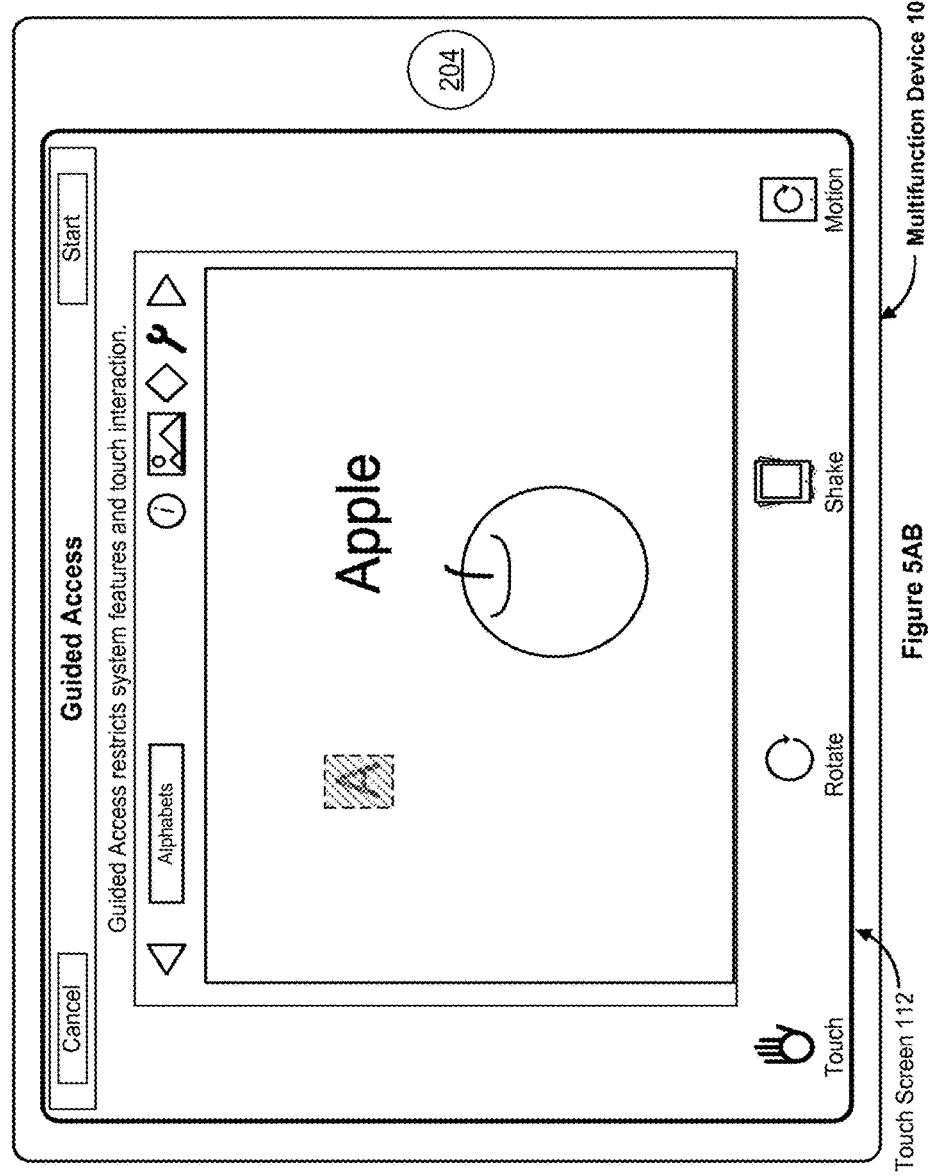
Figure 5A:
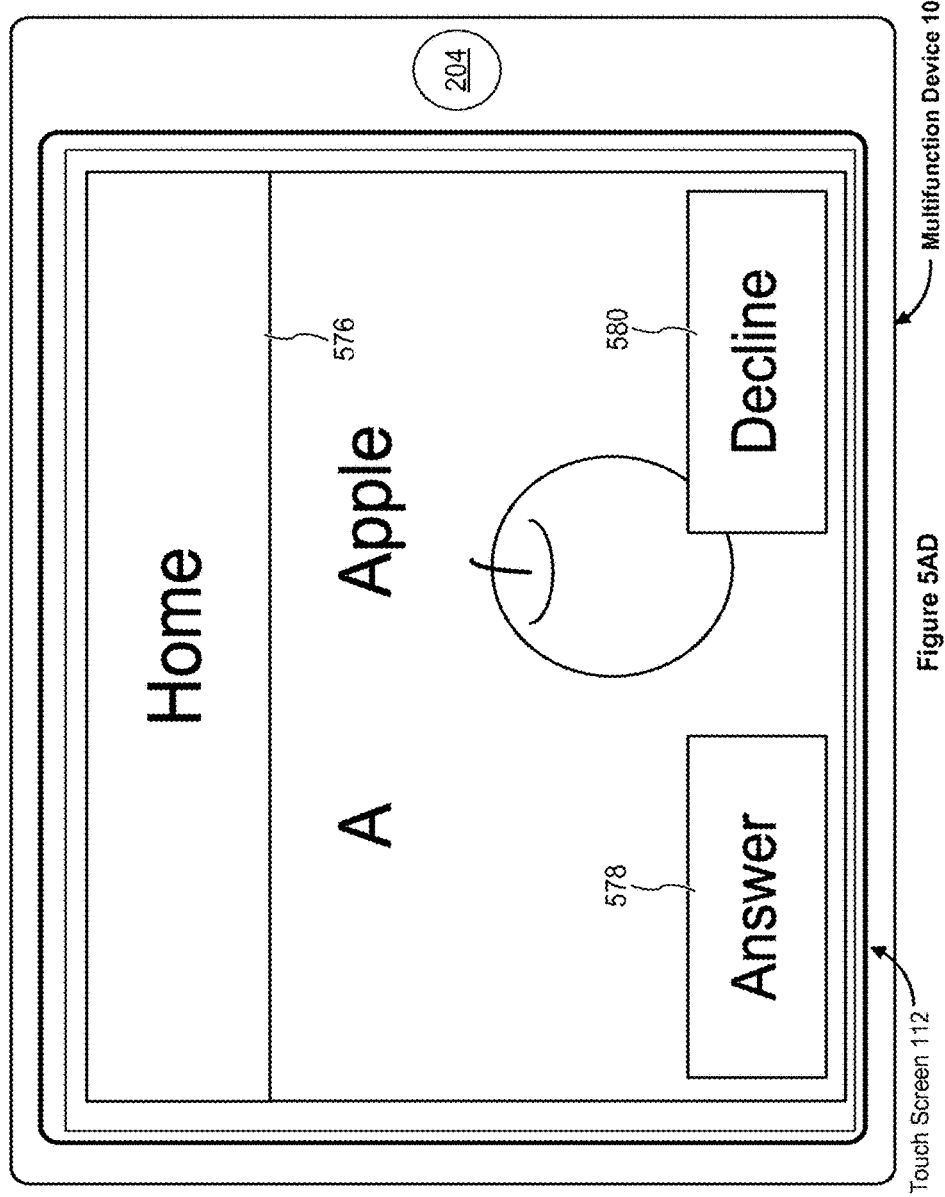
Figure 5A:
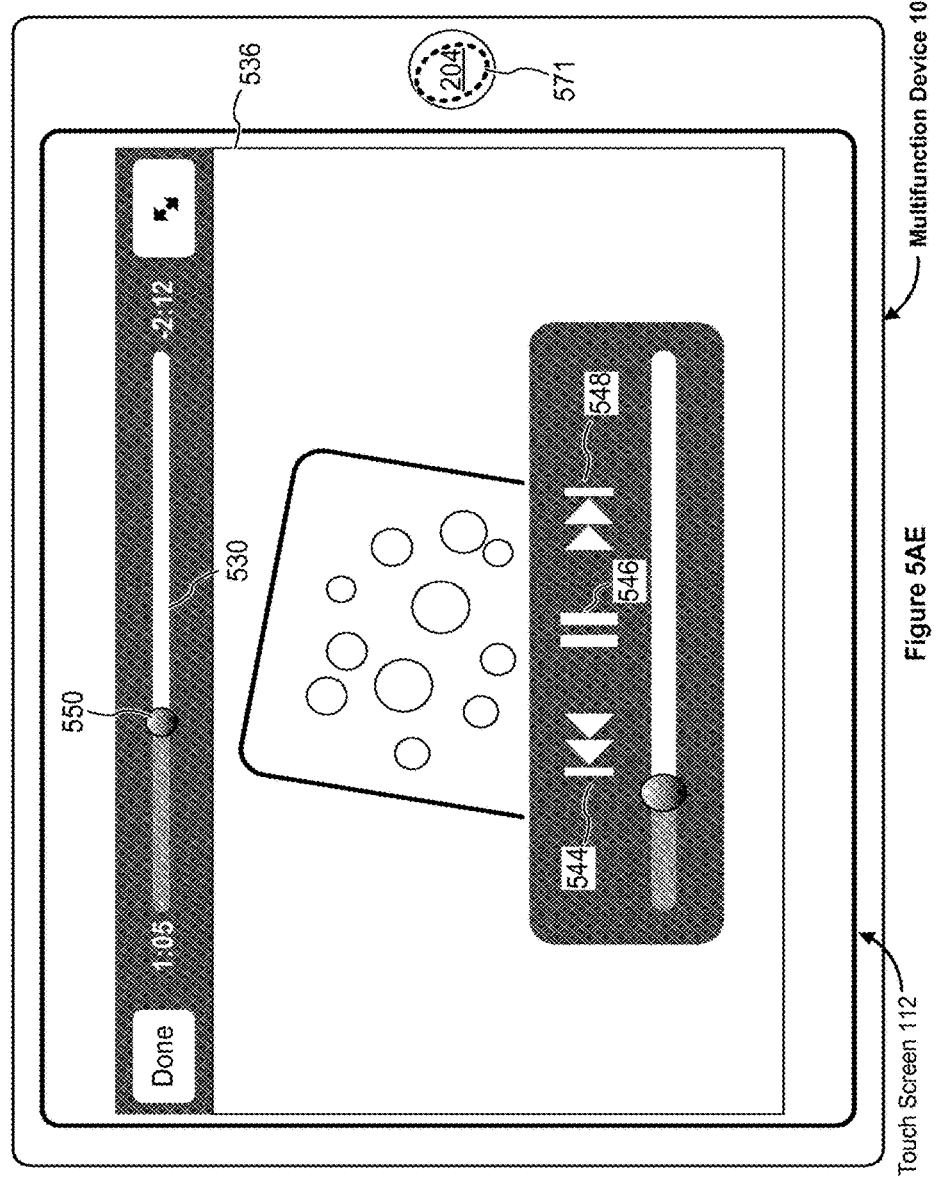
Figure 5A:
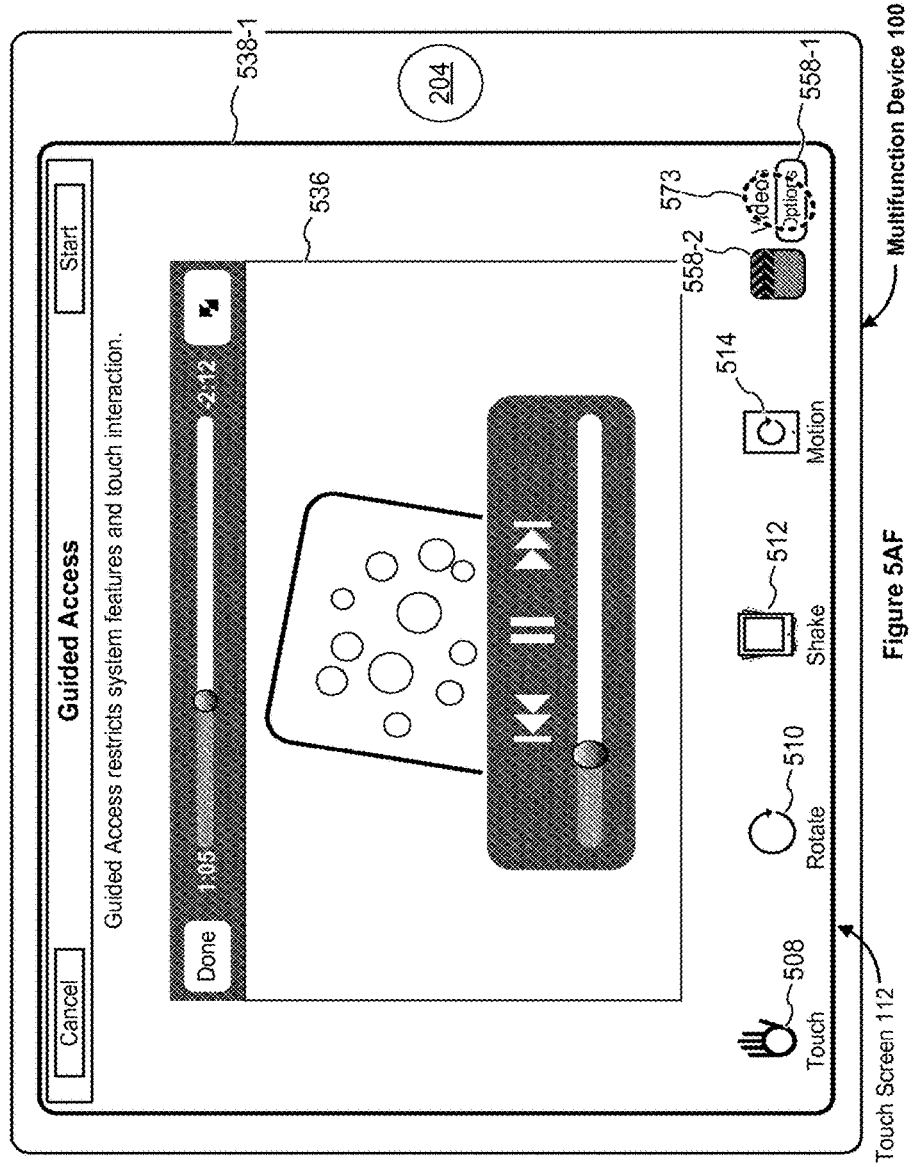
Figure 5A:
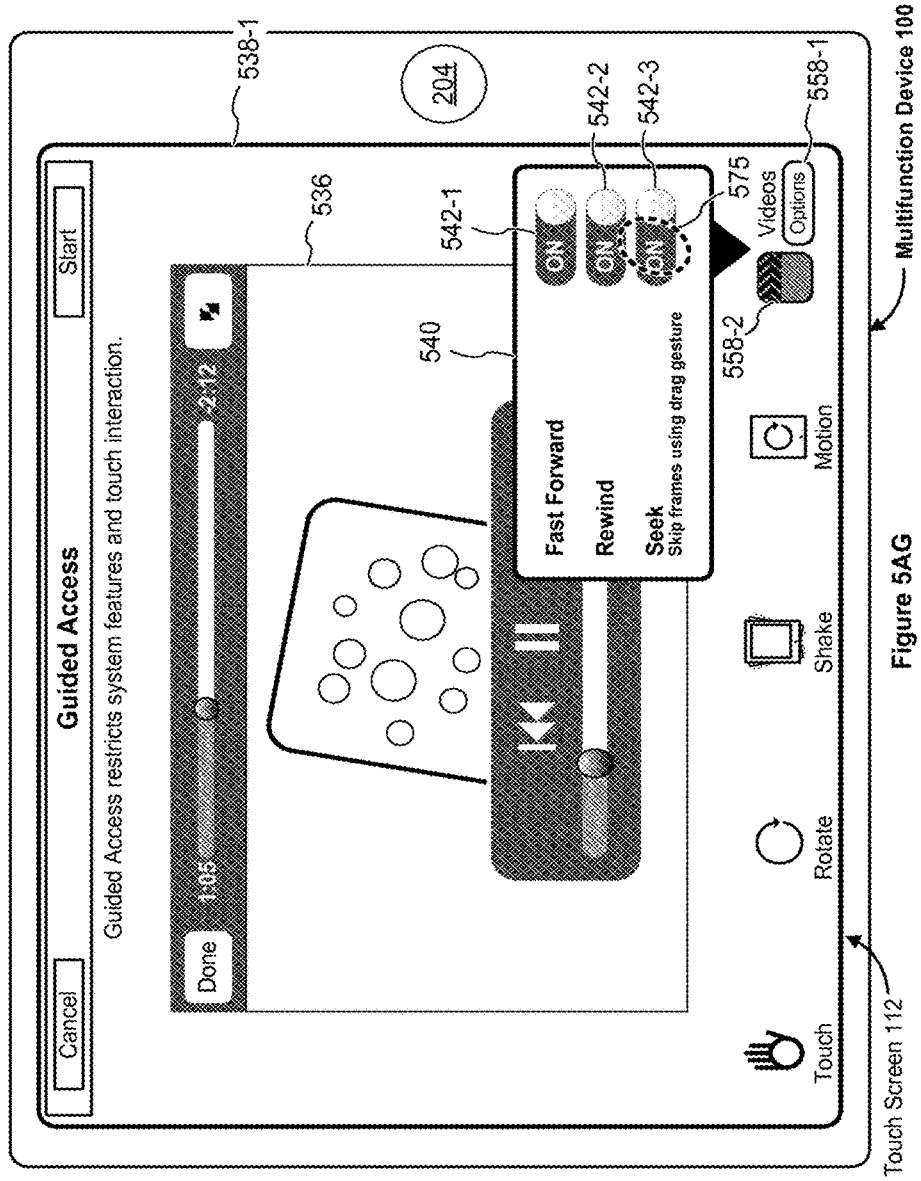
Figure 5A:
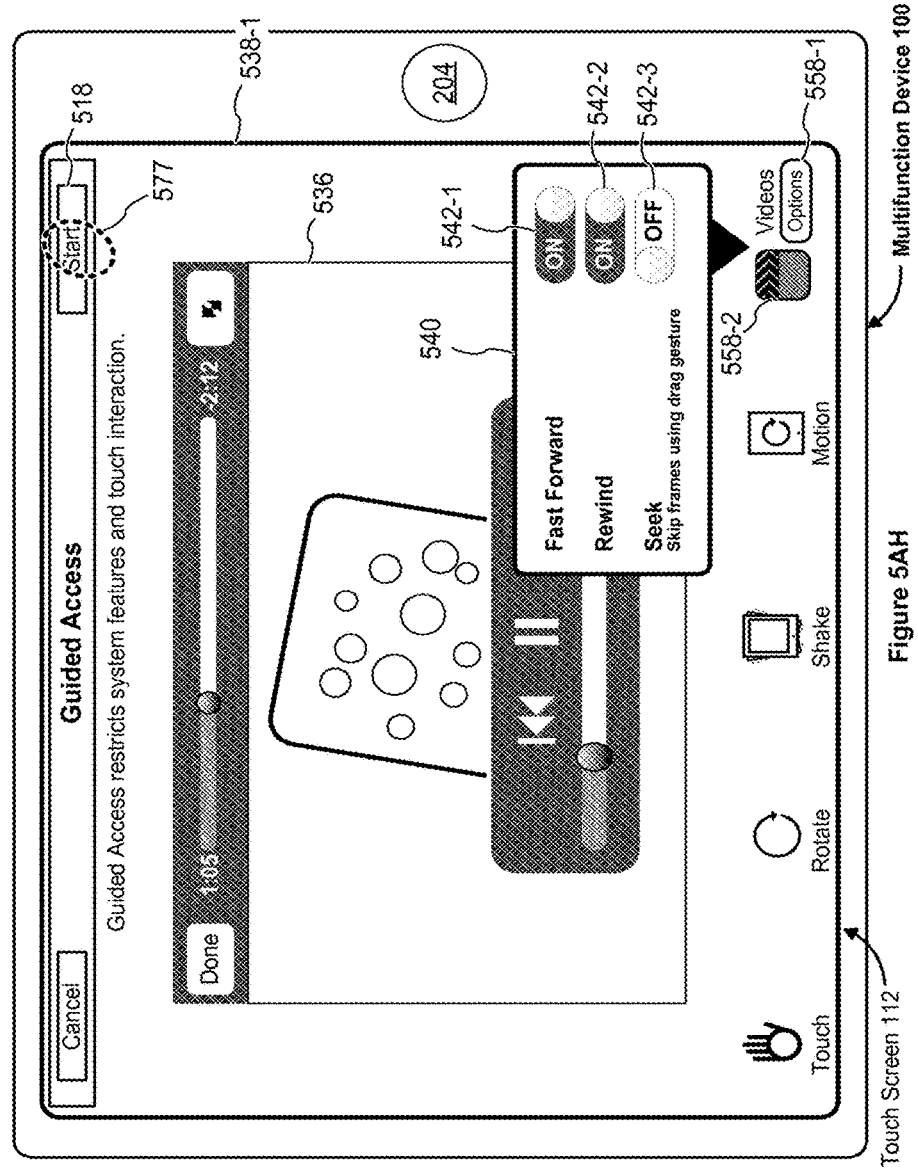
Figure 5A:
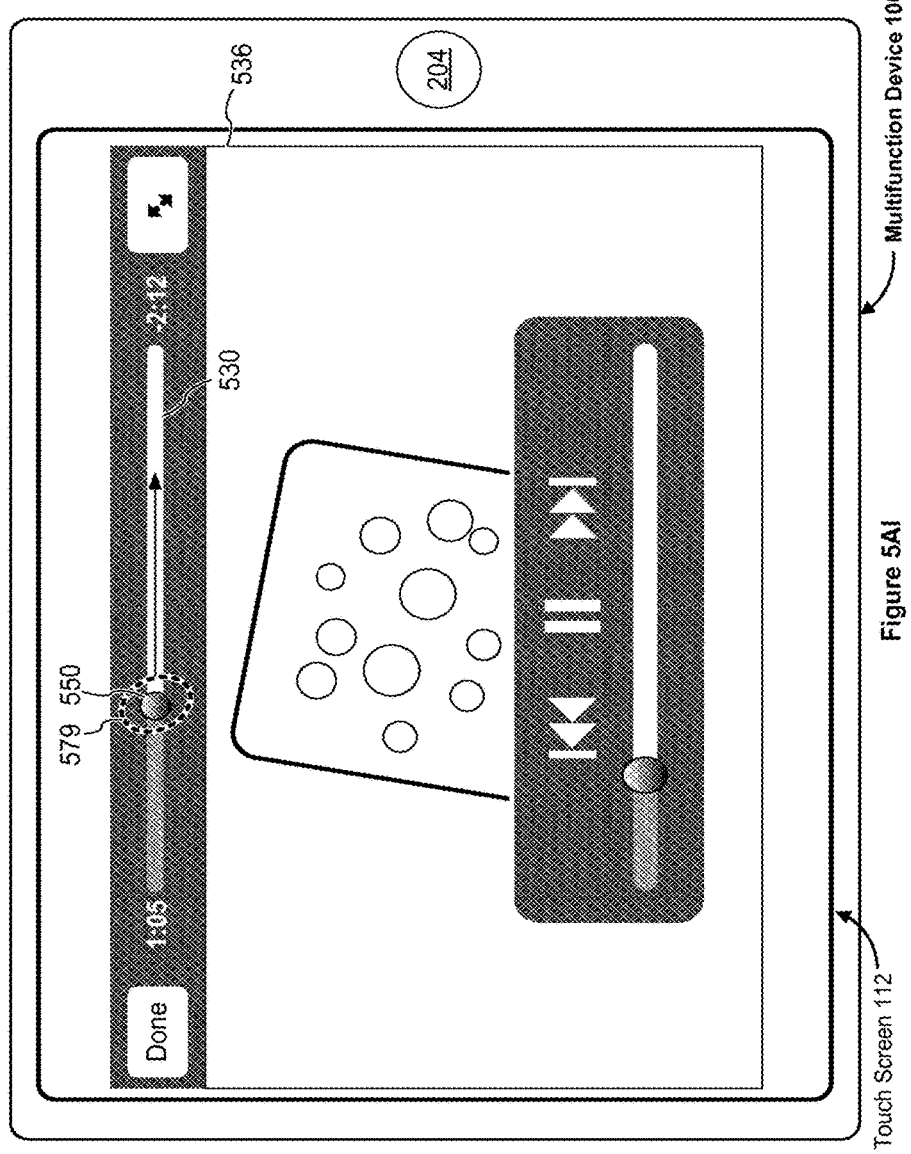
Figure 5A:
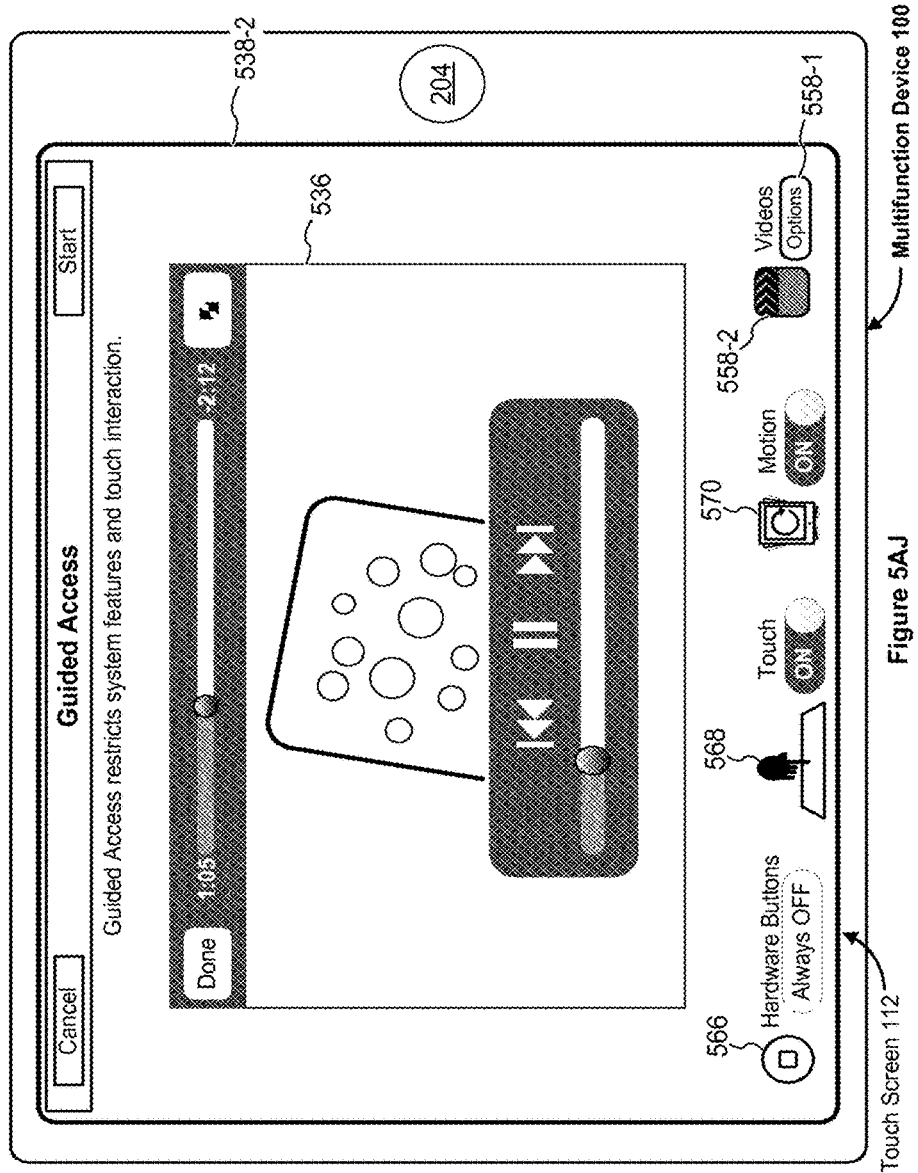
Figure 5A:
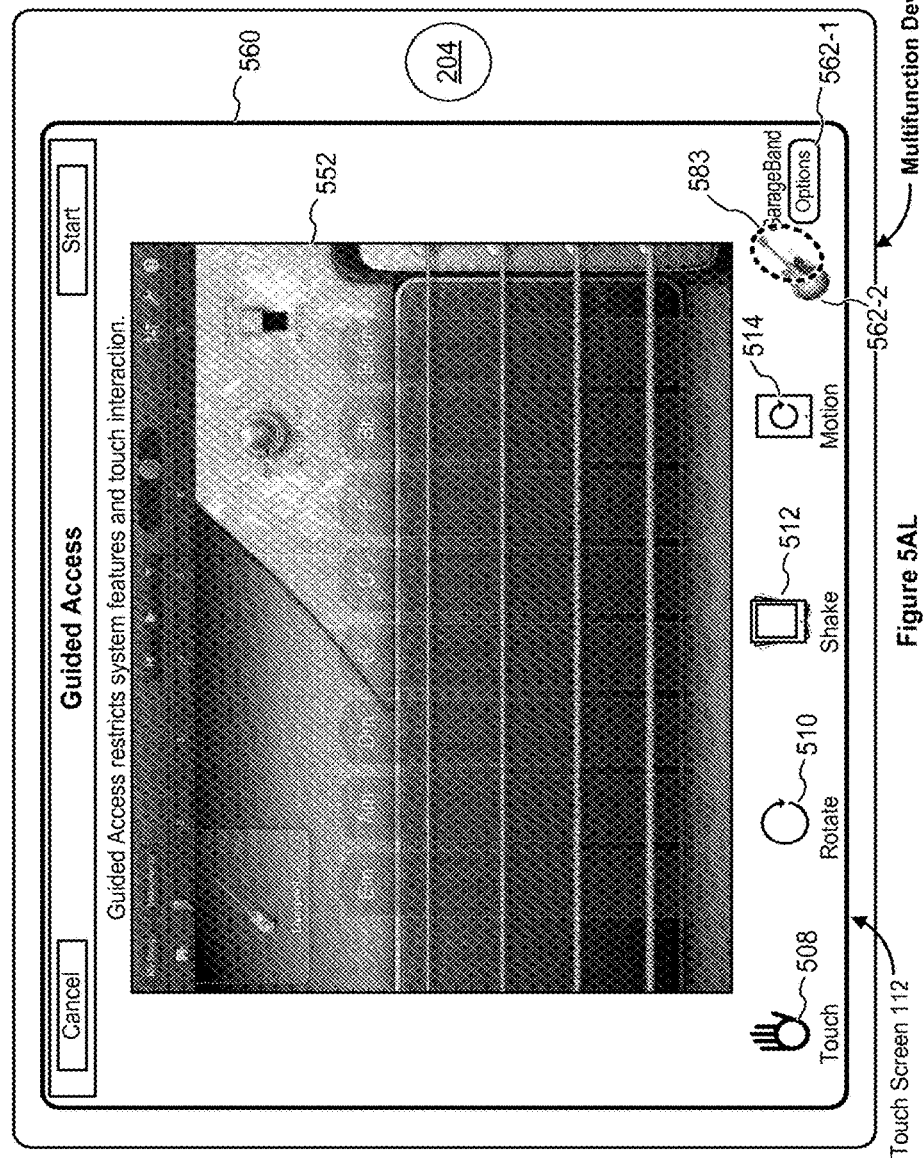
Figure 5A:
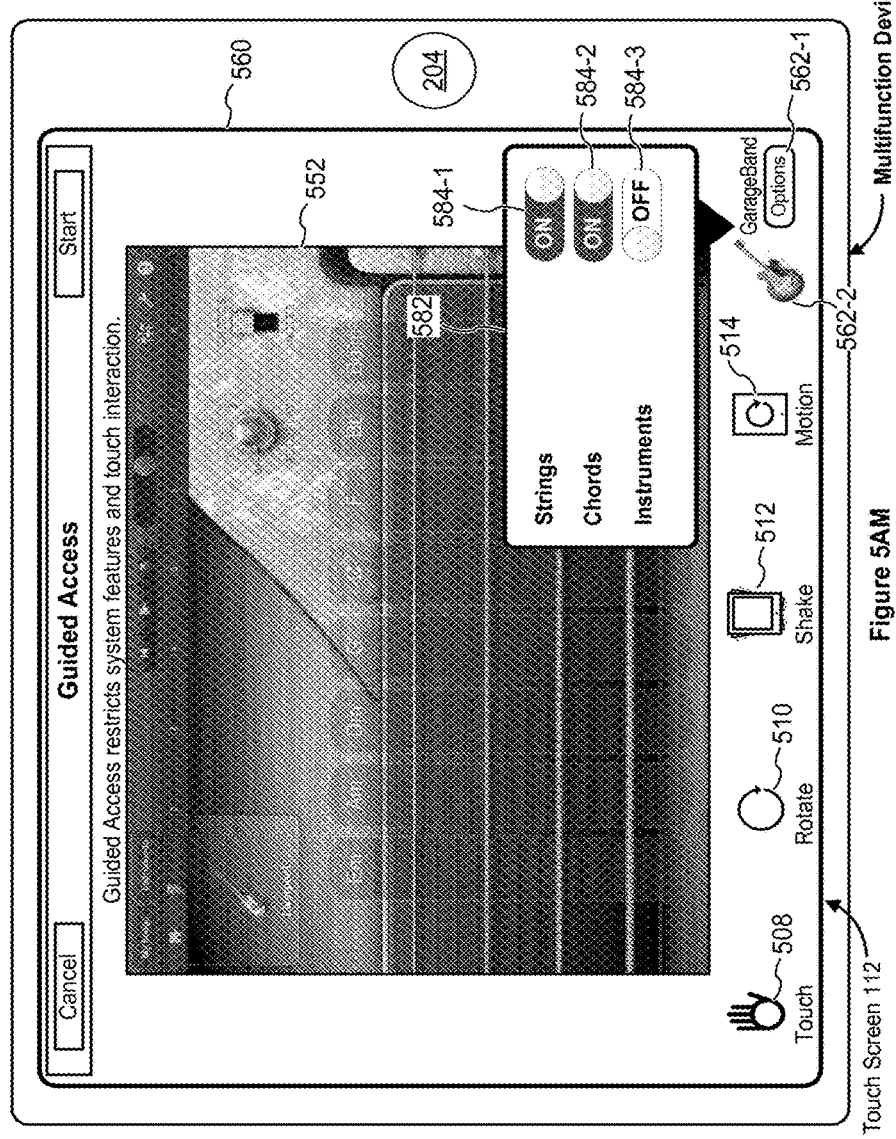
Figure 6A:
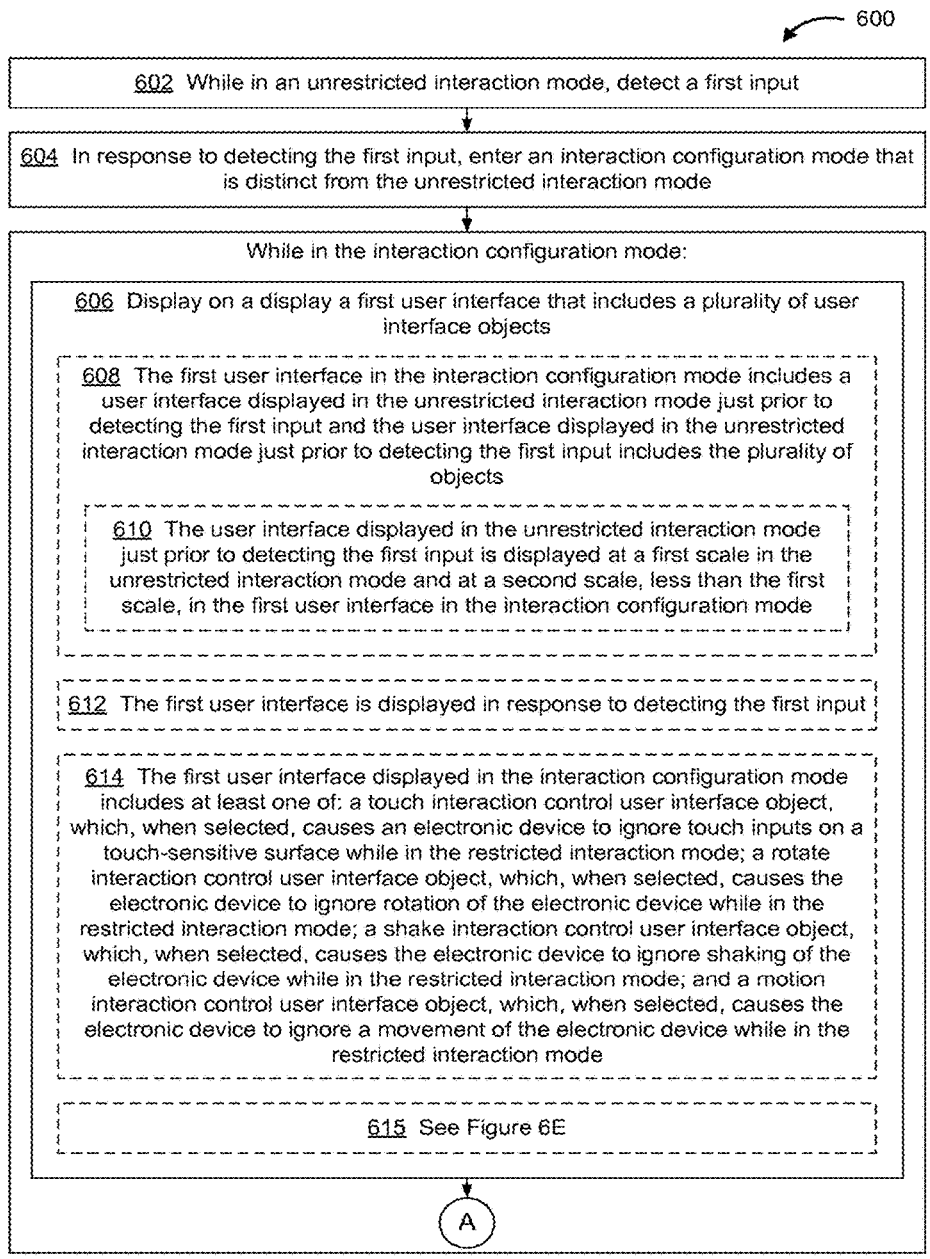
FIGS. 6A-6E are flow diagrams illustrating a method of configuring restricted interaction with a user interface of a software application in accordance with some embodiments.
Figure 6B:
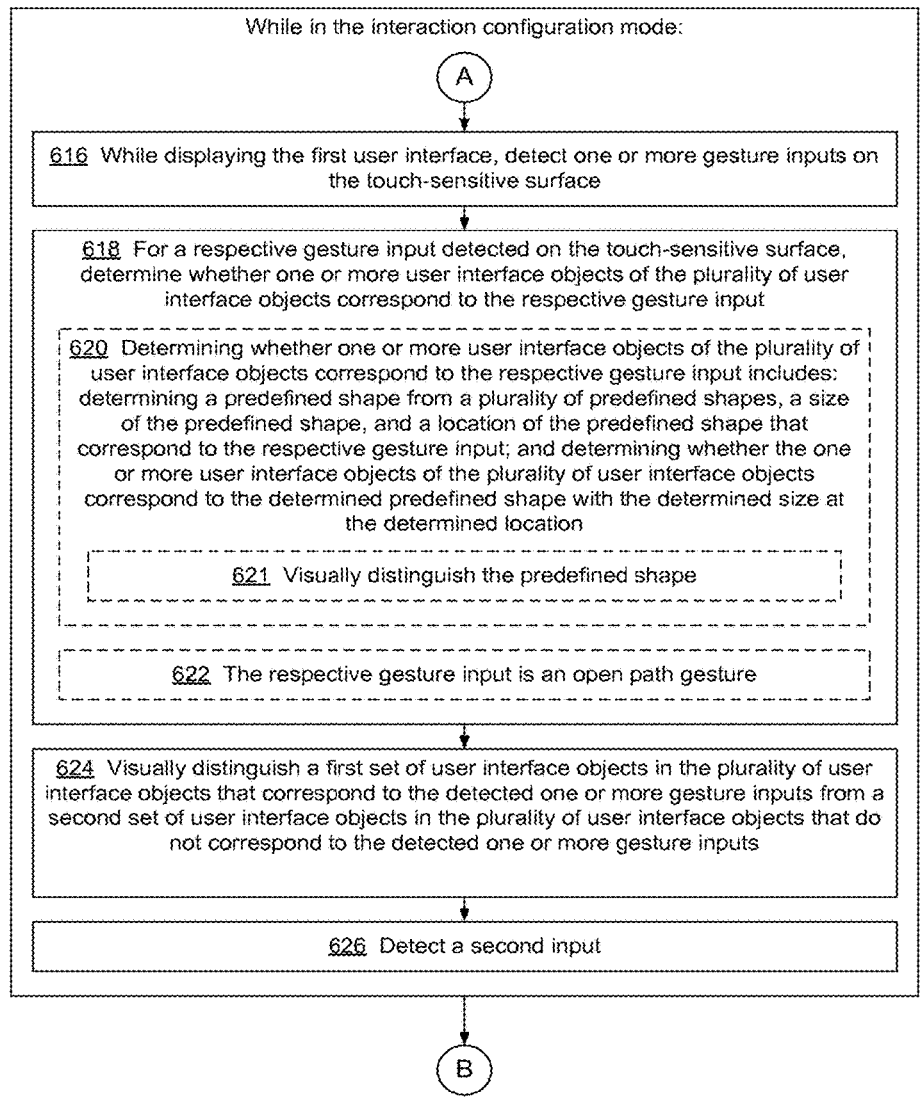
Figure 6C:
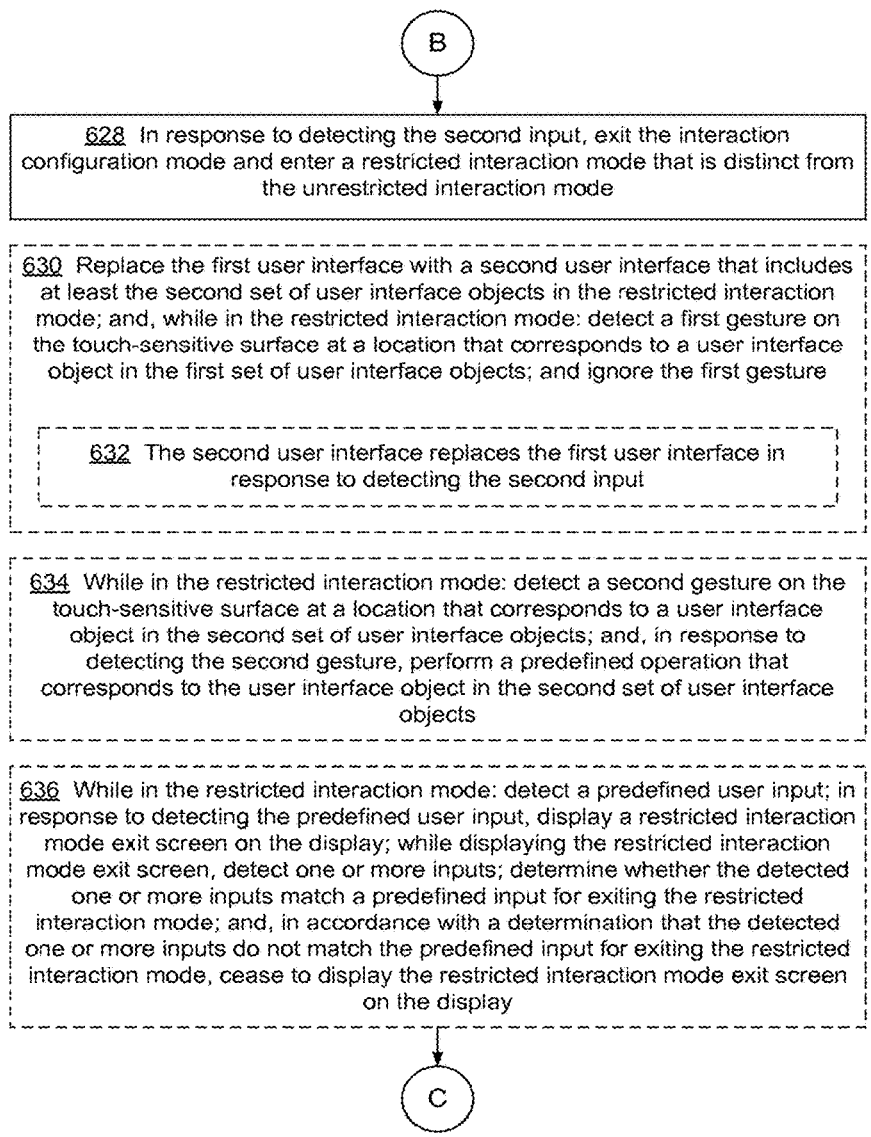
Figure 6D:
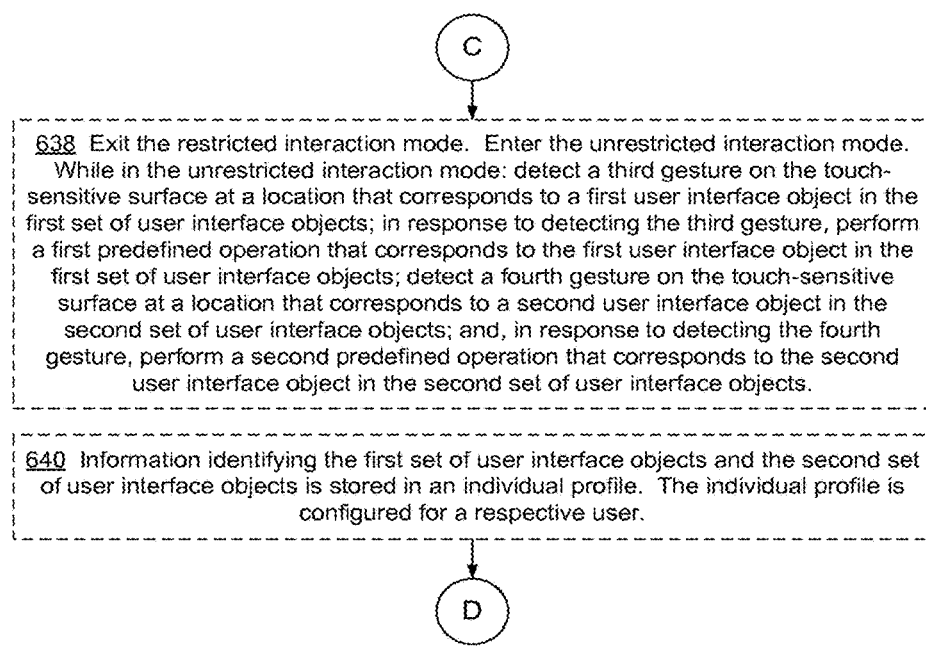
Figure 6E:
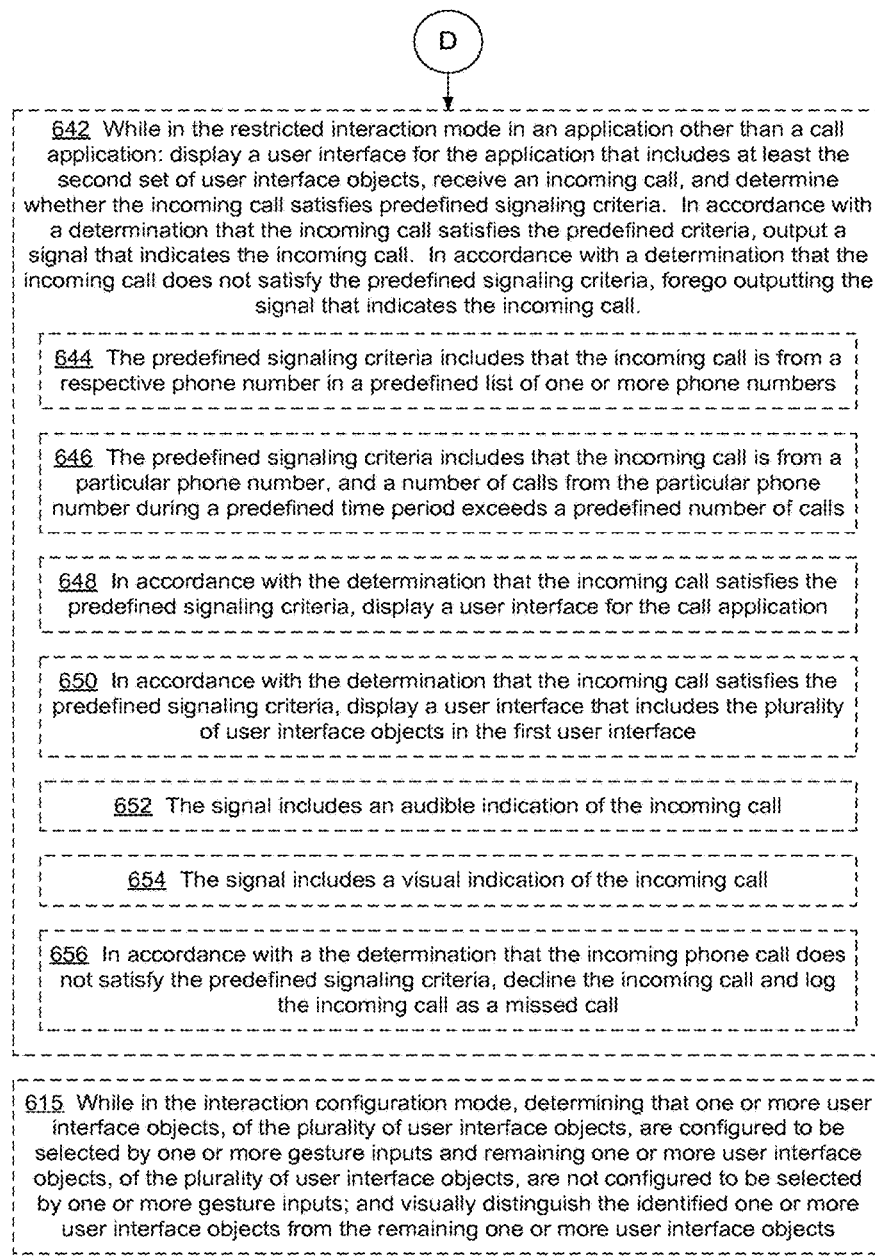

FIGS. 5Y-5Z illustrate exemplary user interfaces of a folder in accordance with some embodiments. FIG. 5Y illustrates exemplary user interface 572 of the folder, which includes a plurality of user interface objects, such as file or application icons (e.g., alphabets, numbers, words, are counting), a list of directories (e.g., devices, untitled, untitled 1, etc.), and multiple menu bar user interface objects. User interface 572 may be configured for restricted interaction in a manner similar to configuration of the other user interfaces described above, which need not be repeated here.

FIG. 5Z illustrates exemplary user interface 574 of the folder in the restricted interaction mode, in accordance with some embodiments. In FIG. 5Z, file or application icons (e.g., alphabets, numbers, words, and counting) remain unchanged compared the corresponding icons in user interface 572 (FIG. 5Y), and the other user interface objects and the regions (e.g., the list of directories and menu bar user interface objects) are visually distinguished. A touch gesture (e.g., a tap gesture) at a location that corresponds to one of the file or application icons initiates execution of a corresponding application or opening of a corresponding file, whereas a touch gesture (e.g., a tap gesture) at a location that corresponds to the one or more visually distinguished regions is ignored.

FIGS. 5AE-5AM illustrate exemplary user interfaces for configuring restricted interaction for applications and operating in a restricted interaction mode in accordance with some embodiments.

FIG. 5AE illustrates exemplary user interface 536 of a video player application, which includes a plurality of user interface objects, such as slider 530, slider handle 550, rewind icon 544, pause icon 546, and fast forward icon 548.

In FIG. 5AE, user input 571 (e.g., a triple click of home button 204) is detected.

FIG. 5AF illustrates exemplary user interface 538-1 of the interaction configuration mode for the video player application. User interface 538-1 includes user interface 536 in a reduced scale. In other words, user interface 536 is displayed smaller in the interaction configuration mode (FIG. 5AF) than in the unrestricted mode shown in FIG. 5AE.

User interface 538-1 also includes a plurality of interaction control user interface objects (e.g., touch interaction control user interface object 508, rotate interaction control user interface object 510, shake interaction control user interface object 512, and motion interaction control user interface object 514, as described above with respect to FIG. 5C) and application restriction controls display user interface object 558. In this example, application restriction controls display user interface object 558 includes "Options" icon 558-1, video player application icon 558-2, and/or an application name "Videos."

In FIG. 5AF, gesture 573 (e.g., a tap gesture) is detected at a location that corresponds to application restriction controls display user interface object 558. In this example, gesture 573 is detected at a location that corresponds to "Options" icon 558-1. In some embodiments, gesture 573 is detected at a location that corresponds to application icon 558-2 or the application name "Videos." In some embodiments, gesture 573 is detected at a location that corresponds to a predefined gesture activation area that encompasses "Options" icon 558-1, video player application icon 558-2, and the application name "Videos."

FIG. 5AG illustrates that application restriction control user interface objects 542-1, 542-2, and 542-3) are displayed on user interface 538 in response to gesture 573 (FIG. 5AF). In this example, application restriction control user interface objects 542-1, 542-2, and 542-3 indicate that corresponding features (e.g., fast forward, rewind, and seek features of the video player application) are to be enabled in a restricted interaction mode for the video player application. As illustrated in FIG. 5AG, in some embodiments, application restriction control user interface objects 542-1, 542-2, and 542-3 are displayed in popup view 540.

FIG. 5AG also illustrates that gesture 575 (e.g., a tap gesture) is detected at a location that corresponds to application restriction control user interface object 542-3.

In FIG. 5AH, in response to detecting gesture 575, the display of application restriction control user interface object 542-3 is changed to indicate that the corresponding feature (e.g., the "seek" feature of the video player application) is to be disabled in the restricted interaction mode for the video player application.

FIG. 5AH also illustrates that gesture 577 (e.g., a tap gesture) is detected at a location that corresponds to start user interface object 518. In response to detecting gesture 577, the device exits the interaction configuration mode for the video player application and enters the restricted interaction mode for the video player application.

FIG. 5AI illustrates user interface 536 of the video player application in the restricted interaction mode. In FIG. 5AI, gesture 579 (e.g., a horizontal swipe gesture) is detected at a location that corresponds to slider handle 550. While the device is in the restricted interaction mode for the video player application, gesture 579 on slider handle 550 is ignored in accordance with the settings of application restriction control user interface objects (e.g., 542-1, 542-2, and 542-3) of the video player application. For example, when the setting of the "seek" application restriction control user interface object 542-3 (FIG. 5AH) is set to disable the "seek" feature in the restricted interaction mode for the video player application, user interface objects that correspond to the "seek" feature in the video player application are restricted in the restricted interaction mode for the video player application.

FIG. 5AJ illustrates alternative user interface 538-2 of the interaction configuration mode for the video player application. User interface 538-2 includes hardware buttons interaction control user interface object 566, which, when selected, causes the device to ignore one or more inputs on one or more hardware buttons of the device (e.g., home button, volume buttons, on/off buttons, etc.); touch interaction control user interface object 568; and motion interaction control user interface object 570. Touch interaction control user interface object 568 is equivalent to touch interaction control user interface object 508 illustrated in FIG. 5AF. However, touch interaction control user interface object 568 and touch interaction control user interface object 508 include different icons. In addition, touch interaction control user interface object 568 includes an on/off switch icon to indicate whether a corresponding feature of the video player application is configured to be enabled while the device is in the restricted interaction mode for the video player application. Motion interaction control user interface object 570 is equivalent to motion interaction control user interface object 514 illustrated in FIG. 5AF. However, motion interaction control user interface object 570 and motion interaction control user interface object 514 include different icons. In addition, motion interaction control user interface object 570 includes an on/off switch icon to indicate whether a corresponding feature of the video player application is to be enabled while the device is in the restricted interaction mode for the video player application. In other aspects, user interface 538-2 is similar to user interface 538-1 illustrated in FIG. 5AF.

FIG. 5AK illustrates exemplary user interface 552 of the musical instrument application in accordance with some embodiments, as described above with respect to FIG. 5U. For example, in some embodiments, subsequent to entering the restricted interaction mode for the video player application, the device exits from the restricted interaction mode for the video player application (e.g., with a triple click of home button 204 as described above with respect to FIGS. 5N-5O) and subsequently enters the unrestricted interaction mode for the musical instrument application (e.g., by selecting a musical instrument application icon from an application launch screen, such as a home screen).

In FIG. 5AK, user input 581 (e.g., a triple click of home button 204) is detected.

FIG. 5AL illustrates exemplary user interface 560 of the interaction configuration mode for the musical instrument application in accordance with some embodiments. In FIG. 5AL, user interface 552 is displayed at a reduced scale. In other words, user interface 552 is displayed smaller in the interaction configuration mode (FIG. 5AL) than in the unrestricted mode shown in FIG. 5AK.

User interface 560 in FIG. 5AL includes a plurality of interaction control user interface objects (e.g., touch interaction control user interface object 508, rotate interaction control user interface object 510, shake interaction control user interface object 512, and motion interaction control user interface object 514) and application restriction controls display user interface object 562. In this example, application restriction controls display user interface object 562 includes "Options" icon 562-1, musical instrument application icon 562-2, and/or an application name "GarageBand."

In FIG. 5AL, gesture 583 (e.g., a tap gesture) is detected at a location that corresponds to application restriction controls display user interface object 562. In this example, gesture 583 is detected at a location that corresponds to application icon 562-2. In some embodiments, gesture 583 is detected at a location that corresponds to application icon 562-1 or the application name "GarageBand." In some embodiments, gesture 583 is detected at a location that corresponds to a predefined gesture activation area that encompasses "Options" icon 562-1, musical instrument application icon 562-2, and the application name "GarageBand."

FIG. 5AM illustrates that application restriction control user interface objects 584-1, 584-2, and 584-3) are displayed on user interface 560 in response to gesture 583. In this example, application restriction control user interface objects 584-1, 584-2, and 584-3 indicate that corresponding features (e.g., strings, chords, and instrument selection features of the musical instrument application) are to be enabled in a restricted interaction mode for the musical instrument application. As illustrated in FIG. 5AM, in some embodiments, application restriction control user interface objects 584-1, 584-2, and 584-3 are displayed in popup view 582.

FIGS. 6A-6E are flow diagrams illustrating method 600 of configuring restricted interaction with a user interface of a software application in accordance with some embodiments. Method 600 is performed at an electronic device (e.g., device 300, FIG. 3, or portable multifunction device 100, FIG. 1) with a display and a touch-sensitive surface. In some embodiments, the display is a touch screen display and the touch-sensitive surface is on the display. In some embodiments, the display is separate from the touch-sensitive surface. Some operations in method 600 may be combined and/or the order of some operations may be changed.

As described below, method 600 provides an intuitive way to configure restricted interaction with a user interface of a software application for an electronic device. The method reduces the cognitive burden on a user when configuring restricted interaction with a user interface of a software application, thereby creating a more efficient human-machine interface. For battery-operated electronic devices, enabling a user to configure restricted interaction with a user interface faster and more efficiently conserves power and increases the time between battery charges.

While in an unrestricted interaction mode, the device detects (602) a first input (e.g., detecting triple click 505 on home button 204 with or without subsequent entry of a passcode, FIGS. 5A-5B; pressing a particular combination of physical buttons; touching predefined regions of the touch-sensitive surface concurrently or in accordance with a predefined sequence; etc.).

In response to detecting the first input, the device enters (604) an interaction configuration mode that is distinct from the unrestricted interaction mode (e.g., FIG. 5C).

While in the interaction configuration mode, the device displays (606) on the display a first user interface of a software application that includes a plurality of user interface objects (e.g., user interface 501 in FIG. 5C includes the character "A," the word "Apple," a picture of an apple, and a plurality of menu bar user interface objects 504-1, 504-2, 504-3, 504-4, 504-5, 504-6, and 504-7 in user interface 502).

In some embodiments, the first user interface in the interaction configuration mode includes (608) a user interface displayed in the unrestricted interaction mode just prior to detecting the first input and the user interface displayed in the unrestricted interaction mode just prior to detecting the first input includes the plurality of user interface objects. For example, user interface 501 in FIG. 5C includes user interface 502 previously displayed in the unrestricted interaction mode (e.g., FIG. 5A) and user interface 502 includes the character "A," the word "Apple," a picture of an apple, and a plurality of menu bar user interface objects 504-1, 504-2, 504-3, 504-4, 504-5, 504-6, and 504-7.

In some embodiments, the user interface displayed in the unrestricted interaction mode just prior to detecting the first input is displayed (610) at a first scale in the unrestricted interaction mode (e.g., user interface 502 in FIG. 5A) and at a second scale, less than the first scale, in the first user interface in the interaction configuration mode (e.g., user interface 502 within user interface 501 in FIG. 5C). In some embodiments, the device displays an animation of the user interface displayed in the unrestricted interaction mode just prior to detecting the first input shrinking to become part of the first user interface in the interaction configuration mode.

In some embodiments, the first user interface is displayed (612) in response to detecting the first input. For example, in some embodiments, the user interface in FIG. 5C is displayed in response to user input 505 (FIG. 5A). For example, in some embodiments, the user interface in FIG. 5C is displayed in response to input of a password (FIG. 5B).

In some embodiments, the first user interface 501 displayed in the interaction configuration mode includes (614) at least one of: a touch interaction control user interface object (e.g., user interface object 508, FIG. 5C), which, when selected, causes the electronic device to ignore touch inputs on the touch-sensitive surface while in the restricted interaction mode; a rotate interaction control user interface object (e.g., user interface object 510, FIG. 5C), which, when selected, causes the electronic device to ignore rotation of the electronic device while in the restricted interaction mode; a shake interaction control user interface object (e.g., user interface object 512, FIG. 5C), which, when selected, causes the electronic device to ignore shaking of the electronic device while in the restricted interaction mode; and a motion interaction control user interface object (e.g., user interface object 514, FIG. 5C), which, when selected, causes the electronic device to ignore a movement of the electronic device while in the restricted interaction mode.

In some embodiments, while in the interaction configuration mode, the device determines (615, FIG. 6E) that one or more user interface objects, of the plurality of user interface objects, are configured to be selected by one or more gesture inputs and remaining one or more user interface objects, of the plurality of user interface objects, are not configured to be selected by one or more gesture inputs; and visually distinguishes the determined one or more user interface objects from the remaining one or more user interface objects. For example, as shown in FIG. 5AA, the user interface objects that are configured to be selected by one or more gesture inputs (e.g., user interface objects 504-1, 504-2, 504-3, 504-4, 504-5, 504-6, and 504-7, the character "A," and the word "Apple," but not the picture of the apple) are visually distinguished by having thick outlines. In some embodiments, the device determines that the one or more user interface objects are configured to be selected by one or more gesture inputs by determining that the one or more user interface objects are associated with one or more event recognizers 180 (FIG. 1B) and/or one or more event handlers 190 (FIG. 1B). In some embodiments, the one or more event recognizers 180 include one or more gesture recognizers 180 and/or the one or more event handlers 190 include one or more gesture handlers 190. For example, in some embodiments, when a respective user interface object is associated with a gesture recognizer and a gesture handler, the respective user interface object is deemed to be configured to be selected by one or more gesture inputs.

While displaying the first user interface, the device detects (616, FIG. 6B) one or more gesture inputs on the touch-sensitive surface (e.g., touch gesture 507, FIG. 5C; touch gesture 509, FIG. 5E; touch gesture 511, FIG. 5G; touch gesture 513, Figure SI; or touch gestures 533, 535, 537, and 539, FIG. 5R).

For a respective gesture input detected on the touch-sensitive surface, the device determines (618) whether one or more user interface objects of the plurality of user interface objects correspond to the respective gesture input. For example, in response to detecting touch gesture 507 (FIG. 5C) on user interface object 508, the device determines that the plurality of user interface objects in user interface 502 correspond to touch gesture 507. In FIGS. 5E-5F, in response to detecting touch gesture 509, the device determines that user interface object 504-2 corresponds to touch gesture 509. In FIGS. 5G-5H, in response to detecting touch gesture 511, the device determines that the character "A" corresponds to touch gesture 511. In FIGS. 5I-5K, in response to detecting touch gesture 513, the device determines that user interface objects 504-1 through 504-7 correspond to touch gesture 513. In FIGS. 5R-5S, in response to detecting touch gestures 533, 535, 537, and 539, the device determines a user interface object that corresponds to each of touch gestures 533, 535, 537, and 539.

In some embodiments, determining whether one or more user interface objects of the plurality of user interface objects correspond to the respective gesture input includes (620): determining a predefined shape from a plurality of predefined shapes, a size of the predefined shape, and a location of the predefined shape that correspond to the respective gesture input. In other words, the predefined shape corresponds to a shape drawn by the respective gesture input. Exemplary predefined shapes include rectangles, squares, circles, and ovals. In some embodiments, the predefined shape is overlaid on the first user interface. In some embodiments, additional gestures may be used to adjust the initial size and/or initial location of the predefined shape, such as depinch gestures to enlarge the predefined shape, dragging gestures on the border of the predefined shape to resize the predefined shape, and dragging gestures within the predefined shape to move the predefined shape. In some embodiments, the determining also includes determining whether the one or more user interface objects of the plurality of user interface objects correspond to the determined predefined shape with the determined size at the determined location. In other words, for a respective user interface object, the device determines whether the predefined shape that corresponds to a respective gesture input overlies the respective user interface object. For example, in FIG. 5H, the device determines that predefined shape 520 (which corresponds to touch gesture 511) overlies the character "A," and selects the character "A" in accordance with the determination.

In some embodiments, the device visually distinguishes (621) the predefined shape. In some embodiments, the device visually distinguishes the predefined shape without visually distinguishing separately the one or more user interface objects that correspond to the determined predefined shape with the determined size at the determined location.

In some embodiments, the respective gesture input is (622) an open path gesture (e.g., a crossing-out or squiggly line, such as touch gesture 513, FIG. 5I and touch gesture 553, FIG. 5V). In some embodiments, the respective gesture input is a closed path gesture (e.g., touch gesture 511, FIG. 5G).

In some embodiments, the device identifies the first set of user interface objects in the plurality of user interface objects that correspond to the detected one or more gesture inputs and the second set of user interface objects in the plurality of user interface objects that do not correspond to the detected one or more gesture inputs. For example, in FIG. 5F, the device identifies user interface object 504-2 as a user interface object that corresponds to touch gesture 509 and the character "A," the word "Apple," the picture of an apple, and menu bar user interface objects 504-1, 504-3, 504-4, 504-5, 504-6, and 504-7 as user interface objects that do not correspond to touch gesture 509.

The device visually distinguishes (624) a first set of user interface objects in the plurality of user interface objects that correspond to the detected one or more gesture inputs from a second set of user interface objects in the plurality of user interface objects that do not correspond to the detected one or more gesture inputs. For example, in FIG. 5M, user interface objects 504-1 through 504-7 are visually distinguished from the other user interface objects in user interface 502, such as the character "A," the word "Apple," and the picture of an apple. In some embodiments, visually distinguishing the first set of user interface objects includes dimming display of the first set of user interface objects while maintaining undimmed display of the second set of user interface objects, and/or displaying one or more indicators (e.g., indicator 528, FIG. 5F) over, or adjacent to, the first set of user interface objects. In some embodiments, a respective user interface object in the first set of user interface objects is visually distinguished in response to detecting the respective gesture input that corresponds to the respective user interface object. In some embodiments, a respective indicator is a predefined shape displayed over, or adjacent to, one or more corresponding user interface objects in the first set of user interface objects. For example, in FIG. 5F, indicator 528 is displayed over user interface object 504-2. In some embodiments, a respective indicator is a free-form shape that corresponds to a respective gesture input, which is displayed over one or more corresponding user interface objects in the first set of user interface objects. In some embodiments, the opacity of a predefined or free-form shape may be adjusted in the interaction configuration mode.

The device detects (626) a second input (e.g., tap gesture 515 on start button 518, FIG. 5L).

In response to detecting the second input, the device exits (628, FIG. 6C) the interaction configuration mode and enters a restricted interaction mode that is distinct from the unrestricted interaction mode. In some embodiments, the restricted interaction mode prevents activation of (e.g., disables) user interface objects in the first set of user interface objects (e.g., user interface objects such as 504-1 through 504-7 in FIG. 5M), whereas these user interface objects in the first set of user interface objects are activatable in the unrestricted interaction mode (e.g., FIG. 5P).

In some embodiments, the user may use gesture inputs to select user interface objects to keep enabled rather than selecting user interface objects to be disabled. For these embodiments, the second set of user interface objects includes user interface objects in the plurality of user interface objects that correspond to the detected one or more gesture inputs, and the first set of user interface objects includes user interface objects in the plurality of user interface objects that do not correspond to the detected one or more gesture inputs.

In some embodiments, the device replaces (630) the first user interface with a second user interface that includes at least the second set of user interface objects in the restricted interaction mode. For example, in FIG. 5M, user interface 524 includes the second set of user interface objects (e.g., the character "A," the word "Apple," and the picture of an apple) as well as the first set of user interface objects (e.g., user interface objects 504-1 through 504-7 shown in FIG. 5L). In some embodiments, the second user interface does not include display of the first set of user interface objects. For example, in FIG. 5N, user interface 526 includes the second set of user interface objects (e.g., the character "A," the word "Apple," and the picture of an apple), but not the first set of user interface objects (e.g., user interface objects 504-1 through 504-7 shown in FIG. 5L). In some embodiments, the second user interface in the restricted interaction mode maintains the visual distinction, of the first set of user interface objects from the second set of user interface objects, that was created while in the interaction configuration mode. In some embodiments, the second user interface includes dimmed display of the first set of user interface objects while including non-dimmed display of the second set of user interface objects. In some embodiments, the second user interface includes highlighting of the second set of user interface objects. In some embodiments, the second user interface includes the second set of user interface objects rotated, centered, and/or fitted to a predefined display area of the display. In some embodiments, while in the restricted interaction mode: the device detects a first gesture on the touch-sensitive surface at a location that corresponds to a user interface object in the first set of user interface objects; and ignores the first gesture (e.g., touch gesture 517, FIG. 5M). In other words, while in the restricted interaction mode, the device does not respond to (or otherwise disregards) gestures on user interface objects that were selected for deactivation in the interaction configuration mode.

In some embodiments, the second user interface replaces (632) the first user interface in response to detecting the second input. For example, the user interface shown in FIG. 5L is replaced with user interface 524 (FIG. 5M) in response to detecting touch gesture 515 (FIG. 5L).

In some embodiments, while in the interaction configuration mode, the device ignores an activation of a respective physical button (e.g., push button 206 and/or volume adjustment buttons 208, FIG. 2). In some embodiments, while in the restricted interaction mode, the device ignores an activation of a respective physical button (e.g., push button 206 and/or volume adjustment buttons 208, FIG. 2).

In some embodiments, while in the restricted interaction mode: the device detects (634) a second gesture on the touch-sensitive surface at a location that corresponds to a user interface object in the second set of user interface objects; and, in response to detecting the second gesture, performs a predefined operation that corresponds to the user interface object in the second set of user interface objects. In some embodiments, the predefined operation that corresponds to the user interface object in the second set of user interface objects in the restricted interaction mode is the same as the predefined operation that corresponds to the user interface object in the second set of user interface objects in the unrestricted interaction mode. For example, in FIG. 5M, in response to touch gesture 519 on touch screen 112 at the location that corresponds to the character "A," device 100 produces sounds corresponding to the pronunciation of the character "A."

In some embodiments, while in the restricted interaction mode: the device detects (636) a predefined user input (e.g., user input 521, FIG. 5N, such as a triple click of home button 204); in response to detecting the predefined user input, displays a restricted interaction mode exit screen (e.g., password menu 506, FIG. 5O) on the display; while displaying the restricted interaction mode exit screen, detects one or more inputs (e.g., detecting one or more gestures on the touch-sensitive surface, such as tap gestures on the numeric buttons of password menu 506, FIG. 5O); determines whether the detected one or more inputs match a predefined input for exiting the restricted interaction mode (e.g., a predefined sequence of numbers); and, in accordance with a determination that the detected one or more inputs do not match the predefined input for exiting the restricted interaction mode, ceases to display the restricted interaction mode exit screen on the display (i.e., after a single entry of an incorrect password, password menu 506 disappears so that password menu 506 does not further distract the user). In some embodiments, after a failed attempt to exit the restricted interaction mode, the device will not display the restricted interaction mode exit screen for at least a predefined time period (e.g., one minute, two minutes, five minutes, etc).

In some embodiments, the device exits (638, FIG. 6D) the restricted interaction mode (e.g., in response to detecting triple click 521 on home button 204 followed by entry of a passcode, FIG. 5N; pressing a particular combination of physical buttons; touching predefined regions of the touch-sensitive surface concurrently or in accordance with a predefined sequence, such as touching four corners of the touch-sensitive surface in a predefined sequence; etc.). Thereafter, the device enters the unrestricted interaction mode; and, while in the unrestricted interaction mode: detects a third gesture (e.g., touch gesture 523, FIG. 5P) on the touch-sensitive surface at a location that corresponds to a first user interface object (e.g., user interface object 504-3, FIG. 5P) in the first set of user interface objects; in response to detecting the third gesture, performs a first predefined operation that corresponds to the first user interface object in the first set of user interface objects (e.g., a help menu or help dialogue is displayed over user interface 502 shown in FIG. 5P); detects a fourth gesture (e.g., touch gesture 525, FIG. 5P) on the touch-sensitive surface at a location that corresponds to a second user interface object (e.g., the character "A," FIG. 5P) in the second set of user interface objects; and, in response to detecting the fourth gesture, performs a second predefined operation that corresponds to the second user interface object in the second set of user interface objects (e.g., the device produces sounds corresponding to the pronunciation of the character "A").

In some embodiments, in response to detecting that the device has been plugged (e.g., external port 124, FIG. 2, of the device is plugged with a cable or into a cradle), the device exits the restricted interaction mode.

In some embodiments, immediately after exiting the restricted interaction mode, the device enters the interaction configuration mode (e.g., FIG. 5L) instead of entering the unrestricted interaction mode (e.g., FIG. 5P).

In some embodiments, information identifying the first set of user interface objects and the second set of user interface objects is stored (640) in an individual profile (e.g., individual profile(s) 159, FIG. 1A), where the individual profile is configured for a respective user. For example, a first preselected set of user interface objects for the educational application may be stored in an individual profile for a first user, and a second preselected set of user interface objects for the educational application may be stored in an individual profile for a second user. The first and second preselected sets of user interface objects may be used to facilitate rapid customization of the user interfaces for each individual user (e.g., based on the individual user's skills and needs). For example, all menu bar user interface objects (e.g., user interface objects 504-1 through 504-7, FIG. 5J) may be deactivated for the first user, while only a subset of the menu bar user interface objects (e.g., user interface objects 504-2 through 504-6, FIG. 5J) may be deactivated for the second user, thereby allowing the second user to perform additional functions (e.g., navigating to a previous or next page). In some embodiments, the device includes an individual profile for each application. For example the device may store a first individual profile for a respective user for a first application (e.g., the educational application), and a second individual profile for the respective user for a second application (e.g., the card matching game application).

In some embodiments, the device includes a call application. While in the restricted interaction mode in an application other than the call application, the device displays (642) a user interface for the application that includes at least the second set of user interface objects (e.g., a user interface in the restricted interaction mode, such as the user interface illustrated in FIG. 5N), receives an incoming call, and determines whether the incoming call satisfies predefined signaling criteria. The device, in accordance with a determination that the incoming call satisfies the predefined criteria, outputs a signal that indicates the incoming call (e.g., the device plays a ring tone and/or displays a user interface for the call application, such as the user interface shown in FIG. 5AC). The device, in accordance with a determination that the incoming call does not satisfy the predefined signaling criteria, foregoes outputting the signal that indicates the incoming call (e.g., the device does not play a ring tone or display the call application user interface).

In some embodiments, the predefined signaling criteria includes (644) that the incoming call is from a respective phone number in a predefined list of one or more phone numbers (e.g., a list of authorized phone numbers or callers, which is also called a "white list").

In some embodiments, the predefined signaling criteria includes (646) that the incoming call is from a particular phone number, and a number of calls from the particular phone number during a predefined time period (e.g., one minute, two minute, five minutes, etc.) exceeds a predefined number of calls (two, three, four, five, etc.). For example, the predefined signaling criteria may require that calls be received from a same phone number at least three times during a two minute period.

In some embodiments, in accordance with the determination that the incoming call satisfies the predefined signaling criteria, the device displays (648) a user interface for the call application (e.g., the user interface illustrated in FIG. 5AC).

In some embodiments, in accordance with the determination that the incoming call satisfies the predefined signaling criteria, the device displays (650) a user interface that includes the plurality of user interface objects in the first user interface (e.g., the user interface objects displayed in the unrestricted interaction mode).

In some embodiments, the signal includes (652) an audible indication of the incoming call (e.g., a ring tone or a voice output indicating the incoming call).

In some embodiments, the signal includes (654) a visual indication of the incoming call (e.g., display of one or more user interface objects or display of the user interface for the call application).

In some embodiments, in accordance with a the determination that the incoming phone call does not satisfy the predefined signaling criteria, the device declines (656) the incoming call and logs the incoming call as a missed call. In some embodiments, a number of missed call(s) is indicated as badge 414, as illustrated in FIG. 4A.

It should be understood that the particular order in which the operations in FIGS. 6A-6E have been described is merely exemplary and is not intended to indicate that the described order is the only order in which the operations could be performed. One of ordinary skill in the art would recognize various ways to reorder the operations described herein. Additionally, it should be noted that details of other processes described herein with respect to method 800 (e.g., FIG. 8) and method 1000 (e.g., FIGS. 10A-10F) are also applicable in an analogous manner to method 600 described above with respect to FIGS. 6A-6E. For example, the call receiving operation described above with reference to method 600 may have one or more of the characteristics of the call receiving operation described herein with reference to method 800. For brevity, these details are not repeated here.

Figure 7:
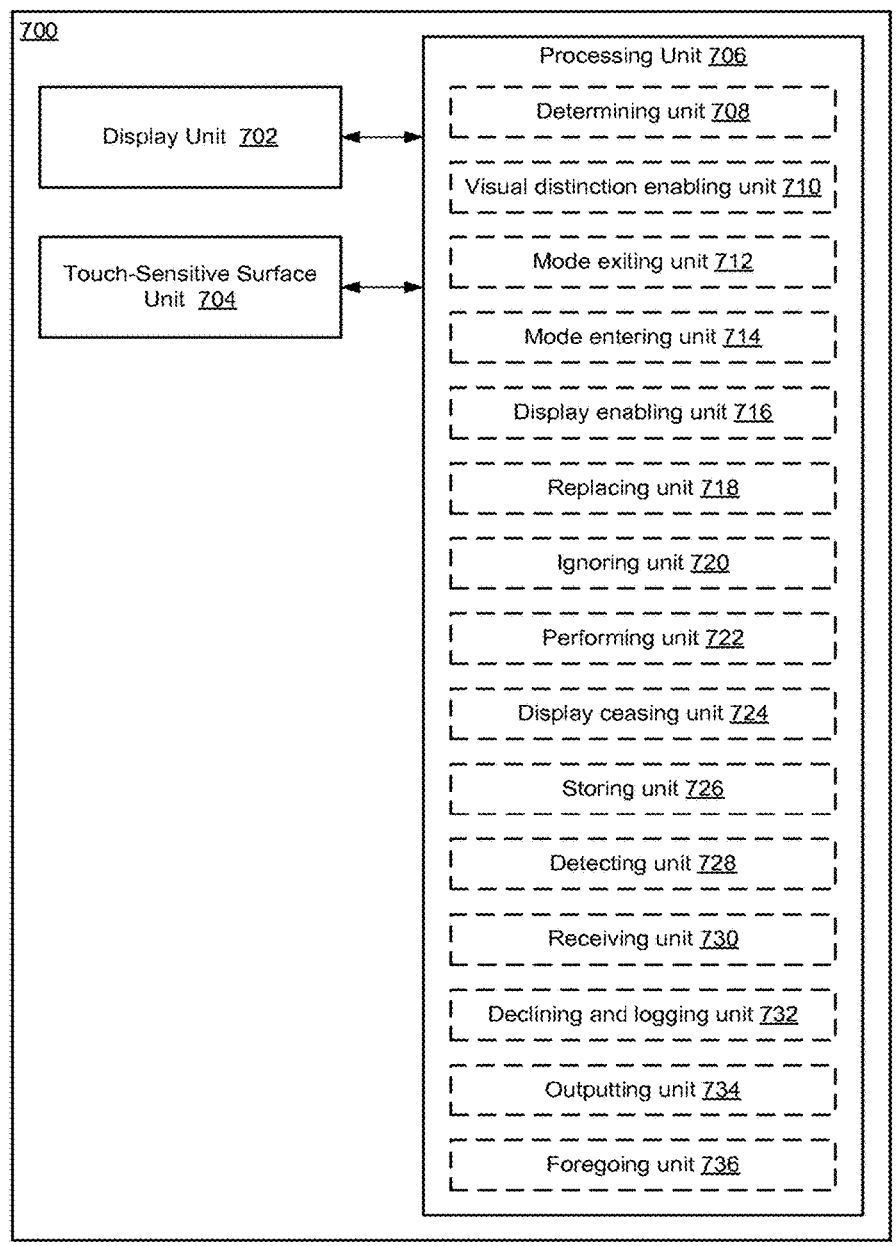
FIG. 7 is a functional block diagram of an electronic device in accordance with some embodiments.

In accordance with some embodiments, FIG. 7 shows a functional block diagram of electronic device 700 configured in accordance with the principles of the invention as described above. The functional blocks of the device may be implemented by hardware, software, or a combination of hardware and software to carry out the principles of the invention. It is understood by persons of skill in the art that the functional blocks described in FIG. 7 may be combined or separated into sub-blocks to implement the principles of the invention as described above. Therefore, the description herein may support any possible combination or separation or further definition of the functional blocks described herein.

As shown in FIG. 7, electronic device 700 includes display unit 702 configured to display, while in an interaction configuration mode, a first user interface that includes a plurality of user interface objects; touch-sensitive surface unit 704 configured to detect, while the first user interface is being displayed, one or more gesture inputs on the touch-sensitive surface unit 704; and processing unit 706 coupled to display unit 702 and touch-sensitive surface unit 704. In some embodiments, processing unit 706 includes determining unit 708, visual distinction enabling unit 710, mode exiting unit 712, mode entering unit 714, display enabling unit 716, replacing unit 718, ignoring unit 720, performing unit 722, display ceasing unit 724, storing unit 726, and detecting unit 728. In some embodiments, processing unit 706 also includes receiving unit 730, declining and logging unit 732, outputting unit 734, and foregoing unit 736.

Processing unit 706 is configured to: for a respective gesture input detected on touch-sensitive surface unit 704, determine whether one or more user interface objects of the plurality of user interface objects correspond to the respective gesture input (e.g., with determining unit 708); enable visual distinction of a first set of user interface objects in the plurality of user interface objects that correspond to the detected one or more gesture inputs from a second set of user interface objects in the plurality of user interface objects that do not correspond to the detected one or more gesture inputs (e.g., with visual distinction enabling unit 710); and, in response to detecting a second input, exit the interaction configuration mode and enter a restricted interaction mode that is distinct from the unrestricted interaction mode (e.g., with mode exiting unit 712).

In some embodiments, the first user interface in the interaction configuration mode includes a user interface displayed in the unrestricted interaction mode (e.g., on display unit 702) just prior to detecting the first input and the user interface displayed in the unrestricted interaction mode just prior to detecting the first input includes the plurality of user interface objects.

In some embodiments, the user interface displayed in the unrestricted interaction mode (e.g., on display unit 702) just prior to detecting the first input is displayed (e.g., with display enabling unit 716, on display unit 702) at a first scale in the unrestricted interaction mode and at a second scale, less than the first scale, in the first user interface in the interaction configuration mode.

In some embodiments, the first user interface is displayed (e.g., with display enabling unit 716, on display unit 702) in response to detecting the first input (e.g., with detecting unit 728).

In some embodiments, the first user interface displayed in the interaction configuration mode (e.g., with display enabling unit 716, on display unit 702) includes at least one of: a touch interaction control user interface object, which, when selected, causes electronic device 700 to ignore touch inputs on touch-sensitive surface unit 704 while in the restricted interaction mode; a rotate interaction control user interface object, which, when selected, causes electronic device 700 to ignore rotation of electronic device 700 while in the restricted interaction mode; a shake interaction control user interface object, which, when selected, causes electronic device 700 to ignore shaking of electronic device 700 while in the restricted interaction mode; and a motion interaction control user interface object, which, when selected, causes electronic device 700 to ignore a movement of electronic device 700 while in the restricted interaction mode.

In some embodiments, processing unit 706 is configured to: determine a predefined shape from a plurality of predefined shapes, a size of the predefined shape, and a location of the predefined shape that correspond to the respective gesture input (e.g., with determining unit 708); and determine whether the one or more user interface objects of the plurality of user interface objects correspond to the determined predefined shape with the determined size at the determined location (e.g., with determining unit 708).

In some embodiments, processing unit 706 is configured to: visually distinguish the predefined shape (e.g., with visual distinction enabling unit 710, on display unit 702).

In some embodiments, processing unit 706 is configured to: replace the first user interface with a second user interface that includes at least the second set of user interface objects in the restricted interaction mode (e.g., with replacing unit 718); and, while in the restricted interaction mode: detect a first gesture on touch-sensitive surface unit 704 at a location that corresponds to a user interface object in the first set of user interface objects (e.g., with detecting unit 728); and ignore the first gesture (e.g., with ignoring unit 720).

In some embodiments, the second user interface replaces the first user interface in response to detecting the second input (e.g., with replacing unit 718).

In some embodiments, processing unit 706 is configured to: while in the restricted interaction mode: detect a second gesture on touch-sensitive surface unit 704 at a location that corresponds to a user interface object in the second set of user interface objects (e.g., with detecting unit 728); and in response to detecting the second gesture, perform a predefined operation that corresponds to the user interface object in the second set of user interface objects (e.g., performing unit 722).

In some embodiments, processing unit 706 is configured to: exit the restricted interaction mode (e.g., with mode exiting unit 712); enter the unrestricted interaction mode (e.g., with mode entering unit 714); and, while in the unrestricted interaction mode: detect a third gesture on touch-sensitive surface unit 704 at a location that corresponds to a first user interface object in the first set of user interface objects (e.g., with detecting unit 728); in response to detecting the third gesture, perform a first predefined operation that corresponds to the first user interface object in the first set of user interface objects (e.g., with performing unit 722); detect a fourth gesture on touch-sensitive surface unit 704 at a location that corresponds to a second user interface object in the second set of user interface objects (e.g., with detecting unit 728); and, in response to detecting the fourth gesture, perform a second predefined operation that corresponds to the second user interface object in the second set of user interface objects (e.g., with performing unit 722).

In some embodiments, processing unit 706 is configured to: while in the restricted interaction mode: detect a predefined user input (e.g., with detecting unit 728); in response to detecting the predefined user input, enable display of a restricted interaction mode exit screen on display unit 702 (e.g., with display enabling unit 716, on display unit 702); while enabling display of the restricted interaction mode exit screen, detect one or more inputs (e.g., with detecting unit 728); determine whether the detected one or more inputs match a predefined input for exiting the restricted interaction mode (e.g., with determining unit 708); in accordance with a determination that the detected one or more inputs do not match the predefined input for exiting the restricted interaction mode, cease to display the restricted interaction mode exit screen on display unit 702 (e.g., with display ceasing unit 724).

In some embodiments, information identifying the first set of user interface objects and the second set of user interface objects is stored in an individual profile (e.g., with storing unit 726), the individual profile configured for a respective user.

In some embodiments, the respective gesture input is an open path gesture.

In some embodiments, processing unit 706 is configured to, while in the restricted interaction mode in an application other than a call application, enable display of a user interface for the application that includes at least the second set of user interface objects (e.g., with display enabling unit 716, on display unit 702), receive an incoming call (e.g., with receiving unit 730), and determine whether the incoming call satisfies predefined signaling criteria (e.g., with determining unit 708). Processing unit 706 is also configured to, in accordance with a determination that the incoming call satisfies the predefined criteria, output a signal that indicates the incoming call (e.g., with outputting unit 734 and/or display enabling unit 716, on display unit 702), and, in accordance with a determination that the incoming call does not satisfy the predefined signaling criteria, forego outputting the signal that indicates the incoming call (e.g., with foregoing unit 736).

In some embodiments, the predefined signaling criteria includes that the incoming call is from a respective phone number in a predefined list of one or more phone numbers.

In some embodiments, the predefined signaling criteria includes that the incoming call is from a particular phone number, and a number of calls from the particular phone number during a predefined time period exceeds a predefined number of calls.

In some embodiments, processing unit 706 is configured to, in accordance with the determination that the incoming call satisfies the predefined signaling criteria, enable display of a user interface for the call application (e.g., with display enabling unit 716, on display unit 702).

In some embodiments, processing unit 706 is configured to, in accordance with the determination that the incoming call satisfies the predefined signaling criteria, enable display of a user interface that includes the plurality of user interface objects in the first user interface (e.g., with display enabling unit 716, on display unit 702).

In some embodiments, the signal includes an audible indication of the incoming call.

In some embodiments, the signal includes a visual indication of the incoming call.

In some embodiments, processing unit 706 is configured to, in accordance with the determination that the incoming call does not satisfy the predefined signaling criteria, decline the incoming call and log the incoming call as a missed call (e.g., with declining and logging unit 732).

In some embodiments, processing unit 706 is configured to, while in the interaction configuration mode: determine that one or more user interface objects, of the plurality of user interface objects, are configured to be selected by one or more gesture inputs and remaining one or more user interface objects, of the plurality of user interface objects, are not configured to be selected by one or more gesture inputs (e.g., with determining unit 708); and visually distinguish the identified one or more user interface objects from the remaining one or more user interface objects (e.g., with visual distinction enabling unit 710, on display unit 702).

FIG. 8 is a flow diagram illustrating method 800 of signaling an incoming call while in a restricted interaction mode in accordance with some embodiments. Method 800 is performed at an electronic device (e.g., device 300, FIG. 3, or portable multifunction device 100, FIG. 1) with a display, a touch-sensitive surface, and a call application. In some embodiments, the display is a touch screen display and the touch-sensitive surface is on the display. In some embodiments, the display is separate from the touch-sensitive surface. Method 800 may be used for voice calls (e.g., via telephone module 138) and video calls (e.g., via video conference module 139, such as FaceTime® by Apple Inc. of Cupertino, Calif.). Some operations in method 800 may be combined and/or the order of some operations may be changed.

The electronic device, while in a restricted interaction mode, is typically configured by default to decline incoming calls and log these calls as missed calls, unless a call application is currently displayed. Other features that are typically disabled/restricted by default while the electronic device is in the restricted interaction mode may include:
  Digital voice assistant (e.g., Siri by Apple Inc. of Cupertino, Calif.);
  Notification center;
  Application switcher (e.g., multitasking gestures and/or button activations for switching applications are ignored);
  System wide gestures (e.g., an application exit gesture is ignored);
  Messages (e.g., SMS/MMS/iMessage messages are received but not displayed, unless a messages application is currently displayed);
  Inputs from remote controls and/or headphone buttons; and
  Alerts.

As a result, a user of the electronic device may miss important calls while the electronic device is in the restricted interaction mode.

As described below, method 800 provides an intuitive way to signal that there is an incoming call while the electronic device is in a restricted interaction mode. The method enables the electronic device to alert a user to incoming calls that meet predefined signaling criteria so that the user of the electronic device does not miss important calls.

While in a restricted interaction mode in an application other than the call application, the device displays (802) a first user interface for the application that includes a plurality of user interface objects (e.g., a user interface in the restricted interaction mode, such as the user interface illustrated in FIG. 5N).

The device receives (804) an incoming call, and determines (806) whether the incoming call satisfies predefined signaling criteria (e.g., whether the incoming call is from a phone number in a list of authorized phone numbers and/or whether the incoming call is from a particular phone number and a number of calls from the particular phone number during a predefined time period exceeds a predefined number of calls).

In accordance with a determination that the incoming call satisfies the predefined signaling criteria, the device outputs (808) a signal that indicates the incoming call (e.g., plays a ring tone and/or displays a user interface of the call application).

In some embodiments, the predefined signaling criteria include (810) that the incoming call is from a respective phone number in a predefined list of one or more phone numbers.

In some embodiments, the predefined signaling criteria includes (812) that the incoming call is from a particular phone number, and a number of calls from the particular phone number during a predefined time period exceeds a predefined number of calls.

In some embodiments, in accordance with the determination that the incoming call satisfies the predefined signaling criteria, the device displays (814) a user interface for the call application (e.g., the user interface illustrated in FIG. 5AC). In some embodiments, the user interface for the call application is overlaid on the first user interface for the application (e.g., FIG. 5AD). In some embodiments, the user interface for the call application replaces the first user interface for the application (e.g., FIG. 5AC).

In some embodiments, in accordance with the determination that the incoming call satisfies the predefined signaling criteria, the device displays (816) a second user interface that includes the plurality of user interface objects in the first user interface and one or more additional user interface objects not in the first user interface (e.g., one or more user interface objects for indicating the incoming call are overlaid over the first user interface for the application, as illustrated in FIG. 5AD).

In some embodiments, the signal includes (818) an audible indication of the incoming call.

In some embodiments, the signal includes (820) a visual indication of the incoming call.

In accordance with a determination that the incoming call does not satisfy the predefined signaling criteria, the device foregoes (822) outputting the signal that indicates the incoming call (e.g., the device does not output any signal that indicates the incoming call).

In some embodiments, in accordance with the determination that the incoming call does not satisfy the predefined signaling criteria, the device declines (824) the incoming call and logs the incoming call as a missed call.

It should be understood that the particular order in which the operations in FIG. 8 have been described is merely exemplary and is not intended to indicate that the described order is the only order in which the operations could be performed. One of ordinary skill in the art would recognize various ways to reorder the operations described herein. Additionally, it should be noted that details of other processes described herein with respect to method 600 (e.g., FIGS. 6A-6E) and method 1000 (e.g., FIGS. 10A-10F) are also applicable in an analogous manner to method 800 described above with respect to FIG. 8. For example, the restricted interaction mode operations described above with reference to method 800 may have one or more of the characteristics of the restricted interaction mode entering operations described herein with reference to method 600. For brevity, these details are not repeated here.

Figure 9:
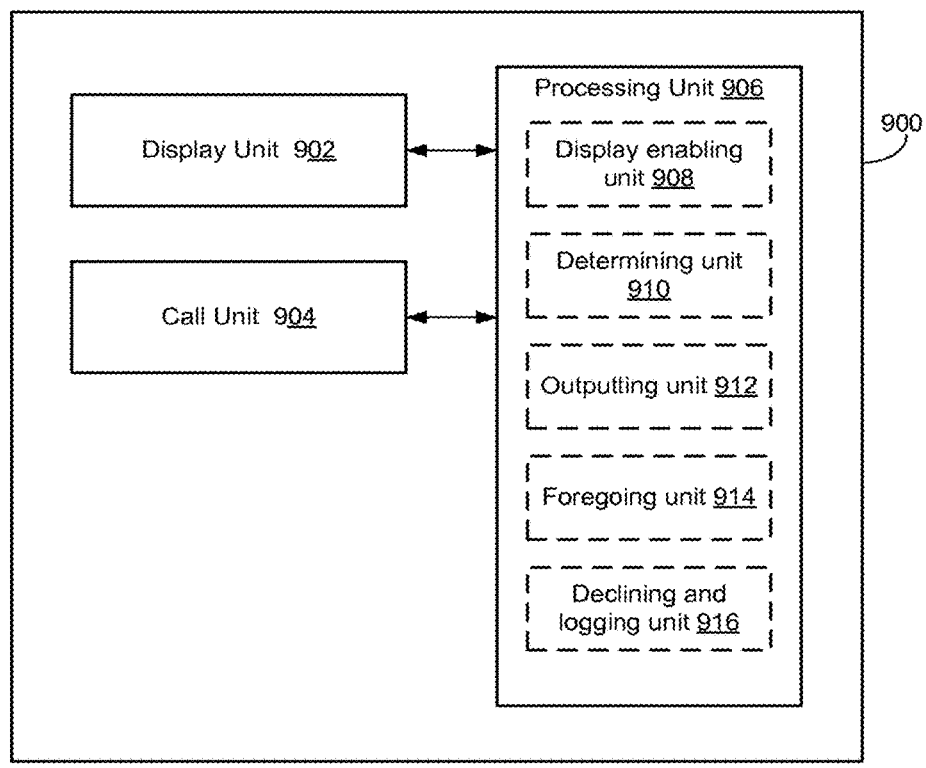
FIG. 9 is a functional block diagram of an electronic device in accordance with some embodiments.

In accordance with some embodiments, FIG. 9 shows a functional block diagram of electronic device 900 configured in accordance with the principles of the invention as described above. The functional blocks of the device may be implemented by hardware, software, or a combination of hardware and software to carry out the principles of the invention. It is understood by persons of skill in the art that the functional blocks described in FIG. 9 may be combined or separated into sub-blocks to implement the principles of the invention as described above. Therefore, the description herein may support any possible combination or separation or further definition of the functional blocks described herein.

As shown in FIG. 9, electronic device 900 includes display unit 902 configured to display, while in a restricted interaction mode in an application other than a call application, a first user interface that includes a plurality of user interface objects; call unit 904 configured to receive an incoming call; and processing unit 906 coupled to display unit 902 and call unit 904. In some embodiments, processing unit 906 includes display enabling unit 908, determining unit 910, outputting unit 912, foregoing unit 914, declining and logging unit 916.

Processing unit 906 is configured to: determine whether the incoming call satisfies predefined signaling criteria (e.g., with determining unit 910); in accordance with a determination that the incoming call satisfies the predefined signaling criteria, output a signal that indicates the incoming call (e.g., with outputting unit 912); and, in accordance with a determination that the incoming call does not satisfy the predefined signaling criteria, forego outputting the signal that indicates the incoming call (e.g., with foregoing unit 914).

In some embodiments, the predefined signaling criteria includes that the incoming call is from a respective phone number in a predefined list of one or more phone numbers.

In some embodiments, the predefined signaling criteria includes that the incoming call is from a particular phone number, and a number of calls from the particular phone number during a predefined time period exceeds a predefined number of calls.

In some embodiments, processing unit 906 is configured to, in accordance with the determination that the incoming call satisfies the predefined signaling criteria, enable display of a user interface for the call application (e.g., with display enabling unit 908, on display unit 902).

In some embodiments, processing unit 906 is configured to, in accordance with the determination that the incoming call satisfies the predefined signaling criteria, enable display of a second user interface that includes the plurality of user interface objects in the first user interface and one or more additional user interface objects not in the first user interface (e.g., with display enabling unit 908, on display unit 902).

In some embodiments, the signal includes an audible indication of the incoming call.

In some embodiments, the signal includes a visual indication of the incoming call.

In some embodiments, processing unit 906 is configured to, in accordance with the determination that the incoming call does not satisfy the predefined signaling criteria, decline the incoming call and log the incoming call as a missed call (e.g., with declining and logging unit 916).

FIGS. 10A-10F are flow diagrams illustrating method 1000 of configuring restricted interaction with a software application in accordance with some embodiments. Method 1000 is performed at an electronic device (e.g., device 300, FIG. 3, or portable multifunction device 100, FIG. 1) with a display and a touch-sensitive surface. In some embodiments, the display is a touch screen display and the touch-sensitive surface is on the display. In some embodiments, the display is separate from the touch-sensitive surface. Some operations in method 1000 may be combined and/or the order of some operations may be changed.

As described below, method 1000 provides an intuitive way to configure restricted interaction with one or more applications in an electronic device. The method reduces the cognitive burden on a user when configuring restricted interaction with software applications, thereby creating a more efficient human-machine interface. For battery-operated electronic devices, enabling a user to configure restricted interaction with software applications faster and more efficiently conserves power and increases the time between battery charges.

While in an unrestricted interaction mode for a first application (e.g., a video player application), the device detects (1002) a first input (e.g., detecting triple click 571 on home button 204 as shown in FIG. 5AE; detecting triple click 505 on home button 204 followed by subsequent entry of a passcode as shown in FIGS. 5A-5B; pressing a particular combination of physical buttons; touching predefined regions of the touch-sensitive surface concurrently or in accordance with a predefined sequence; etc.).

In response to detecting the first input, the device enters (1004) an interaction configuration mode for the first application that is distinct from the unrestricted interaction mode for the first application (e.g., FIG. 5AF). As shown in FIGS. 5AE-5AF, the first input causes the electronic device to enter the interaction configuration mode for the first application. This method of switching directly from the unrestricted interaction mode for the first application to the interaction configuration mode in response to an input is particularly advantageous. For example, unlike a traditional method that requires a user to navigate through multiple menu items that do not display a user interface of the first application, this method provides a fast and intuitive way to configure restricted interactions for the first application.

While in the interaction configuration mode for the first application, the device concurrently displays (1006) on the display: a first user interface that includes a plurality of user interface objects for the first application (e.g., a slider, a slider handle, a rewind icon, a pause icon, a fast forward icon, in FIG. 5AF), one or more interaction control user interface objects (e.g., user interface objects 508, 510, 512, and 514 in FIG. 5AF), and an application restriction controls display user interface object for the first application (e.g., user interface object 558 in FIG. 5AF). In some embodiments, the interaction control user interface objects are used to enable or disable hardware buttons, the touch sensitive surface, motion sensors, and similar components that detect interactions with the device, such as touch inputs, rotation of the device, shaking of the device, and motion of the device while in a restricted interaction mode. As the name implies, an application restriction controls display user interface object for a respective application is a user interface object (e.g., an icon) that a user interacts with (e.g., activates with a tap or other gesture) to initiate display of application restriction control user interface objects for the respective application.

In some embodiments, the first user interface in the interaction configuration mode includes (1008) a user interface displayed in the unrestricted interaction mode for the first application just prior to detecting the first input, and the user interface displayed in the unrestricted interaction mode just prior to detecting the first input includes the plurality of user interface objects for the first application. For example, user interface 536 in the interaction configuration mode for the video player application as shown in FIG. 5AF includes user interface 536 in the unrestricted interaction mode for the video player application as shown in FIG. 5AE. User interface 536 in the unrestricted interaction mode for the video player application includes a plurality of user interface objects (e.g., slider 530, slider handle 550, a rewind icon, a pause icon, a fast forward icon, in FIG. 5AE). Similarly, user interface 536 in the restricted interaction mode for the video player application also includes the plurality of user interface objects (FIG. 5AF).

In some embodiments, the user interface displayed in the unrestricted interaction mode for the first application just prior to detecting the first input is displayed (1010) at a first scale in the unrestricted interaction mode (e.g., user interface 536 in FIG. 5AE) and at a second scale, less than the first scale, in the interaction configuration mode for the first application (e.g., user interface 536 in FIG. 5AF). In some embodiments, the device displays an animation of the user interface displayed in the unrestricted interaction mode for the first application just prior to detecting the first input shrinking to become part of the first user interface in the interaction configuration mode (e.g., user interface 536 shrinks from the first scale to the second scale with an animation when transitioning from FIG. 5AE to FIG. 5AF).

In some embodiments, the concurrent display of the first user interface, the one or more interaction control user interface objects, and the application restriction controls display user interface object is displayed (1012) in response to detecting the first input. For example, user interface 538 shown in FIG. 5AF is displayed in response to user input 571 (shown in FIG. 5AE).

The device detects (1014, FIG. 10B) a first gesture on the touch-sensitive surface at a location that corresponds to the application restriction controls display user interface object for the first application (e.g., gesture 573 at a location that corresponds to application restriction controls display user interface object 558 in FIG. 5AF).

In response to detecting the first gesture at the location that corresponds to the application restriction controls display user interface object for the first application, the device displays (1016) application restriction control user interface objects for the first application (e.g., application restriction control user interface objects 542-1, 542-2, and 542-3, as shown in FIG. 5AG). A respective application restriction control user interface object for the first application indicates whether a corresponding feature of the first application is configured to be enabled while the first application is in a restricted interaction mode (e.g., application restriction control user interface object 542-1 indicates whether the "fast forward" feature of the video player application is enabled while the video player application is in a restricted interaction mode). In some embodiments, the application restriction control user interface objects correspond to application features of the first application (e.g., application restriction control user interface object 542-1 corresponds to the "fast forward" feature of the video player application, application restriction control user interface object 542-2 corresponds to the "rewind" feature of the video player application, etc.). Exemplary features of applications include fast forward, rewind, seek, and other components of applications. The enablement of a particular feature is, optionally, indicated by displaying "on", "off", "✓", "x", "☑", "☒" or similar indicia in a corresponding application restriction control user interface object for the first application. In some embodiments, the enablement of a particular feature is indicated by displaying an indicator over a corresponding user interface object (e.g., a "✓" adjacent to rewind icon 544 if rewind 542-2 is enabled in FIG. 5AH, not shown) while in the interaction configuration mode. In some embodiments, the enablement of a particular feature is indicated by visually distinguishing a corresponding user interface object while in the interaction configuration mode. For example, in some embodiments, a user interface object that corresponds to an enabled feature is highlighted. Alternatively, in some embodiments, the disablement of a particular feature is indicated by visually distinguishing a corresponding user interface object while in the interaction configuration mode. For example, in some embodiments, a user interface object that corresponds to a disabled feature is dimmed or masked. In some embodiments, a user interface object that corresponds to a disabled feature is removed from the user interface.

In some embodiments, the application restriction control user interface objects for the first application are displayed (1018) in a popup view that partially covers at least a portion of the first user interface. For example, in FIG. 5AG, application restriction control user interface objects 542-1, 542-2, and 542-3 are displayed in popup view 540 that partially covers a portion of user interface 536. In some embodiments, the electronic device concurrently displays the popup view and a remaining portion of the first user interface on the touch-sensitive surface. For example, in FIG. 5AG, a portion of user interface 536 is concurrently displayed with popup view 540. In some embodiments, the electronic device displays the one or more application restriction control user interface objects for the first application concurrently with at least a portion of the first user interface without using a popup view. For example, in some embodiments, the first user interface is scrolled up (or scrolled down or scrolled sideways) and the one or more application restriction control user interface objects for the first application are displayed in a region that is no longer occupied by the first user interface. In some embodiments, at least a portion of the first user interface is rolled up (e.g., with a page curl animation), and the one or more application restriction control user interface objects are displayed in a region that is no longer occupied by the first user interface.

In some embodiments, the popup view is displayed (1020) laterally adjacent to the application restriction controls display user interface object. For example, in FIG. 5AG, popup view 540 is displayed laterally adjacent to application restriction controls display user interface object 558. In some embodiments, the popup view is not displayed over the application restriction controls display user interface object. For example, the popup view may be displayed adjacent to, but not directly over the application restriction controls display user interface object (e.g., the popup view may be displayed above or below the application restriction controls display user interface object).

In some embodiments, in response to detecting the first gesture at the location that corresponds to the application restriction controls display user interface object for the first application, the device maintains (1022) display of at least a portion of the first user interface. For example, in FIG. 5AG, a portion of user interface 536 remains on the display.

In some embodiments, in response to detecting the first gesture at the location that corresponds to the application restriction controls display user interface object for the first application, the device maintains display of at least part of the first user interface and the interaction control user interface objects. For example, in FIG. 5AG, a portion of user interface 536 and the interaction control user interface objects (e.g., the touch interaction control user interface object, the rotate interaction control user interface object, the shake interaction control user interface object, and the motion control user interface object) continue to remain on the display.

While displaying the application restriction control user interface objects for the first application, the device detects (1024) a second gesture on the touch-sensitive surface at a location that corresponds to a first application restriction control user interface object for the first application. For example, in FIG. 5AG, gesture 575 is detected at a location that corresponds to application restriction control user interface object 542-3.

In response to detecting the second gesture, the device changes (1026) display of a setting in the first application restriction control user interface object for the first application to indicate a change to whether a corresponding feature is configured to be enabled while the first application is in the restricted interaction mode. For example, in FIGS. 5AG-5AH, the display of a setting in application restriction control user interface object 542-3 is changed from "ON" to "OFF" to indicate that the corresponding feature (e.g., the "seek" feature) is no longer enabled while the video player application is in the restricted interaction mode. In some embodiments, while displaying the application restriction control user interface objects for the first application, the device detects respective gestures on the touch-sensitive surface at respective locations that correspond to respective application restriction control user interface objects for the first application, and in response the device changes display of respective settings in respective application restriction control user interface objects for the first application. For example, in some embodiments, the device detects the second gesture on the touch-sensitive surface at the location that corresponds to the first application restriction control user interface object for the first application and another gesture on the touch-sensitive surface at a location that corresponds to a second application restriction control user interface object (e.g., application restriction control user interface object 542-1 in FIG. 5AH) for the first application. In some embodiments, in response, the device changes display of a setting in the second application restriction control user interface object for the first application to indicate a change to whether a corresponding feature (e.g., the "fast forward" feature shown in FIG. 5AH) is configured to be enabled while the first application is in the restricted interaction mode.

The device detects (1028) a second input (e.g., tap gesture 577 on start button 518 as shown in FIG. 5AH).

In response to detecting the second input, the device exits (1030, FIG. 10C) the interaction configuration mode for the first application and enters the restricted interaction mode for the first application that is distinct from the unrestricted interaction mode for the first application. The corresponding feature is restricted in accordance with the setting in the first application restriction control user interface object for the first application. For example, in FIG. 5AI, gesture 579 (e.g., a horizontal swipe gesture) is detected at a location that corresponds to slider handle 550 while the device is in the restricted interaction mode for the video player application. While the device is in the restricted interaction mode for the video player application, gesture 579 on slider handle 550 is ignored in accordance with the settings of application restriction control user interface objects (e.g., 542-1, 542-2, and 542-3; and in particular, application restriction control user interface object 542-3) of the video player application.

In some embodiments, subsequent to entering the restricted interaction mode for the first application, the device exits (1032) from the restricted interaction mode for the first application and enters an interaction configuration mode for a second application. For example, in some embodiments, the device exits from the restricted interaction mode for the video player application (e.g., FIG. 5AI) and at a later time enters an interaction configuration mode for a musical instrument application (e.g., FIG. 5AL). In some embodiments, entering the interaction configuration mode for the second application includes starting the second application in an unrestricted interaction mode (e.g., by selecting an application icon for the second application from a launch pad or a home screen) and entering the interaction configuration mode for the second application from the unrestricted interaction mode for the second application. While in the interaction configuration mode for the second application, the device concurrently displays on the display: a second user interface that includes a plurality of user interface objects for the second application (e.g., user interface 552 that includes strings, chords, a musical instrument selection user interface object, an autoplay user interface object, a chords-notes selection user interface object, etc. as shown in FIG. 5AL), one or more interaction control user interface objects (e.g., user interface objects 508, 510, 512, and 514 as shown in FIG. 5AL), and an application restriction controls display user interface object for the second application (e.g., application restriction control display user interface object 562 as shown in FIG. 5AL). The device detects a third gesture on the touch-sensitive surface at a location that corresponds to the application restriction controls display user interface object for the second application (e.g., gesture 583 at a location that corresponds to application restriction controls display user interface object 562 as shown in FIG. 5AL); and, in response to detecting the third gesture that corresponds to the application restriction controls display user interface object for the second application, displays application restriction control user interface objects for the second application (e.g., application restriction control user interface objects 584-1, 584-2, and 584-3 as shown in FIG. 5AM). The application restriction control user interface objects for the second application are distinct from the application restriction control user interface objects for the first application. In some embodiments, the application restriction control user interface objects for the second application include at least one application restriction control user interface object that is not included in the application restriction control user interface objects for the first application. For example, application restriction control user interface objects 584-1, 584-2, and 584-3 (e.g., "strings," "chords," and "instruments") shown in FIG. 5AM are not included in application restriction control user interface objects 542-1, 542-2, and 542-3 (e.g., "fast forward," "rewind," and "seek") shown in FIG. 5AG. In some embodiments, the application restriction control user interface objects for the first application include at least one application restriction control user interface object that is not included in the application restriction control user interface objects for the second application. For example, application restriction control user interface objects 542-1, 542-2, and 542-3 (e.g., "fast forward," "rewind," and "seek") shown in FIG. 5AG are not included in application restriction control user interface objects 584-1, 584-2, and 584-3 (e.g., "strings," "chords," and "instruments") shown in FIG. 5AM. In some embodiments, the application restriction control user interface objects for the first application and the application restriction control user interface objects for the second application include one or more common application restriction control user interface objects. For example, in some embodiments, both the video player application and a music player application include application restriction control user interface objects for "fast forward," "rewind," and "seek" features, but the video player application may include one or more application restriction control user interface objects that are not included in application restriction control user interface objects for the music player application (e.g., a "caption" feature, a "brightness setting" feature, etc.). In some embodiments, a setting for one of the common application restriction control user interface objects applies to both the first application and the second application. For example, when the setting for the "seek" application restriction control user interface object for the video player application is changed to indicate that the "seek" feature for the video player application is disabled while the video player application is in the restricted interaction mode, the "seek" feature for the music player application is also disabled while the music player application is in the restricted interaction mode.

In some embodiments, subsequent to entering the restricted interaction mode for the first application, the device exits (1034) from the restricted interaction mode for the first application and enters the interaction configuration mode for a third application. For example, in some embodiments, the device exits from the restricted interaction mode for the video player application (e.g., FIG. 5AI) and at a later time enters the interaction configuration mode for the educational application (e.g., FIG. 5C). In some embodiments, entering the interaction configuration mode for the third application includes starting the third application in an unrestricted interaction mode (e.g., by selecting an application icon for the third application from a launch pad or a home screen) and entering the interaction configuration mode for the third application from the unrestricted interaction mode for the third application. While in the interaction configuration mode for the third application, the device concurrently displays on the display: a third user interface that includes a plurality of user interface objects for the third application (e.g., user interface 502 that includes the character "A," the word "Apple," a picture of an apple, and a plurality of menu bar user interface objects as shown in FIG. 5C), and one or more interaction control user interface objects (e.g., touch interaction control user interface object 508, rotate interaction control user interface object 510, shake interaction control user interface object 512, and motion interaction control user interface object 514 as shown in FIG. 5C), without displaying an application restriction controls display user interface object for the third application. For example, user interface 501 as shown in FIG. 5C does not include an application restriction controls display user interface object for the educational application. In some embodiments, the third application does not have features that can be restricted by a user. In some embodiments, the third application is not configured to identify features that are to be enabled or disabled with application restriction control user interface objects while in the restricted interaction mode for the third application.

In some embodiments, subsequent to entering the restricted interaction mode for the second application or the third application, the device exits from the restricted interaction mode for the second application or the third application and enters the restricted interaction mode for the first application. While the device is in the restricted interaction mode for the first application, features in the first application are restricted in accordance with the corresponding, previously set settings in the first application restriction control user interface objects for the first application. As a result, the restrictions in the first application persist across multiple uses of the first application. This allows the user to avoid having to repeatedly configure the restriction settings for the first application prior to entering the restricted interaction mode for the first application.

In some embodiments, entering the restricted interaction mode for the first application includes starting the first application in an unrestricted interaction mode (e.g., by selecting an application icon for the first application from a launch pad or a home screen) and entering the interaction configuration mode for the first application from the unrestricted interaction mode for the first application, followed by exiting the interaction configuration mode for the first application and entering the restricted interaction mode for the first application (e.g., by selecting "start" icon 518 in FIG. 5AH). In some embodiments, the device detects a user input for launching the first application (e.g., selection of an application icon for the first application from a launch pad or a home screen); in response to detecting the user input for launching the first application, the device determines that the first application was previously operated in the restricted interaction mode (e.g., during the most recent prior use of the first application); and in accordance with a determination that the first application was previously operated in the restricted interaction mode, enters the restricted interaction mode for the first application without first entering the unrestricted interaction mode for the first application or the interaction configuration mode for the first application.

In some embodiments, application developers provide application information that identifies features of a software application that can be restricted. In some embodiments, application information for a respective application identifies one or more features, of the respective application, that are restricted in accordance with restriction settings for the respective application. For example, in some embodiments, the application information for the video player application identifies the features that are restricted in accordance with restriction settings for the video player application (e.g., "fast forward," "rewind," "seek," etc.). In some embodiments, the application information is stored in a respective application (e.g., application 136-1 in FIG. 1B, application internal state 192 in FIG. 1B, etc.). In some embodiments, the application information is stored in device/global internal state 157 shown in FIGS. 1A and 3.

In some embodiments, the interaction configuration mode for the respective application is displayed in accordance with instructions stored in memory 102 (FIGS. 1A and 3). In some embodiments, the instructions for displaying the interaction configuration mode are included in operating system 126 (FIGS. 1A and 3). Including the instructions for displaying the interaction configuration mode in operating system 126 allows for the same instructions to be used for displaying the interaction configuration mode for multiple applications stored in the electronic device. In some embodiments, the instructions for displaying the interaction configuration mode for the respective application are distinct from instructions in the respective application (e.g., the instructions for displaying the interaction configuration mode for the respective application are not included in the respective application).

In some embodiments, the respective application provides the application information for the respective application to operating system 126 (via a predefined application programming interface (API)). In some embodiments, the electronic device retrieves the application information for the respective application in response to detecting the first input (e.g., input 571 as shown in FIG. 5AE). In some embodiments, the electronic device retrieves the application information through the predefined application programming interface (API). The electronic device displays application restriction control user interface objects in response to detecting a gesture at a location that corresponds to an application restriction controls display user interface object, as described above with respect to operation 1016. In some embodiments, in response to detecting a gesture at a location that corresponds to a respective application restriction control user interface object, the electronic device provides to the respective application a changed setting for the respective application restriction control user interface object. Alternatively, or additionally, the electronic device provides to the respective application the changed setting for the respective application restriction control user interface object upon exiting from the interaction configuration mode for the respective application. In some embodiments, the changed setting for the respective application restriction control user interface object is provided to the respective application via the predefined application programming interface (API).

Figure 10A:
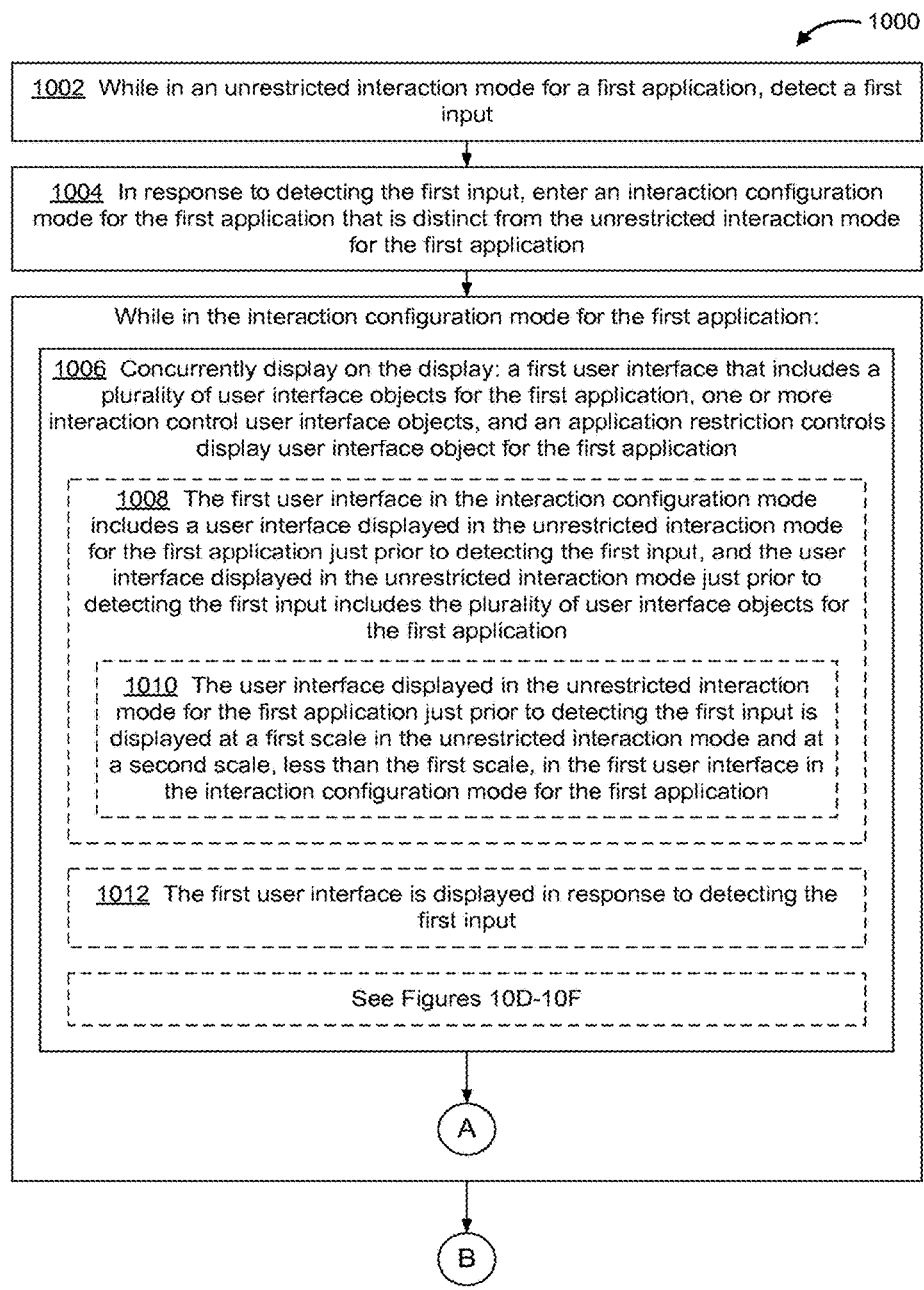
Figure 10B:
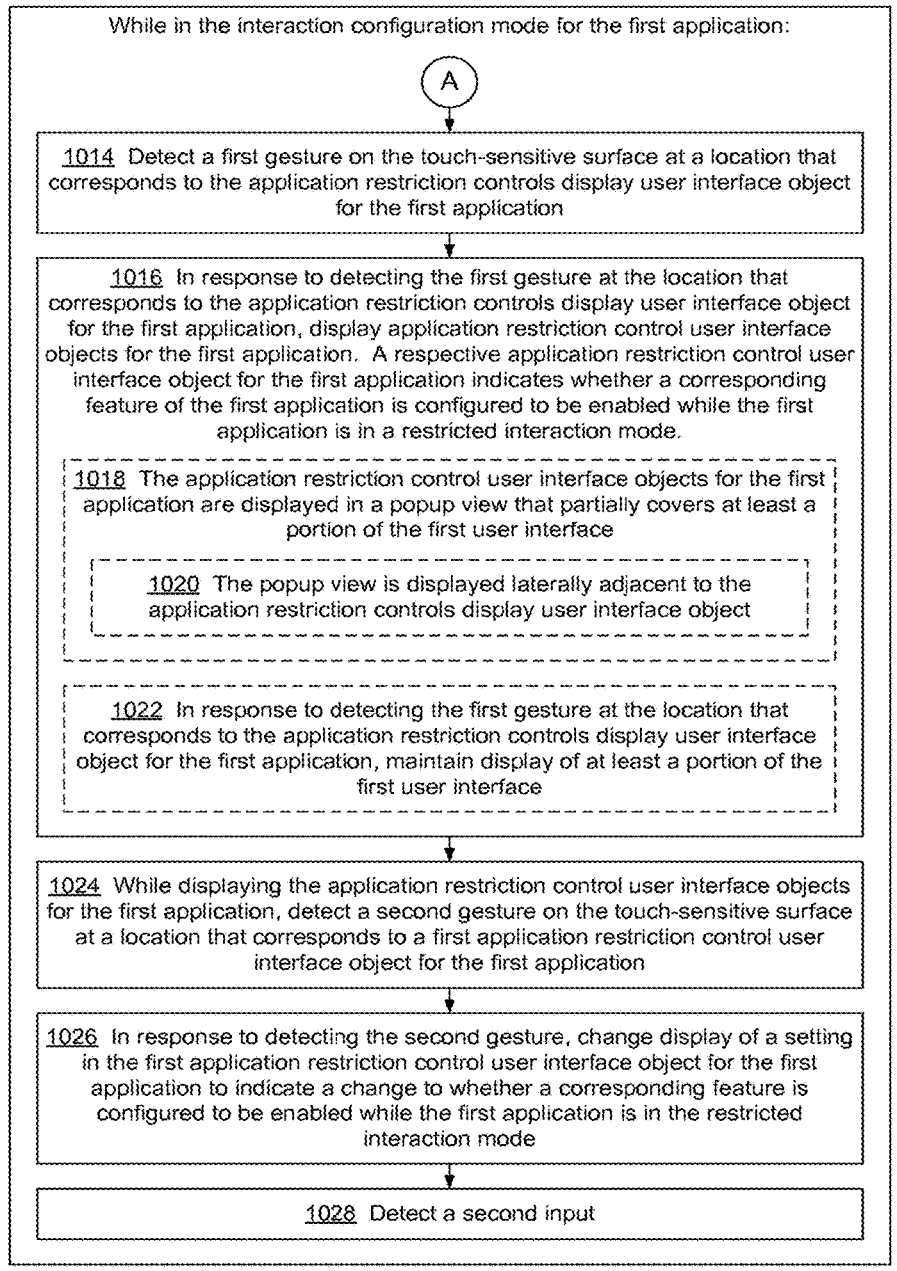
Figure 10E:
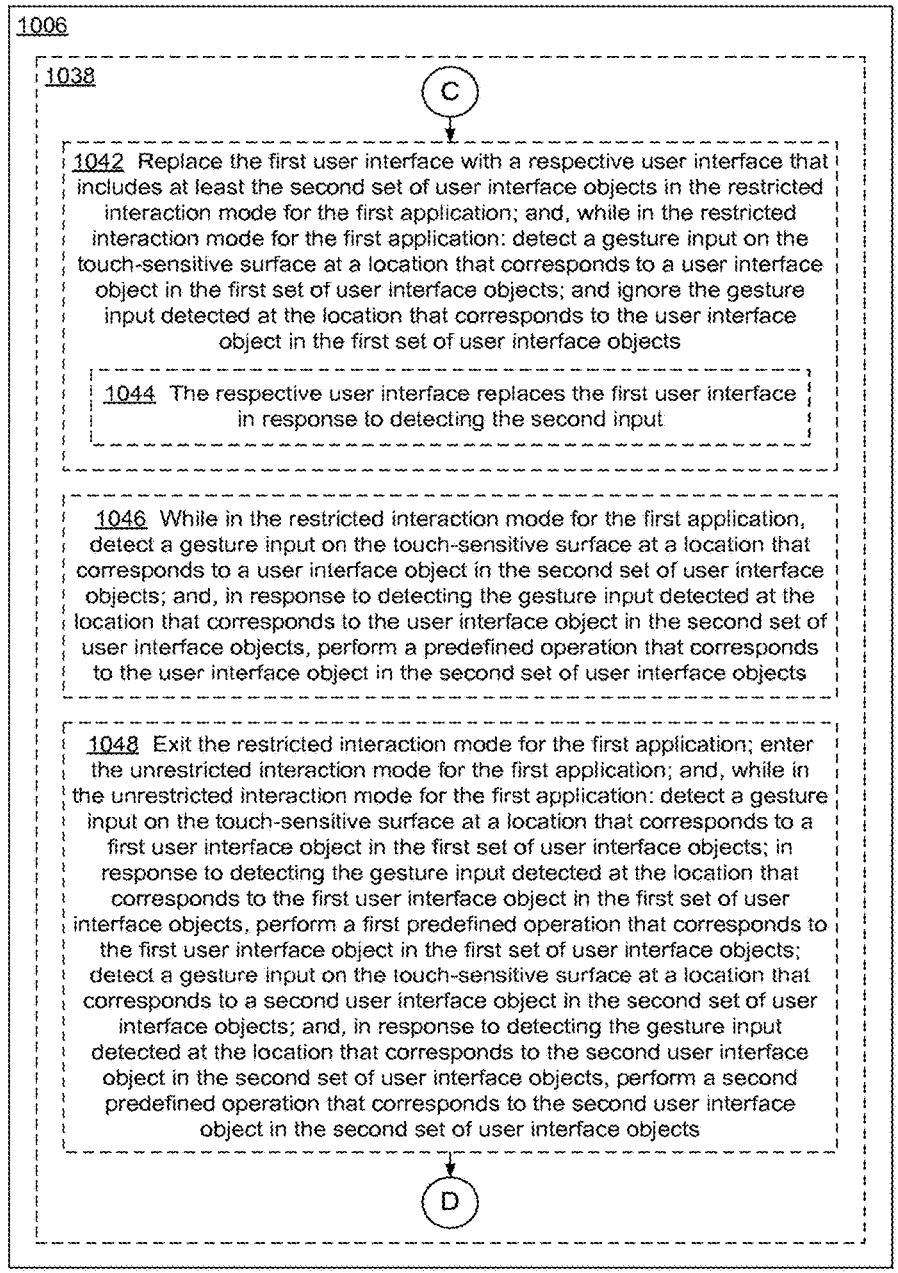
Figure 10F:
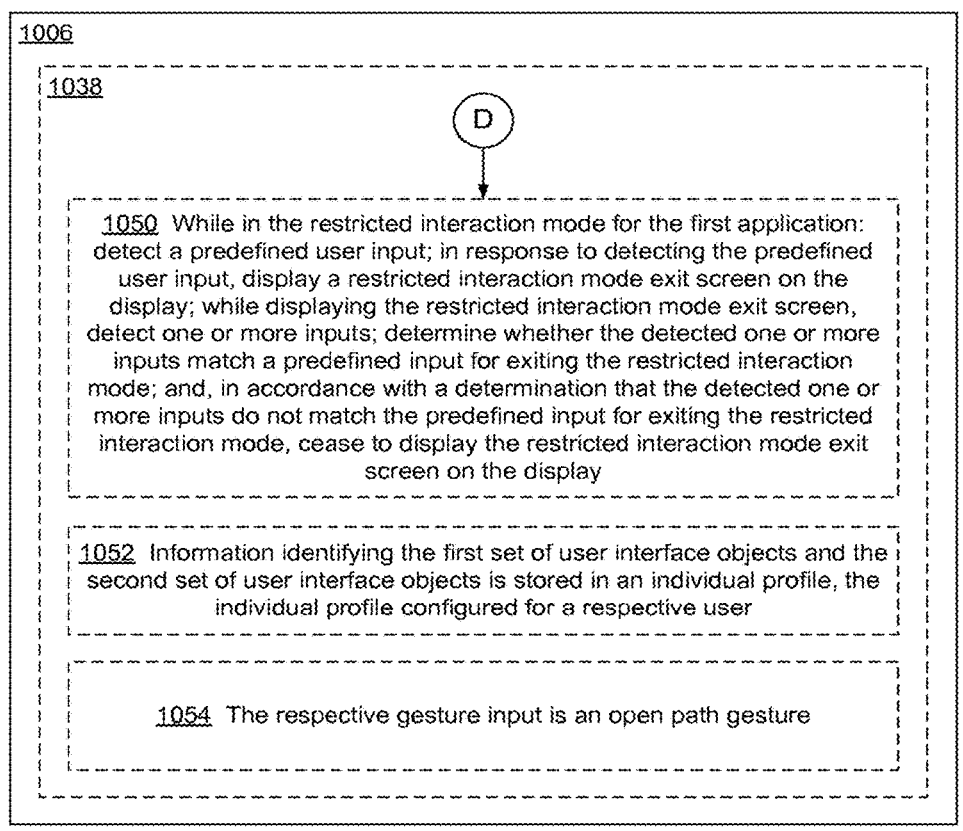

FIGS. 10D-10F illustrate additional characteristics of method 1000, related to operation 1006 describe above, in accordance with some embodiments.

In some embodiments, the interaction control user interface objects include (1036, FIG. 10D) at least one of: a touch interaction control user interface object, which, when selected, causes the electronic device to ignore touch inputs on the touch-sensitive surface while in the restricted interaction mode (e.g., touch interaction control user interface object 508 as shown in FIG. 5C; touch interaction control user interface object 568 as shown in FIG. 5AJ); a rotate interaction control user interface object (e.g., rotate interaction control user interface object 510 as shown in FIG. 5C), which, when selected, causes the electronic device to ignore rotation of the electronic device while in the restricted interaction mode; a buttons interaction control user interface object, which, when selected, causes the electronic device to ignore one or more inputs on one or more hardware buttons of the electronic device (e.g., hardware buttons interaction control user interface object 566 as shown in FIG. 5AJ); a shake interaction control user interface object, which, when selected, causes the electronic device to ignore shaking of the electronic device while in the restricted interaction mode (e.g., shake interaction control user interface object 512 as shown in FIG. 5C); and a motion interaction control user interface object, which, when selected, causes the electronic device to ignore a movement of the electronic device while in the restricted interaction mode (e.g., motion interaction control user interface object 514 as shown in FIG. 5C; motion interaction control user interface object 570 as shown in FIG. 5AJ). In some embodiments, the motion interaction control user interface object, when selected, causes the electronic device to ignore a movement of the electronic device, including shaking of the electronic device, while in the restricted interaction mode. In some embodiments when both the motion interaction control user interface object and the shake interaction control user interface object are concurrently displayed, the motion interaction control user interface object, when selected, causes the electronic device to ignore a movement of the electronic device, except for shaking of the electronic device, while in the restricted interaction mode. In some embodiments, the motion interaction control user interface object, when selected, causes the electronic device to ignore a movement of the electronic device, including rotation of the electronic device, while in the restricted interaction mode. In some embodiments when both the motion interaction control user interface object and the rotate interaction control user interface object are concurrently displayed, the motion interaction control user interface object, when selected, causes the electronic device to ignore a movement of the electronic device, except for rotation of the electronic device, while in the restricted interaction mode.

In some embodiments, while displaying the first user interface in the interaction configuration mode for the first application, the device detects (1038) one or more gesture inputs on the touch-sensitive surface at a location that corresponds to the first user interface. For a respective gesture input of the one or more gesture inputs, the device determines whether one or more user interface objects of the plurality of user interface objects for the first application correspond to the respective gesture input; and visually distinguishes a first set of user interface objects, in the plurality of user interface objects for the first application, that correspond to the one or more gesture inputs from a second set of user interface objects, in the plurality of user interface objects for the first application, that do not correspond to the one or more gesture inputs. For example, as described above with respect to FIG. 6B, the device detects touch gesture 507 (FIG. 5C); touch gesture 509 (FIG. 5E); touch gesture 511 (FIG. 5G); touch gesture 513 (FIG. 5I); or touch gestures 533, 535, 537, and 539 (FIG. 5R). In response to detecting touch gesture 507 (FIG. 5C) on user interface object 508, the device determines that the plurality of user interface objects in user interface 502 correspond to touch gesture 507. In FIGS. 5E-5F, in response to detecting touch gesture 509, the device determines that user interface object 504-2 corresponds to touch gesture 509. In FIGS. 5G-5H, in response to detecting touch gesture 511, the device determines that the character "A" corresponds to touch gesture 511. In FIGS. 5I-5K, in response to detecting touch gesture 513, the device determines that user interface objects 504-1 through 504-7 correspond to touch gesture 513. In FIGS. 5R-5S, in response to detecting touch gestures 533, 535, 537, and 539, the device determines a user interface object that corresponds to each of touch gestures 533, 535, 537, and 539. In FIG. 5M, user interface objects 504-1 through 504-7 are visually distinguished from the other user interface objects in user interface 502, such as the character "A," the word "Apple," and the picture of an apple. A person having ordinary skill in the art would understand that similar operations can be performed with respect to user interface 536 as shown in FIG. 5AF. In some embodiments, visually distinguishing the first set of user interface objects includes dimming display of the first set of user interface objects while maintaining undimmed display of the second set of user interface objects, and/or displaying one or more indicators (e.g., indicator 528 as shown in FIG. 5F) over the first set of user interface objects. In some embodiments, a respective user interface object in the first set of user interface objects is visually distinguished in response to detecting the respective gesture input that corresponds to the respective user interface object. In some embodiments, a respective indicator is a predefined shape displayed over one or more corresponding user interface objects in the first set of user interface objects. For example, the respective indicator is a rectangle, square, circle, or oval. In some embodiments, a respective indicator is a free-form shape that corresponds to a respective gesture input, which is displayed over one or more corresponding user interface objects in the first set of user interface objects. In some embodiments, the opacity of a predefined or free-form shape may be adjusted in the interaction configuration mode. For example, the predefined or free-form shape may be semi-transparent in the interaction configuration mode. In some embodiments, the predefined or free-form shape turns opaque in the restricted interaction mode.

In some embodiments, the restricted interaction mode prevents activation of (disables) user interface objects in the first set of user interface objects (e.g., icons 504-1, 504-2, 504-3, 504-4, 504-5, 504-6, and 504-7 in FIG. 5M), whereas these user interface objects in the first set of user interface objects are activatable in the unrestricted interaction mode (e.g., see FIG. 5P).

In some embodiments, the user may use gesture inputs to select user interface objects to keep enabled rather than selecting user interface objects to be disabled. For these embodiments, the second set of user interface objects includes user interface objects in the plurality of user interface objects that correspond to the detected one or more gesture inputs, and the first set of user interface objects includes user interface objects in the plurality of user interface objects that do not correspond to the detected one or more gesture inputs.

In some embodiments, determining whether one or more user interface objects of the plurality of user interface objects for the first application correspond to the respective gesture input includes (1040) determining a predefined shape from a plurality of predefined shapes, a size of the predefined shape, and a location of the predefined shape that correspond to the respective gesture input; and determining whether the one or more user interface objects of the plurality of user interface objects for the first application correspond to the determined predefined shape with the determined size at the determined location. The details of operation 620 describe above with respect to method 600 are applicable to operation 1040. For brevity, these details are not repeated herein.

In some embodiments, the device replaces (1042, FIG. 10E) the first user interface with a respective user interface that includes at least the second set of user interface objects in the restricted interaction mode for the first application. While in the restricted interaction mode for the first application, the device detects a gesture input on the touch-sensitive surface at a location that corresponds to a user interface object in the first set of user interface objects; and ignores the gesture input detected at the location that corresponds to the user interface object in the first set of user interface objects. The details of operation 630 described above with respect to method 600 are applicable to operation 1042. For brevity, these details are not repeated herein.

In some embodiments, the respective user interface replaces (1044) the first user interface in response to detecting the second input. The details of operation 632 described above with respect to method 600 are applicable to operation 1044. For brevity, these details are not repeated herein.

In some embodiments, while in the restricted interaction mode for the first application, the device detects (1046) a gesture input on the touch-sensitive surface at a location that corresponds to a user interface object in the second set of user interface objects; and, in response to detecting the gesture input detected at the location that corresponds to the user interface object in the second set of user interface objects, performs a predefined operation that corresponds to the user interface object in the second set of user interface objects. The details of operation 634 described above with respect to method 600 are applicable to operation 1046. For brevity, these details are not repeated herein.

In some embodiments, the device exits (1048) the restricted interaction mode for the first application and enters the unrestricted interaction mode for the first application. While in the unrestricted interaction mode for the first application, the device detects a gesture input on the touch-sensitive surface at a location that corresponds to a first user interface object in the first set of user interface objects; in response to detecting the gesture input detected at the location that corresponds to the first user interface object in the first set of user interface objects, performs a first predefined operation that corresponds to the first user interface object in the first set of user interface objects; detects a gesture input on the touch-sensitive surface at a location that corresponds to a second user interface object in the second set of user interface objects; and, in response to detecting the gesture input detected at the location that corresponds to the second user interface object in the second set of user interface objects, performs a second predefined operation that corresponds to the second user interface object in the second set of user interface objects. The details of operation 638 described above with respect to method 600 are applicable to operation 1048. For brevity, these details are not repeated herein.

In some embodiments, while in the restricted interaction mode for the first application, the device detects (1050, FIG. 10F) a predefined user input; in response to detecting the predefined user input, displays a restricted interaction mode exit screen on the display; while displaying the restricted interaction mode exit screen, detects one or more inputs; determines whether the detected one or more inputs match a predefined input for exiting the restricted interaction mode; and, in accordance with a determination that the detected one or more inputs do not match the predefined input for exiting the restricted interaction mode, ceases to display the restricted interaction mode exit screen on the display. The details of operation 636 described above with respect to method 600 are applicable to operation 1050. For brevity, these details are not repeated herein.

In some embodiments, information identifying the first set of user interface objects and the second set of user interface objects is stored (1052) in an individual profile, the individual profile configured for a respective user. The details of operation 640 described above with respect to method 600 are applicable to operation 1052. For brevity, these details are not repeated herein.

In some embodiments, the respective gesture input is (1054) an open path gesture. The details of operation 622 described above with respect to method 600 are applicable to operation 1054. For brevity, these details are not repeated herein.

It should be understood that the particular order in which the operations in FIGS. 10A-10F have been described is merely exemplary and is not intended to indicate that the described order is the only order in which the operations could be performed. One of ordinary skill in the art would recognize various ways to reorder the operations described herein. For brevity, these details are not repeated here. Additionally, it should be noted that details of other processes described herein with respect to method 600 (e.g., FIGS. 6A-6E) and method 800 (e.g., FIG. 8) are also applicable in an analogous manner to method 1000 described above with respect to FIGS. 10A-10F. For example, the restricted interaction mode operations described above with reference to method 1000 may have one or more of the characteristics of the restricted interaction mode entering operations described herein with reference to method 600. For brevity, these details are not repeated here.

Figure 11:
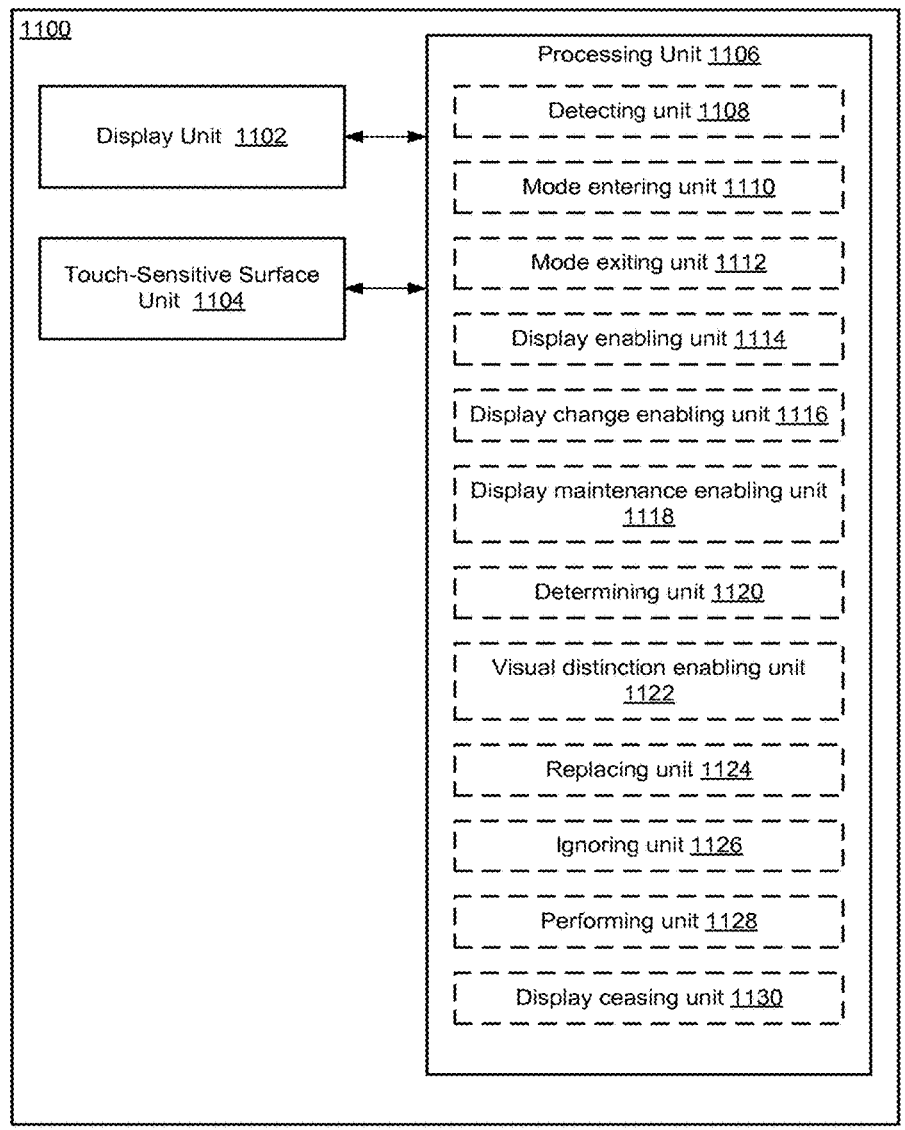
FIG. 11 is a functional block diagram of an electronic device in accordance with some embodiments.

In accordance with some embodiments, FIG. 11 shows a functional block diagram of electronic device 1100 configured in accordance with the principles of the invention as described above. The functional blocks of the device may be implemented by hardware, software, or a combination of hardware and software to carry out the principles of the invention. It is understood by persons of skill in the art that the functional blocks described in FIG. 11 may be combined or separated into sub-blocks to implement the principles of the invention as described above. Therefore, the description herein may support any possible combination or separation or further definition of the functional blocks described herein.

As shown in FIG. 11, electronic device 1100 includes display unit 1102 configured to display one or more user interfaces; touch-sensitive surface unit 1104 configured to, while in an unrestricted interaction mode for a first application, detect a first input; and processing unit 1106 coupled to display unit 1102 and touch-sensitive surface unit 1104. In some embodiments, processing unit 1106 includes detecting unit 1108, mode entering unit 1110, mode exiting unit 1112, display enabling unit 1114, display change enabling unit 1116, display maintenance enabling unit 1118, determining unit 1120, visual distinction enabling unit 1122, replacing unit 1124, ignoring unit 1126, performing unit 1128, and display ceasing unit 1130.

Processing unit 1106 is configured to, in response to detecting the first input, enter an interaction configuration mode for the first application that is distinct from the unrestricted interaction mode for the first application (e.g., with mode entering unit 1110).

Processing unit 1106 is configured to, while in the interaction configuration mode for the first application, enable concurrent display of: a first user interface that includes a plurality of user interface objects for the first application, one or more interaction control user interface objects, and an application restriction controls display user interface object for the first application (e.g., with display enabling unit 1114 on display unit 1102).

Processing unit 1106 is configured to detect a first gesture on touch-sensitive surface unit 1104 at a location that corresponds to the application restriction controls display user interface object for the first application (e.g., with detecting unit 1108).

Processing unit 1106 is configured to, in response to detecting the first gesture at the location that corresponds to the application restriction controls display user interface object for the first application, enable display of application restriction control user interface objects for the first application (e.g., with display enabling unit 1114 on display unit 1102), wherein a respective application restriction control user interface object for the first application indicates whether a corresponding feature of the first application is configured to be enabled while the first application is in a restricted interaction mode.

Processing unit 1106 is configured to, while enabling display of the application restriction control user interface objects for the first application (e.g., with display enabling unit 1114 on display unit 1102), detect a second gesture on touch-sensitive surface unit 1104 at a location that corresponds to a first application restriction control user interface object for the first application (e.g., with detecting unit 1108).

Processing unit 1106 is configured to, in response to detecting the second gesture, enable a change to display of a setting in the first application restriction control user interface object for the first application to indicate a change to whether a corresponding feature is configured to be enabled while the first application is in the restricted interaction mode (e.g., with display change enabling unit 1116 on display unit 1102).

Processing unit 1106 is configured to detect a second input (e.g., with detecting unit 1108).

Processing unit 1106 is configured to, in response to detecting the second input, exit the interaction configuration mode for the first application (e.g., with mode exiting unit 1112) and enter the restricted interaction mode for the first application that is distinct from the unrestricted interaction mode for the first application (e.g., with mode entering unit 1110), wherein the corresponding feature is restricted in accordance with the setting in the first application restriction control user interface object for the first application.

In some embodiments, processing unit 1106 is configured to, subsequent to entering the restricted interaction mode for the first application, exit from the restricted interaction mode for the first application (e.g., with mode exiting unit 1112) and enter an interaction configuration mode for a second application (e.g., with mode entering unit 1110). Processing unit 1106 is configured to, while in the interaction configuration mode for the second application, enable concurrent display of: a second user interface that includes a plurality of user interface objects for the second application, one or more interaction control user interface objects, and an application restriction controls display user interface object for the second application (e.g., with display enabling unit 1114 on display unit 1102). Processing unit 1106 is configured to detect a third gesture on touch-sensitive surface unit 1104 at a location that corresponds to the application restriction controls display user interface object for the second application (e.g., with detecting unit 1108); and, in response to detecting the third gesture that corresponds to the application restriction controls display user interface object for the second application, enable display of application restriction control user interface objects for the second application (e.g., with display enabling unit 1114 on display unit 1102), wherein the application restriction control user interface objects for the second application are distinct from the application restriction control user interface objects for the first application.

In some embodiments, processing unit 1106 is configured to, subsequent to entering the restricted interaction mode for the first application, exit from the restricted interaction mode for the first application (e.g., with mode exiting unit 1112) and enter the interaction configuration mode for a third application (e.g., with mode entering unit 1110). Processing unit 1106 is configured to, while in the interaction configuration mode for the third application, enable concurrent display of: a third user interface that includes a plurality of user interface objects for the third application, and one or more interaction control user interface objects, without displaying an application restriction controls display user interface object for the third application (e.g., with display enabling unit 1114 on display unit 1102).

In some embodiments, the first user interface in the interaction configuration mode includes a user interface displayed in the unrestricted interaction mode for the first application just prior to detecting the first input, and the user interface displayed in the unrestricted interaction mode just prior to detecting the first input includes the plurality of user interface objects for the first application.

In some embodiments, the user interface displayed in the unrestricted interaction mode for the first application just prior to detecting the first input is displayed at a first scale in the unrestricted interaction mode and at a second scale, less than the first scale, in the interaction configuration mode for the first application.

In some embodiments, the application restriction control user interface objects for the first application are displayed in a popup view that partially covers at least a portion of the first user interface.

In some embodiments, the popup view is displayed laterally adjacent to the application restriction controls display user interface object.

In some embodiments, processing unit 1106 is configured to, in response to detecting the first gesture at the location that corresponds to the application restriction controls display user interface object for the first application, maintain display of at least part of the first user interface (e.g., with display maintenance enabling unit 1118 on display unit 1102).

In some embodiments, the concurrent display of the first user interface, the one or more interaction control user interface objects, and the application restriction controls display user interface object is displayed in response to detecting the first input.

In some embodiments, the interaction control user interface objects include at least one of: a touch interaction control user interface object, which, when selected, causes the electronic device to ignore touch inputs on touch-sensitive surface unit 1104 while in the restricted interaction mode; a rotate interaction control user interface object, which, when selected, causes the electronic device to ignore rotation of the electronic device while in the restricted interaction mode; a buttons interaction control user interface object, which, when selected, causes the electronic device to ignore one or more inputs on one or more hardware buttons of the electronic device; a shake interaction control user interface object, which, when selected, causes the electronic device to ignore shaking of the electronic device while in the restricted interaction mode; and a motion interaction control user interface object, which, when selected, causes the electronic device to ignore a movement of the electronic device while in the restricted interaction mode.

In some embodiments, processing unit 1106 is configured to, while enabling display of the first user interface in the interaction configuration mode for the first application, detect one or more gesture inputs on touch-sensitive surface unit 1104 at a location that corresponds to the first user interface (e.g., with detecting unit 1108); for a respective gesture input of the one or more gesture inputs, determine whether one or more user interface objects of the plurality of user interface objects for the first application correspond to the respective gesture input (e.g., with determining unit 1120); and enable visually distinguishing a first set of user interface objects, in the plurality of user interface objects for the first application, that correspond to the one or more gesture inputs from a second set of user interface objects, in the plurality of user interface objects for the first application, that do not correspond to the one or more gesture inputs (e.g., visual distinction enabling unit 1122 on display unit 1102).

In some embodiments, processing unit 1106 is configured to: determine a predefined shape from a plurality of predefined shapes, a size of the predefined shape, and a location of the predefined shape that correspond to the respective gesture input (e.g., with determining unit 1120); and determine whether the one or more user interface objects of the plurality of user interface objects for the first application correspond to the determined predefined shape with the determined size at the determined location (e.g., with determining unit 1120).

In some embodiments, processing unit 1106 is configured to: replace the first user interface with a respective user interface that includes at least the second set of user interface objects in the restricted interaction mode for the first application (e.g., with replacing unit 1124); and, while in the restricted interaction mode for the first application: detect a gesture input on touch-sensitive surface unit 1104 at a location that corresponds to a user interface object in the first set of user interface objects (e.g., with detecting unit 1108);

and ignore the gesture input detected at the location that corresponds to the user interface object in the first set of user interface objects (e.g., with ignoring unit 1126).

In some embodiments, the respective user interface replaces the first user interface in response to detecting the second input.

In some embodiments, processing unit 1106 is configured to, while in the restricted interaction mode for the first application: detect a gesture input on touch-sensitive surface unit 1104 at a location that corresponds to a user interface object in the second set of user interface objects (e.g., with detecting unit 1108); and, in response to detecting the gesture input detected at the location that corresponds to the user interface object in the second set of user interface objects, perform a predefined operation that corresponds to the user interface object in the second set of user interface objects (e.g., with performing unit 1128).

In some embodiments, processing unit 1106 is configured to: exit the restricted interaction mode for the first application (e.g., with mode exiting unit 1112); enter the unrestricted interaction mode for the first application (e.g., with mode entering unit 1110); and, while in the unrestricted interaction mode for the first application: detect a gesture input on touch-sensitive surface unit 1104 at a location that corresponds to a first user interface object in the first set of user interface objects (e.g., with detecting unit 1108); in response to detecting the gesture input detected at the location that corresponds to the first user interface object in the first set of user interface objects, perform a first predefined operation that corresponds to the first user interface object in the first set of user interface objects (e.g., with performing unit 1128); detect a gesture input on touch-sensitive surface unit 1104 at a location that corresponds to a second user interface object in the second set of user interface objects (e.g., with detecting unit 1108); and, in response to detecting the gesture input detected at the location that corresponds to the second user interface object in the second set of user interface objects, perform a second predefined operation that corresponds to the second user interface object in the second set of user interface objects (e.g., with performing unit 1128).

In some embodiments, processing unit 1108 is configured to, while in the restricted interaction mode for the first application, detect a predefined user input (e.g., with detecting unit 1108); in response to detecting the predefined user input, enable display of a restricted interaction mode exit screen on the display (e.g., with display enabling unit 1114 on display unit 1102); while displaying the restricted interaction mode exit screen, detect one or more inputs (e.g., with detecting unit 1108); determine whether the detected one or more inputs match a predefined input for exiting the restricted interaction mode (e.g., with determining unit 1120); and, in accordance with a determination that the detected one or more inputs do not match the predefined input for exiting the restricted interaction mode, cease to display the restricted interaction mode exit screen on the display (e.g., with display ceasing unit 1130).

In some embodiments, information identifying the first set of user interface objects and the second set of user interface objects is stored in an individual profile, the individual profile configured for a respective user.

In some embodiments, the respective gesture input is an open path gesture.

The operations in the information processing methods described above may be implemented by running one or more functional modules in information processing apparatus such as general purpose processors or application specific chips. These modules, combinations of these modules, and/or their combination with general hardware (e.g., as described above with respect to FIGS. 1A and 3) are all included within the scope of protection of the invention.

The operations described above with reference to FIGS. 6A-6E, 8, 10A-10F may be implemented by components depicted in FIGS. 1A-1B. For example, detection operation 602, interaction configuration mode entering operation 604, and displaying operation 606 may be implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface (or whether rotation of the device) corresponds to a predefined event or sub-event, such as selection of an object on a user interface, or rotation of the device from one orientation to another. When a respective predefined event or sub-event is detected, event recognizer 180 activates an event handler 190 associated with the detection of the event or sub-event. Event handler 190 may utilize or call data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. An electronic device, comprising:
    a display;
    a touch-sensitive surface;
    one or more processors;
    memory; and
    one or more programs, wherein the one or more programs are stored in the memory and configured to be executed by the one or more processors, the one or more programs including instructions for:
        while in an unrestricted interaction mode for an application, detecting a first input;
        in response to detecting the first input, entering an interaction configuration mode for the application that is distinct from the unrestricted interaction mode for the application;
        while in the interaction configuration mode for the application:
            concurrently displaying on the display:
                a user interface for the application that includes a plurality of user interface objects for the application, and
                one or more interaction control user interface objects, wherein a respective interaction control user interface object indicates whether the device is configured to ignore an input for a corresponding feature while the application is in a restricted interaction mode;

while displaying the one or more interaction control user interface objects, detecting a first gesture on the touch-sensitive surface at a location that corresponds to a first interaction control user interface object having a first corresponding feature;

in response to detecting the first gesture, changing a setting in the first interaction control user interface object to indicate a change to whether the device is configured to ignore an input for the first corresponding feature while the application is in the restricted interaction mode;

detecting a second input; and, in response to detecting the second input, exiting the interaction configuration mode for the application and entering the restricted interaction mode for the application that is distinct from the unrestricted interaction mode for the application, wherein the first corresponding feature of the device is restricted in accordance with the setting in the first interaction control user interface object.

2. The electronic device of claim 1, wherein the one or more interaction control user interface objects includes an on/off switch icon to indicate whether the device is configured to ignore an input for a corresponding feature while the application is in the restricted interaction mode.

3. The electronic device of claim 1, wherein the one or more interaction control user interface objects indicates whether the device is configured to ignore an input for a corresponding feature by display of one or more lines striking through a respective icon of the one or more interaction control user interface object.

4. The electronic device of claim 1, wherein the first interaction control user interface object is a touch interaction control user interface object, which, when selected, causes the device to ignore touch inputs on the touch-sensitive surface while in the restricted interaction mode.

5. The electronic device of claim 4, the one or more programs further including instructions for:

in response to selecting the touch interaction control user interface, visually distinguishing the user interface for the application while in the interaction configuration mode.

6. The electronic device of claim 5, wherein visually distinguishing the user interface comprises displaying shading over the user interface while in the interaction configuration mode.

7. The electronic device of claim 5, the one or more programs further including instructions for:

detecting a subsequent touch gesture at a location corresponding to the touch interaction user interface object; and in response to detecting the subsequent touch gesture, unselecting the touch interaction control user interface and removing the visual distinction of the user interface to indicate that touch inputs on the touch-sensitive surface are not completely disabled while in the restricted interaction mode.

8. The electronic device of claim 1, wherein at least one of the one or more interaction control user interface objects is displayed in a popup view that is displayed in response to detecting a user selection of an options icon of a hardware interaction controls user interface object.

9. The electronic device of claim 1, wherein at least one of the one or more interaction control user interface objects includes a rotate interaction control user interface object, which, when selected, causes the device to ignore rotation of the device while in the restricted interaction mode.

10. The electronic device of claim 1, wherein at least one of the one or more interaction control user interface objects includes a shake interaction control user interface object, which, when selected, causes the electronic device to ignore shaking of the electronic device while in the restricted interaction mode.

11. The electronic device of claim 1, wherein the device further comprises one or more hardware buttons, and further wherein at least one of the one or more interaction control user interface objects includes a buttons interaction control user interface object, which, when selected, causes the electronic device to ignore one or more inputs on the one or more hardware buttons while in the restricted interaction mode.

12. The electronic device of claim 11, wherein the buttons interaction control user interface object corresponds to a hardware button that is a home button at the device.

13. The electronic device of claim 11, wherein the buttons interaction control user interface object corresponds to hardware buttons that are volume control buttons at the device.

14. The electronic device of claim 11, wherein the buttons interaction control user interface object corresponds to a hardware button that is an on/off button at the device.

15. The electronic device of claim 11, wherein the buttons interaction control user interface object corresponds to one or more hardware buttons at a physical keyboard at the device.

16. The electronic device of claim 1, wherein at least one of the one or more interaction control user interface objects includes a motion interaction control user interface object, which, when selected, causes the device to ignore movement of the electronic device while in the restricted interaction mode.

17. The electronic device of claim 1, wherein the device further comprises a home button and the first input comprises a triple click on the home button.

18. The electronic device of claim 1, wherein entering the interaction configuration mode for the application further comprises displaying the application at a reduced scale that is smaller in the interaction configuration mode than in the unrestricted mode.

19. A method, comprising:

at an electronic device with a display and a touch-sensitive surface:

while in an unrestricted interaction mode for an application, detecting a first input;

in response to detecting the first input, entering an interaction configuration mode for the application that is distinct from the unrestricted interaction mode for the application;

while in the interaction configuration mode for the application:

concurrently displaying on the display:

a user interface for the application that includes a plurality of user interface objects for the application, and one or more interaction control user interface objects, wherein a respective interaction control user interface object indicates whether the device is configured to ignore an input for a corresponding feature while the application is in a restricted interaction mode;

while displaying the one or more interaction control user interface objects, detecting a first gesture on the touch-sensitive surface at a location that corresponds to a first interaction control user interface object having a first corresponding feature;
in response to detecting the first gesture, changing a setting in the first interaction control user interface object to indicate a change to whether the device is configured to ignore an input for the first corresponding feature while the application is in the restricted interaction mode;
detecting a second input; and,
in response to detecting the second input, exiting the interaction configuration mode for the application and entering the restricted interaction mode for the application that is distinct from the unrestricted interaction mode for the application, wherein the first corresponding feature of the device is restricted in accordance with the setting in the first interaction control user interface object.

20. The method of claim 19, wherein the one or more interaction control user interface objects includes an on/off switch icon to indicate whether the device is configured to ignore an input for a corresponding feature while the application is in the restricted interaction mode.

21. The method of claim 19, wherein the one or more interaction control user interface objects indicates whether the device is configured to ignore an input for a corresponding feature by display of one or more lines striking through a respective icon of the one or more interaction control user interface object.

22. The method of claim 19, wherein the first interaction control user interface object is a touch interaction control user interface object, which, when selected, causes the device to ignore touch inputs on the touch-sensitive surface while in the restricted interaction mode.

23. The method of claim 22, further comprising:
in response to selecting the touch interaction control user interface, visually distinguishing the user interface for the application while in the interaction configuration mode.

24. The method of claim 23, wherein visually distinguishing the user interface comprises displaying shading over the user interface while in the interaction configuration mode.

25. The method of claim 23, further comprising:
detecting a subsequent touch gesture at a location corresponding to the touch interaction user interface object; and
in response to detecting the subsequent touch gesture, unselecting the touch interaction control user interface and removing the visual distinction of the user interface to indicate that touch inputs on the touch-sensitive surface are not completely disabled while in the restricted interaction mode.

26. The method of claim 19, wherein at least one of the one or more interaction control user interface objects is displayed in a popup view that is displayed in response to detecting a user selection of an options icon of a hardware interaction controls user interface object.

27. The method of claim 19, wherein at least one of the one or more interaction control user interface objects includes a rotate interaction control user interface object, which, when selected, causes the device to ignore rotation of the device while in the restricted interaction mode.

28. The method of claim 19, wherein at least one of the one or more interaction control user interface objects includes a shake interaction control user interface object, which, when selected, causes the electronic device to ignore shaking of the electronic device while in the restricted interaction mode.

29. The method of claim 19, wherein the device further comprises one or more hardware buttons, and further wherein at least one of the one or more interaction control user interface objects includes a buttons interaction control user interface object, which, when selected, causes the electronic device to ignore one or more inputs on the one or more hardware buttons while in the restricted interaction mode.

30. The method of claim 29, wherein the buttons interaction control user interface object corresponds to a hardware button that is a home button at the device.

31. The method of claim 29, wherein the buttons interaction control user interface object corresponds to hardware buttons that are volume control buttons at the device.

32. The method of claim 29, wherein the buttons interaction control user interface object corresponds to a hardware button that is an on/off button at the device.

33. The method of claim 29, wherein the buttons interaction control user interface object corresponds to one or more hardware buttons at a physical keyboard at the device.

34. The method of claim 19, wherein at least one of the one or more interaction control user interface objects includes a motion interaction control user interface object, which, when selected, causes the device to ignore movement of the electronic device while in the restricted interaction mode.

35. The method of claim 19, wherein the device further comprises a home button and the first input comprises a triple click on the home button.

36. The method of claim 19, wherein entering the interaction configuration mode for the application further comprises displaying the application at a reduced scale that is smaller in the interaction configuration mode than in the unrestricted mode.

37. A non-transitory computer-readable storage medium storing one or more programs configured to be executed by one or more processors of an electronic device with a display and a touch-sensitive surface, the one or more programs including instructions for:
while in an unrestricted interaction mode for an application, detecting a first input;
in response to detecting the first input, entering an interaction configuration mode for the application that is distinct from the unrestricted interaction mode for the application;
while in the interaction configuration mode for the application:
concurrently displaying on the display:
a user interface for the application that includes a plurality of user interface objects for the application, and
one or more interaction control user interface objects, wherein a respective interaction control user interface object indicates whether the device is configured to ignore an input for a corresponding feature while the application is in a restricted interaction mode;
while displaying the one or more interaction control user interface objects, detecting a first gesture on the touch-sensitive surface at a location that corresponds to a first interaction control user interface object having a first corresponding feature;
in response to detecting the first gesture, changing a setting in the first interaction control user interface object to indicate a change to whether the device is configured to ignore an input for the first corresponding feature while the application is in the restricted interaction mode;

detecting a second input; and, in response to detecting the second input, exiting the interaction configuration mode for the application and enter the restricted interaction mode for the application that is distinct from the unrestricted interaction mode for the application, wherein the first corresponding feature of the device is restricted in accordance with the setting in the first interaction control user interface object.

38. The non-transitory computer-readable storage medium of claim 37, wherein the one or more interaction control user interface objects includes an on/off switch icon to indicate whether the device is configured to ignore an input for a corresponding feature while the application is in the restricted interaction mode.

39. The non-transitory computer-readable storage medium of claim 37, wherein the one or more interaction control user interface objects indicates whether the device is configured to ignore an input for a corresponding feature by display of one or more lines striking through a respective icon of the one or more interaction control user interface object.

40. The non-transitory computer-readable storage medium of claim 37, wherein the first interaction control user interface object is a touch interaction control user interface object, which, when selected, causes the device to ignore touch inputs on the touch-sensitive surface while in the restricted interaction mode.

41. The non-transitory computer-readable storage medium of claim 40, the one or more programs further including instructions for:

in response to selecting the touch interaction control user interface, visually distinguishing the user interface for the application while in the interaction configuration mode.

42. The non-transitory computer-readable storage medium of claim 41, wherein visually distinguishing the user interface comprises displaying shading over the user interface while in the interaction configuration mode.

43. The non-transitory computer-readable storage medium of claim 41, the one or more programs further including instructions for:

detecting a subsequent touch gesture at a location corresponding to the touch interaction user interface object; and in response to detecting the subsequent touch gesture, unselecting the touch interaction control user interface and removing the visual distinction of the user interface to indicate that touch inputs on the touch-sensitive surface are not completely disabled while in the restricted interaction mode.

44. The non-transitory computer-readable storage medium of claim 37, wherein at least one of the one or more interaction control user interface objects is displayed in a popup view that is displayed in response to detecting a user selection of an options icon of a hardware interaction controls user interface object.

45. The non-transitory computer-readable storage medium of claim 37, wherein at least one of the one or more interaction control user interface objects includes a rotate interaction control user interface object, which, when selected, causes the device to ignore rotation of the device while in the restricted interaction mode.

46. The non-transitory computer-readable storage medium of claim 37, wherein at least one of the one or more interaction control user interface objects includes a shake interaction control user interface object, which, when selected, causes the electronic device to ignore shaking of the electronic device while in the restricted interaction mode.

47. The non-transitory computer-readable storage medium of claim 37, wherein the device further comprises one or more hardware buttons, and further wherein at least one of the one or more interaction control user interface objects includes a buttons interaction control user interface object, which, when selected, causes the electronic device to ignore one or more inputs on the one or more hardware buttons while in the restricted interaction mode.

48. The non-transitory computer-readable storage medium of claim 47, wherein the buttons interaction control user interface object corresponds to a hardware button that is a home button at the device.

49. The non-transitory computer-readable storage medium of claim 47, wherein the buttons interaction control user interface object corresponds to hardware buttons that are volume control buttons at the device.

50. The non-transitory computer-readable storage medium of claim 47, wherein the buttons interaction control user interface object corresponds to a hardware button that is an on/off button at the device.

51. The non-transitory computer-readable storage medium of claim 47, wherein the buttons interaction control user interface object corresponds to one or more hardware buttons at a physical keyboard at the device.

52. The non-transitory computer-readable storage medium of claim 37, wherein at least one of the one or more interaction control user interface objects includes a motion interaction control user interface object, which, when selected, causes the device to ignore movement of the electronic device while in the restricted interaction mode.

53. The non-transitory computer-readable storage medium of claim 37, wherein the device further comprises a home button and the first input comprises a triple click on the home button.

54. The non-transitory computer-readable storage medium of claim 37, wherein entering the interaction configuration mode for the application further comprises displaying the application at a reduced scale that is smaller in the interaction configuration mode than in the unrestricted mode.

* * * * *